(12) United States Patent
Preston et al.

(10) Patent No.: US 11,774,674 B2
(45) Date of Patent: Oct. 3, 2023

(54) OPTICAL WAVEGUIDES AND COUPLERS FOR DELIVERING LIGHT TO AN ARRAY OF PHOTONIC ELEMENTS

(71) Applicant: Quantum-Si Incorporated, Guilford, CT (US)

(72) Inventors: Kyle Preston, Guilford, CT (US); Bing Shen, Branford, CT (US); Ali Kabiri, Madison, CT (US); Gerard Schmid, Guilford, CT (US)

(73) Assignee: Quantum-Si Incorporated, Branford, CT (US)

( * ) Notice: Subject to any disclaimer, the term of this patent is extended or adjusted under 35 U.S.C. 154(b) by 0 days.

(21) Appl. No.: 16/733,296

(22) Filed: Jan. 3, 2020

(65) Prior Publication Data

US 2020/0218009 A1 Jul. 9, 2020

Related U.S. Application Data

(60) Provisional application No. 62/788,057, filed on Jan. 3, 2019.

(51) Int. Cl.
*G02B 6/12* (2006.01)
*G02B 6/122* (2006.01)
(Continued)

(52) U.S. Cl.
CPC ......... *G02B 6/12004* (2013.01); *G02B 6/124* (2013.01); *G02B 6/125* (2013.01);
(Continued)

(58) Field of Classification Search
CPC .. G02B 6/12004; G02B 6/1228; G02B 6/124; G02B 6/125; G02B 2006/12138
(Continued)

(56) References Cited

U.S. PATENT DOCUMENTS

| | | | | |
|---|---|---|---|---|
| 4,515,428 A | * | 5/1985 | Findakly | G02B 6/2852 385/45 |
| 5,961,924 A | | 10/1999 | Reichert et al. | |

(Continued)

FOREIGN PATENT DOCUMENTS

| | | |
|---|---|---|
| WO | WO 2011/153962 A1 | 12/2011 |
| WO | WO 2016/187580 A1 | 11/2016 |
| WO | WO 2016/201387 A1 | 12/2016 |

OTHER PUBLICATIONS

"Two-mode division multiplexing in a silicon-on-insulator ring resonator" by Dorin et al, Optics Express, vol. 22, No. 4, pp. 4547-4558 (Year: 2014).*

(Continued)

*Primary Examiner* — Robert Tavlykaev
(74) *Attorney, Agent, or Firm* — Wolf, Greenfield & Sacks, P.C.

(57) ABSTRACT

Optical waveguides and couplers for delivering light to an array of photonic elements in a photonic integrated device. The photonic integrated device and related instruments and systems may be used to analyze samples in parallel. The photonic integrated device may include a grating coupler configured to receive light from an external light source and optically couple with multiple waveguides configured to optically couple with sample wells of the photonic integrated device.

17 Claims, 32 Drawing Sheets

(51) Int. Cl.
*G02B 6/124* (2006.01)
*G02B 6/125* (2006.01)

(52) U.S. Cl.
CPC .. *G02B 6/1228* (2013.01); *G02B 2006/12107* (2013.01); *G02B 2006/12119* (2013.01); *G02B 2006/12138* (2013.01)

(58) Field of Classification Search
USPC .................................................... 385/12, 14
See application file for complete search history.

(56) References Cited

U.S. PATENT DOCUMENTS

| | | | |
|---|---|---|---|
| 6,201,913 B1* | 3/2001 | Yi | G02B 6/2804 385/48 |
| 6,787,308 B2 | 9/2004 | Balasubramanian et al. | |
| 6,917,726 B2 | 7/2005 | Levene et al. | |
| 7,175,811 B2 | 2/2007 | Bach et al. | |
| 7,181,142 B1* | 2/2007 | Xu | H04J 3/1694 398/66 |
| 7,426,322 B2 | 9/2008 | Hyde | |
| 7,738,086 B2 | 6/2010 | Shepard et al. | |
| 7,820,983 B2 | 10/2010 | Lundquist et al. | |
| 7,834,329 B2 | 11/2010 | Lundquist et al. | |
| 7,838,847 B2 | 11/2010 | Lundquist et al. | |
| 8,053,742 B2 | 11/2011 | Lundquist et al. | |
| 8,189,972 B2* | 5/2012 | Little | G02B 6/12007 385/43 |
| 8,207,509 B2 | 6/2012 | Lundquist et al. | |
| 8,274,040 B2 | 9/2012 | Zhong et al. | |
| 8,278,728 B2 | 10/2012 | Murshid | |
| 8,465,699 B2 | 6/2013 | Fehr et al. | |
| 8,471,219 B2 | 6/2013 | Lundquist et al. | |
| 8,471,230 B2 | 6/2013 | Zhong et al. | |
| 8,502,169 B2 | 8/2013 | Rigneault et al. | |
| 8,618,507 B1 | 12/2013 | Lundquist et al. | |
| 8,747,751 B2* | 6/2014 | Duer | G01N 21/6452 385/12 |
| 8,865,078 B2* | 10/2014 | Chiou | B82Y 15/00 422/82.11 |
| 9,029,802 B2 | 5/2015 | Lundquist et al. | |
| 9,157,864 B2 | 10/2015 | Fehr et al. | |
| 9,222,123 B2 | 12/2015 | Zhong et al. | |
| 9,222,133 B2 | 12/2015 | Lundquist et al. | |
| 9,223,084 B2 | 12/2015 | Grot et al. | |
| 9,372,308 B1 | 6/2016 | Saxena et al. | |
| 9,587,276 B2 | 3/2017 | Lundquist et al. | |
| 9,606,060 B2 | 3/2017 | Chen et al. | |
| 9,658,161 B2 | 5/2017 | Saxena et al. | |
| 9,666,748 B2 | 5/2017 | Leobandung | |
| 9,719,138 B2 | 8/2017 | Zhong et al. | |
| 9,765,395 B2 | 9/2017 | Goldsmith | |
| 9,777,321 B2 | 10/2017 | Chiou et al. | |
| 9,946,017 B2 | 4/2018 | Saxena et al. | |
| 10,018,764 B2 | 7/2018 | Grot et al. | |
| 10,090,429 B2 | 10/2018 | Leobandung | |
| 10,138,515 B2 | 11/2018 | Fehr et al. | |
| 10,280,457 B2 | 5/2019 | Zhong et al. | |
| 10,310,178 B2 | 6/2019 | Saxena et al. | |
| 10,487,356 B2 | 11/2019 | Lundquist et al. | |
| 10,578,788 B2 | 3/2020 | Grot et al. | |
| 10,655,172 B2 | 5/2020 | Rank et al. | |
| 10,724,090 B2 | 7/2020 | McCaffrey et al. | |
| 2002/0110839 A1* | 8/2002 | Bach | B82Y 15/00 435/7.9 |
| 2002/0182716 A1 | 12/2002 | Weisbuch et al. | |
| 2003/0108290 A1* | 6/2003 | Zhang | G02B 6/125 385/37 |
| 2003/0174992 A1 | 9/2003 | Levene et al. | |
| 2004/0040646 A1* | 3/2004 | Takahashi | G02B 6/12007 156/230 |
| 2004/0096154 A1* | 5/2004 | Bernasconi | G02B 6/12019 385/37 |
| 2010/0065726 A1 | 3/2010 | Zhong et al. | |
| 2010/0296775 A1* | 11/2010 | Png | G02B 6/12004 385/129 |
| 2012/0085894 A1* | 4/2012 | Zhong | G01N 33/54373 250/227.11 |
| 2013/0116153 A1 | 5/2013 | Bowen et al. | |
| 2015/0141267 A1* | 5/2015 | Rothberg | G01N 21/7746 506/2 |
| 2015/0207291 A1* | 7/2015 | Rickman | H01S 3/10053 372/20 |
| 2015/0346340 A1* | 12/2015 | Yaacobi | G01S 7/4915 356/5.11 |
| 2016/0084761 A1 | 3/2016 | Rothberg et al. | |
| 2017/0146479 A1 | 5/2017 | Levine et al. | |
| 2017/0350818 A1* | 12/2017 | Rothberg | G01N 21/6454 |
| 2018/0039154 A1* | 2/2018 | Hashemi | G02B 6/1226 |
| 2019/0292590 A1 | 9/2019 | Zhong et al. | |

OTHER PUBLICATIONS

"Optical Waveguides" by Agrawal, lecture notes for class OPT 568 at the University of Rochester (Year: 2008).*
"Integrated Photonics" by Pollock and Lipson, Springer Science+ Business Media, ISBN 978-1-4419-5398-8 (Year: 2003).*
Hale, Fibre Optic Sensors using Adiabatically Tapered Single Mode Fibres. Dissertation submitted to the University of Cambridge. Feb. 1994. 209 pages.
Mogensen et al., A Microfluidic Device with an Integrated Waveguide Beam Splitter for Velocity Measurements of Flowing Particles by Fourier Transformation. Analytical Chemistry. Sep. 15, 2003;75(18):4931-4936.
Taitt et al., Evanescent wave fluorescence biosensors. Biosens Bioelectron. Jun. 2005;20(12):2470-87. Epub Dec. 8, 2004.
International Search Report and Written Opinion dated Apr. 24, 2020 for International Application No. PCT/US2020/012106.

* cited by examiner

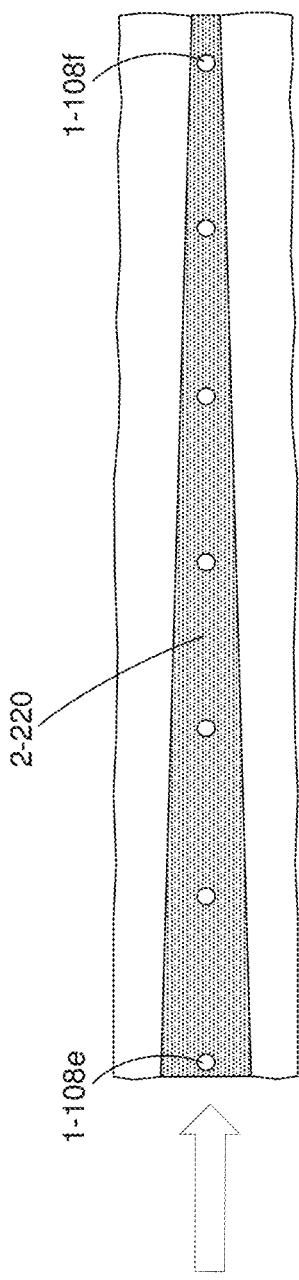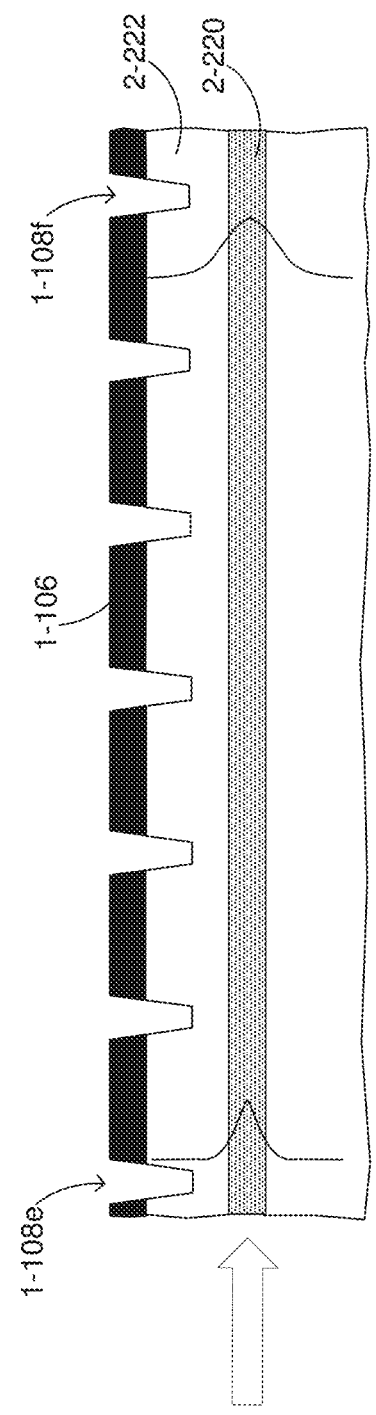

OPTICAL WAVEGUIDES AND COUPLERS FOR DELIVERING LIGHT TO AN ARRAY OF PHOTONIC ELEMENTS

CROSS-REFERENCE TO RELATED APPLICATIONS

This application claims the benefit under 35 U.S.C. § 119(e) of U.S. Provisional Patent Application Ser. No. 62/788,057, titled "OPTICAL WAVEGUIDES AND COUPLERS FOR DELIVERING LIGHT TO AN ARRAY OF PHOTONIC ELEMENTS", and filed on Jan. 3, 2019, which is incorporated by reference herein in its entirety.

FIELD OF THE APPLICATION

The present application is directed generally to devices, methods, and techniques for coupling optical energy into a photonic device and distributing optical energy to multiple regions of the device. The photonic device may be used for performing parallel, quantitative analysis of biological and/or chemical samples, including for nucleic acid sequencing and protein sequencing.

BACKGROUND

Instruments that are capable of massively-parallel analyses of biological or chemical samples are typically limited to laboratory settings because of several factors that can include their large size, lack of portability, requirement of a skilled technician to operate the instrument, power demands, need for a controlled operating environment, and cost. Moreover, some analysis of biological or chemical samples is performed in bulk such that a large amount of a particular type of sample is necessary for detection and quantitation.

Analysis of biological or chemical samples may involve tagging samples with luminescent markers that emit light of a particular wavelength, illuminating with a light source the tagged samples, and detecting the luminescent light with a photodetector. Such techniques conventionally involve expensive laser light sources and systems to illuminate the tagged samples as well as complex detection optics and electronics to collect the luminescence from the tagged samples.

SUMMARY

Some embodiments are directed to an integrated photonic device comprising: a plurality of sample wells arranged in a row; a first waveguide positioned to optically couple with at least two sample wells in the row; and a power waveguide configured to receive light from a region of the integrated photonic device separate from the row of sample wells and to optically couple with the first waveguide.

Some embodiments are directed to an integrated photonic device comprising: an array of sample wells arranged in rows; and a plurality of waveguides including a first waveguide positioned to optically couple with a first group of sample wells in a row and a second waveguide positioned to optically couple with a second group of sample wells in the row.

Some embodiments are directed to an integrated photonic device comprising: at least one waveguide and an optical coupling region. The optical coupling region comprising: a grating coupler optically coupled to the at least one waveguide and configured to receive light incident to a surface of the integrated photonic device, the grating coupler having material structures asymmetric about a plane substantially parallel to the surface; and at least one monitoring sensor positioned proximate to a region overlapping with the grating coupler and configured to receive light incident to the grating coupler.

Some embodiments are directed to an integrated photonic device comprising at least one waveguide and an optical coupling region. The optical coupling region comprising a grating coupler optically coupled to the at least one waveguide and configured to receive light incident to a surface of the integrated photonic device, the grating coupler having material structures spaced from each other with a variable fill factor; and at least one monitoring sensor positioned proximate to a region overlapping with the grating coupler and configured to receive light incident to the grating coupler.

Some embodiments are directed to a method of forming an integrated photonic device comprising: forming a plurality of sample wells arranged in a row; forming a first waveguide positioned to optically couple with at least two sample wells in the row; and forming a power waveguide configured to receive light from a region of the integrated photonic device separate from the row of sample wells and to optically couple with the first waveguide.

Some embodiments are directed to a method of forming an integrated photonic device comprising: forming an array of sample wells arranged in rows; and forming a plurality of waveguides including a first waveguide positioned to optically couple with a first group of sample wells in a row and a second waveguide positioned to optically couple with a second group of sample wells in the row.

Some embodiments are directed to a method of forming an integrated photonic device comprising: forming at least one waveguide and forming an optical coupling region. The optical coupling region comprising: a grating coupler optically coupled to the at least one waveguide and configured to receive light incident to a surface of the integrated photonic device, the grating coupler having material structures asymmetric about a plane substantially parallel to the surface; and at least one monitoring sensor positioned proximate to a region overlapping with the grating coupler and configured to receive light incident to the grating coupler.

Some embodiments are directed to a method of forming an integrated photonic device comprising: forming at least one waveguide and forming an optical coupling region. The optical coupling region comprising: a grating coupler optically coupled to the at least one waveguide and configured to receive light incident to a surface of the integrated photonic device, the grating coupler having material structures spaced from each other with a variable fill factor; and at least one monitoring sensor positioned proximate to a region overlapping with the grating coupler and configured to receive light incident to the grating coupler.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 1-2 is a planar schematic of an integrated device, according to some embodiments.

FIG. 2-1A is a planar schematic of a row of sample wells positioned proximate to a tapered waveguide, according to some embodiments.

FIG. 2-1B is a cross-sectional view of the row of sample wells and the tapered waveguide shown in FIG. 2-1A.

FIG. 2-2 is a plot of power input to a waveguide needed to achieve the minimum relative intensity across all 1024 sample wells versus the top cladding thickness, according to some embodiments.

FIG. 2-3 is a plot of the amount of nonuniformity in intensity along a row of sample wells versus the top cladding thickness for a tapered waveguide, according to some embodiments.

FIG. 2-4 is a plot of relative intensity versus sample well number for a row of sample wells coupled to a tapered waveguide, according to some embodiments.

FIG. 2-5 is a plot of power in a tapered waveguide versus sample well number for a row of sample wells coupled to the tapered waveguide, according to some embodiments.

FIG. 2-6 is a plot of waveguide width versus sample well number for a row of sample wells coupled to the tapered waveguide, according to some embodiments.

FIG. 2-7 is a plot of power input to the waveguide versus the number of sample wells per row, according to some embodiments.

FIG. 2-8 is a plot of row efficiency versus the number of sample wells per row, according to some embodiments.

FIG. 3-1 is a planar view of a waveguide configuration having a row shift waveguide configuration where multiple waveguides are used to deliver light to individual rows of sample wells, according to some embodiments.

FIG. 3-2 is a planar view of a waveguide configuration having a power waveguide and multiple waveguides positioned to optically couple with different groups of sample wells in a row, according to some embodiments.

FIG. 3-3 is a planar view of a waveguide configuration having a power waveguide and multiple waveguides positioned to optically couple with different groups of sample wells in a row, according to some embodiments.

FIG. 3-4 is a planar view of a waveguide configuration having a power waveguide and multiple waveguides configured to optically couple with the power waveguide, according to some embodiments.

FIG. 3-5 is a planar view of a waveguide configuration having power a waveguide and a continuous coupler waveguide, according to some embodiments.

FIG. 3-6 is a planar view of a waveguide configuration having a power waveguide and a continuous coupler waveguide, according to some embodiments.

FIG. 3-7 is a plot of power input to a continuous coupler waveguide needed to achieve a minimum relative intensity versus initial coupling fraction with a power waveguide, according to some embodiments.

FIG. 3-8 is a plot of the amount of nonuniformity in intensity along a row of sample wells, for a power waveguide and continuous coupler waveguide configuration, versus initial coupling fraction with the power waveguide, according to some embodiments.

FIG. 3-9 is a plot of relative intensity versus sample well number for a power waveguide and continuous coupler waveguide configuration, according to some embodiments.

FIG. 3-10 is a plot of power in a waveguide versus sample well number in a row of sample wells for a power waveguide and continuous coupler waveguide configuration, according to some embodiments.

FIG. 3-11 is a plot of a dimension of a gap between a power waveguide and a continuous coupler waveguide versus sample well number, according to some embodiments.

FIG. 3-12 is a plot of power input to a waveguide versus number of sample wells per row for a power waveguide and continuous coupler waveguide configuration, according to some embodiments.

FIG. 3-13 is a plot of row efficiency measured by the number of sample wells per unit power versus number of sample wells per row for a power waveguide and continuous coupler waveguide configuration, according to some embodiments.

FIG. 4-1 is a cross-sectional view of an apodized grating coupler, according to some embodiments.

FIG. 4-2 is a plot of coupling efficiency versus thickness of a bottom cladding layer for an apodized grating coupler, according to some embodiments.

FIG. 4-3 is a plot of coupling efficiency versus lateral dimension error for an apodized grating coupler, according to some embodiments.

FIG. 4-4 is a cross-sectional view of a blazed grating coupler, according to some embodiments.

FIG. 4-5 is a plot of coupling efficiency versus thickness of a bottom cladding layer for a blazed grating coupler, according to some embodiments.

FIG. 4-6 is a grayscale version of a color heat map plotting parameter $a_2$ versus $a_1$ where the variation in color corresponds to coupling efficiency for a blazed grating coupler, according to some embodiments.

FIG. 4-7 is a grayscale version of a color heat map plotting parameter $a_2$ versus $a_1$ where the variation in color corresponds to coupling efficiency for a blazed grating coupler, according to some embodiments.

FIG. 4-8 is a cross-sectional view of a bi-layer grating coupler, according to some embodiments.

FIG. 4-9 is a plot of coupling efficiency versus thickness of a bottom cladding layer for a bi-layer grating coupler, according to some embodiments.

FIG. 4-10 is a grayscale version of a color heat map plotting parameter $D_{Offset}$ versus duty cycle where the variation in color corresponds to coupling efficiency for a bi-layer grating coupler, according to some embodiments.

FIG. 4-11 is a grayscale version of a color heat map plotting parameter $D_{Offset}$ versus duty cycle where the variation in color corresponds to coupling efficiency for a bi-layer grating coupler, according to some embodiments.

FIG. 4-12 is a cross-sectional view of a grating coupler, according to some embodiments.

FIG. 4-13 is a cross-sectional view of a grating coupler, according to some embodiments.

FIG. 4-14 is a schematic of a planar view of a wideband grating coupler, according to some embodiments.

FIG. 4-15 is a plot of bandwidth versus fill factor for a grating coupler having a wideband configuration, according to some embodiments.

FIG. 4-16 is a plot of peak wavelength versus fill factor for a grating coupler having a wideband configuration, according to some embodiments.

FIG. 4-17 is a plot of peak efficiency versus fill factor for a grating coupler having a wideband configuration, according to some embodiments.

FIG. 4-18 is a schematic of a planar view of a grating coupler, according to some embodiments.

FIG. 4-19 is a schematic of a planar view of a grating coupler, according to some embodiments.

FIG. 4-20 is a schematic of a planar view of a grating coupler, according to some embodiments.

FIG. 5-1A is a block diagram of an integrated device and an instrument, according to some embodiments.

FIG. 5-1B is a schematic of an apparatus including an integrated device, according to some embodiments.

FIG. 5-2 is a schematic of a pixel having a sample well, optical waveguide, and time-binning photodetector, according to some embodiments.

FIG. 5-3 is a schematic of an exemplary biological reaction that may occur within a sample well, according to some embodiments.

FIG. 5-4 is a plot of emission probability curves for two different fluorophores having different decay characteristics, according to some embodiments.

FIG. 5-5 is a plot of time-binning detection of fluorescent emission, according to some embodiments, according to some embodiments.

FIG. 5-6 is an exemplary time-binning photodetector, according to some embodiments.

FIG. 5-7A is a schematic illustrating pulsed excitation and time-binned detection of fluorescent emission from a sample, according to some embodiments.

FIG. 5-7B is a histogram of accumulated fluorescent photon counts in various time bins after repeated pulsed excitation of a sample, according to some embodiments.

FIG. 5-8A-5-8D are different histograms that may correspond to four nucleotides (T, A, C, G) or nucleotide analogs, according to some embodiments.

DETAILED DESCRIPTION

I. Introduction

Figure 1:
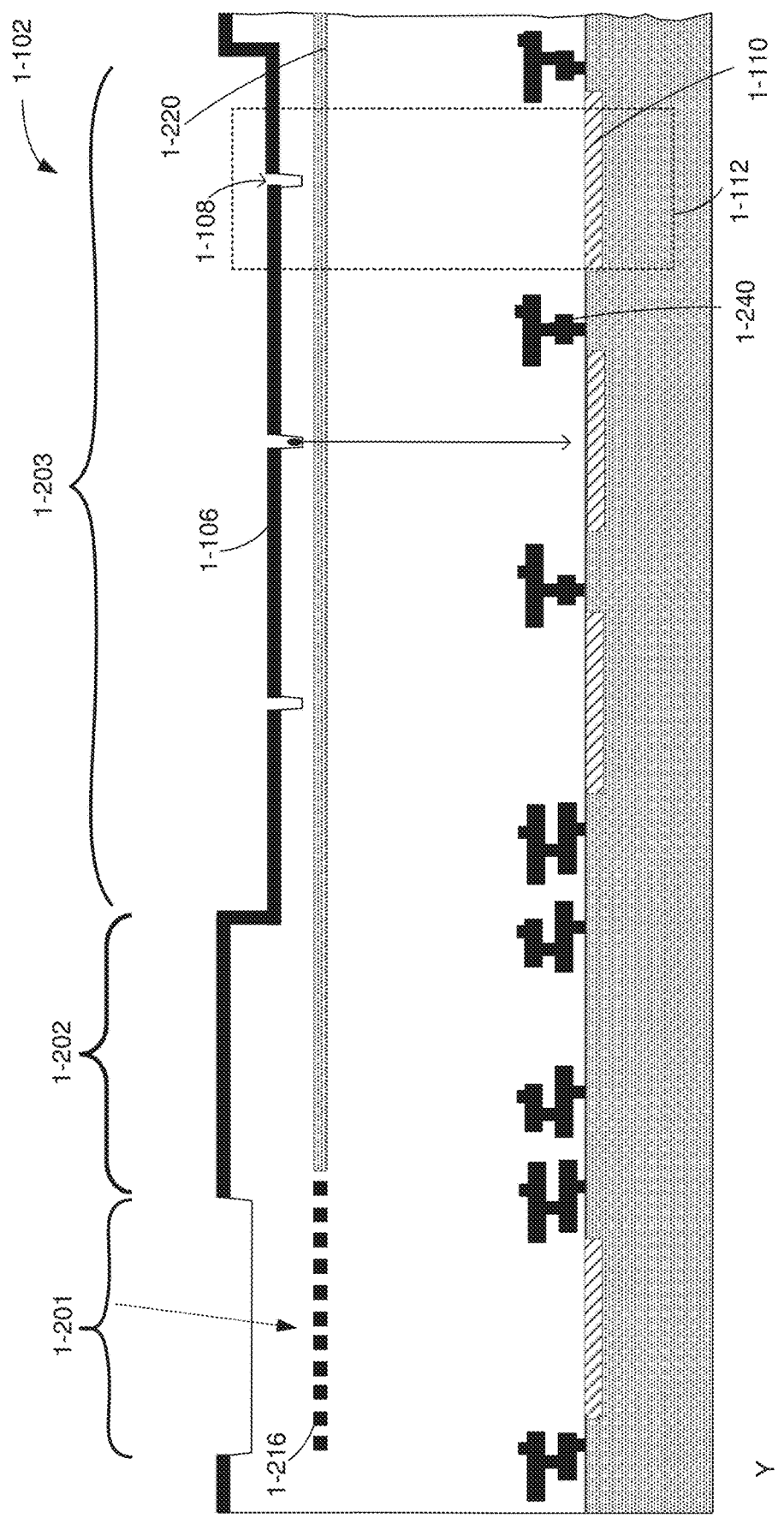
FIG. 1-1 is a cross-sectional schematic of an integrated device, according to some embodiments.

Aspects of the present application relate to integrated devices, instruments and related systems capable of analyzing samples in parallel, including identification of single molecules and nucleic acid sequencing. Such an instrument may be compact, easy to carry, and easy to operate, allowing a physician or other provider to readily use the instrument and transport the instrument to a desired location where care may be needed. Analysis of a sample may include labeling the sample with one or more fluorescent markers, which may be used to detect the sample and/or identify single molecules of the sample (e.g., individual nucleotide identification as part of nucleic acid sequencing). A fluorescent marker may become excited in response to illuminating the fluorescent marker with excitation light (e.g., light having a characteristic wavelength that may excite the fluorescent marker to an excited state) and, if the fluorescent marker becomes excited, emit emission light (e.g., light having a characteristic wavelength emitted by the fluorescent marker by returning to a ground state from an excited state). Detection of the emission light may allow for identification of the fluorescent marker, and thus, the sample or a molecule of the sample labeled by the fluorescent marker. According to some embodiments, the instrument may be capable of massively-parallel sample analyses and may be configured to handle tens of thousands of samples or more simultaneously.

The inventors have recognized and appreciated that an integrated device, having sample wells configured to receive a sample and integrated optics formed on the integrated device, and an instrument configured to interface with the integrated device may be used to achieve analysis of this number of samples. The instrument may include one or more excitation light sources, and the integrated device may interface with the instrument such that the excitation light is delivered to the sample wells using integrated optical components (e.g., waveguides, optical couplers, optical splitters) formed as part of the integrated device. The optical components may improve the uniformity of illumination across the sample wells of the integrated device and may reduce a large number of external optical components that might otherwise be needed. Furthermore, the inventors have recognized and appreciated that integrating photodetectors on the integrated device may improve detection efficiency of fluorescent emissions from the sample wells and reduce the number of light-collection components that might otherwise be needed.

According to some embodiments, the integrated device has an array of sample wells, which allow for multiplexed analysis of multiple samples across the array, and an optical system configured to deliver excitation light to the array of sample wells. Performance of the integrated device may depend on the ability of the integrated device to deliver excitation light across the array of sample wells using the optical system. Additionally, performance of the integrated device may relate to the ability of the optical system to deliver excitation light to individual sample wells in a substantially uniform manner, such as by delivering a relatively constant intensity or electric field strength to individual sample wells. Specifically, performance related factors associated with the optical system may include optical loss arising from scattering and/or absorption by the sample wells, coupling efficiency of an optical coupler (e.g., a grating coupler configured to receive light from an external light source), optical loss arising from splitting excitation light among multiple waveguides, and coupling efficiency of individual waveguides with multiple sample wells.

To increase the multiplexing capabilities of the integrated device, it can be desirable to increase the number of sample wells in the array to allow for the ability to analyze more samples at any particular time while using the integrated device. As the integrated device is scaled by increasing the number of sample wells, challenges in performance of the integrated device may arise because of one or more of these factors. For example, a row of sample wells may receive light by coupling to a waveguide of the optical system such that as light propagates along the waveguide, the sample wells in the row receive a portion of the light. Optical loss may arise from the individual sample wells scattering and/or absorbing the light, which may cumulatively result in the last sample well in the row (e.g., distal from the optical input end of the waveguide) receiving a lower intensity or electric field strength than the first sample well in the row (e.g., the sample well proximate to the optical input end of the waveguide). Such optical loss may impact the signal-to-noise ratio of the measurements conducted by using the integrated device. As more sample wells are added to an array, these optical losses may lead to further reduction in signal-to-noise ratio, which can impact the quality and reliability of the analysis conducted.

Accordingly, aspects of the present application relate to optical components and particular arrangements to include in an optical system of the integrated device that may allow for improved distribution of light among an array of sample wells. These optical components and arrangements may allow for delivering light in a substantially uniform manner such that individual sample wells, including sample wells within the same row, receive a similar intensity and/or electric field strength. The optical components and arrangements described herein may allow for the implementation of integrated devices having a larger number of sample wells in the array, as well as a desired performance in analyzing samples across the array.

Additional considerations as part of scaling up the number of sample wells in the array may include fabrication costs and constraints. Accordingly, aspects of the present application relate to optical components and systems that take into account fabrication costs and constraints (e.g., by reducing the number or complexity of the fabrication steps) while allowing for the resulting integrated device to achieve a desired optical performance.

While the techniques for an optical system as described in the present application are discussed in connection with delivering excitation light to an array of sample wells, it should be appreciated that one or more of these techniques may be used, alone or in combination, in other contexts that involve distributing light to an array of photonic elements within a photonic device. For example, the techniques of the present application may be implemented in an array of optical components, such as an array of sensors. Additionally, it should be appreciated that the techniques described herein are not limited to the context of analyzing biological or chemical samples, but rather may be implemented in applications where it is desired to distribute light among many photonic elements in a substantially uniform manner.

The optical system of the integrated device may be considered to have the following three sections: (1) a grating coupler which couples light from an external light source (e.g., an excitation light source of the instrument) into waveguides of the integrated device; (2) optical routing network which splits light received from the grating coupler among individual waveguides distributed throughout the integrated device (e.g., through a combination of optical splitters); (3) array waveguides configured to illuminate sample wells in the array of the integrated device. Performance of the integrated device may depend on the optical performance of any one of these sections of the optical system. Accordingly, aspects of the present application relate to one or more of these sections of the overall optical system.

Some aspects of the present application relate to grating coupler configurations that may allow for a desired optical efficiency in coupling light from an external light source into other optical components of the optical system. In some instances, a particular grating coupler configuration may reduce the need to incorporate other optical components that may otherwise act to improve optical efficiency. For example, some grating couplers may allow for a desired optical efficiency to be achieved without having a reflective layer positioned to reflect light that passes through the grating coupler back to the grating coupler, where such a reflective layer may be otherwise needed for other grating couplers to achieve the same desired optical efficiency.

Another aspect that may impact overall performance of the integrated device is the ability to align the external light source to the grating coupler, including the ease of performing the alignment over many iterations of aligning the external light source to multiple integrated devices. In some instances, aligning the external light source to a grating coupler may involve aligning a beam of excitation light within a particular range of angles incident to the grating coupler. Some grating coupler configurations may have little or no fabrication tolerance where fabrication over multiple integrated devices may result in those devices having grating couplers configured to couple with incident light at differing ranges of angles. This little or no fabrication tolerance for these grating coupler configurations may result in challenges when performing alignment of the external light source when the devices are used for analysis by increasing the amount of time needed to perform optical alignment when transitioning from one device to another. The inventors have recognized and appreciated that a grating coupler having multiple layers and/or aperiodic gratings may accommodate a broader range of angles for an incident light beam to be considered aligned with the grating coupler and achieve a desired coupling efficiency, and thus may provide the benefit of being more tolerant of fabrication variation across multiple integrated devices.

In some embodiments, the integrated photonic device may include a grating coupler having asymmetric material structures about a plane substantially parallel to the surface. The material structures may include two or more material layers laterally offset from each other in a direction substantially parallel to the plane. The material structures may be formed by etching, at least partially, one or more layers of the grating coupler. In some embodiments, the material structures may be asymmetric relative to a plane substantially perpendicular to the surface of the integrated photonic device. In some embodiments, the two or more material layers may be in contact with each other. In some embodiments, the two or more materials may be spaced apart from each other by a distance. In some embodiments, the grating coupler is a blazed grating coupler.

In some embodiments, the grating coupler is an apodized grating coupler having material structures spaced apart from each other with a variable fill factor. The material structures may have variable widths. The material structures may be spaces apart from each other by gaps having variable widths. Dielectric material may be formed in the gaps.

Some aspects of the present application relate to waveguide configurations that may allow for illuminating a large number of sample wells, or other photonic elements, in a substantially uniform manner. Such waveguide configurations may allow for an integrated device having more sample wells in individual rows of the sample well array (e.g., more than 2,000 sample wells in a row). The inventors have recognized and appreciated that using multiple waveguides to couple with a row of sample wells may overcome limitations associated with using only a single waveguide to illuminate the row, including reducing the impact of optical losses for the sample wells in the row located distal from the optical input end. Accordingly, some embodiments relate to an integrated device having multiple waveguides configured to optically couple with a row of sample wells. Although the optical coupling techniques are described in connection with a row of sample wells, it should be appreciated that these techniques may be used to optically couple with other arrangements of sample wells (e.g., a column of sample wells).

Some embodiments relate to a row shift waveguide configuration having multiple waveguides configured to optically couple with different groups of sample wells within the same row. In some embodiments, some of the sample wells in the row may be positioned in a transition region between different waveguides and may receive less optical power than other sample wells configured to optically couple with one of the waveguides.

Some embodiments relate to waveguide configurations having a power waveguide and one or more waveguides configured to optically couple with the power waveguide and sample wells in a row. In some embodiments, the one or more waveguides may optically couple with the power waveguide through a power splitter. In some embodiments, a waveguide may be configured to weakly couple with the power waveguide along the length of the waveguide. In such embodiments, the power waveguide may compensate for optical losses as light propagates along the waveguide.

The aspects and embodiments described above, as well as additional aspects and embodiments, are described further below. These aspects and/or embodiments may be used individually, all together, or in any combination of two or more, as the application is not limited in this respect.

II. Integrated Device

A. Overview

A cross-sectional schematic of integrated device 1-102 illustrating a row of pixels 1-112 is shown in FIG. 1-1. Integrated device 1-102 may include coupling region 1-201, routing region 1-202, and pixel region 1-203. As discussed herein, an optical system of the integrated device may include different types of optical components, which may be located within regions 1-201, 1-202, and 1-203 of the integrated device. Coupling region 1-201 may include grating coupler 1-216, which may be configured to receive excitation light (shown by the dashed arrow) and propagate the excitation light to one or more optical components in routing region 1-202. Routing region 1-202 may include an optical routing network configured to split light among multiple waveguides 1-220 configured to propagate light to pixel region 1-203. Pixel region 1-203 may include a plurality of pixels 1-112 having sample wells 1-108 positioned on a surface at a location separate from coupling region 1-201, which is where excitation light (shown by the dashed arrow) couples to integrated device 1-102. Sample wells 1-108 may be formed through metal layer(s) 1-106. One pixel 1-112, illustrated by the dotted rectangle, is a region of integrated device 1-102 that includes a sample well 1-108 and photodetector region having one or more photodetectors 1-110.

FIG. 1-1 illustrates the path of excitation light (shown in dashed lines) through the integrated device by coupling a beam of excitation light to coupling region 1-201 and directing the excitation light to sample wells 1-108. The row of sample wells 1-108 shown in FIG. 1-1 may be positioned to optically couple with waveguide 1-220. Excitation light may illuminate a sample located within a sample well. The sample may reach an excited state in response to being illuminated by the excitation light. When a sample is in an excited state, the sample may emit emission light, which may be detected by one or more photodetectors associated with the sample well. FIG. 1-1 schematically illustrates the path of emission light (shown as the solid line) from a sample well 1-108 to photodetector(s) 1-110 of pixel 1-112. The photodetector(s) 1-110 of pixel 1-112 may be configured and positioned to detect emission light from sample well 1-108. Examples of suitable photodetectors are described in U.S. patent application Ser. No. 14/821,656 titled "INTEGRATED DEVICE FOR TEMPORAL BINNING OF RECEIVED PHOTONS," which is incorporated herein by reference in its entirety. Additional examples of suitable photodetectors are described in U.S. patent application Ser. No. 15/852,571, filed Dec. 22, 2017, titled "INTEGRATED PHOTODETECTOR WITH DIRECT BINNING PIXEL," which is incorporated herein by reference in its entirety. For an individual pixel 1-112, a sample well 1-108 and its respective photodetector(s) 1-110 may be aligned along a common axis (along the y-direction shown in FIG. 1-1). In this manner, the photodetector(s) may overlap with the sample well within a pixel 1-112.

Figures 1, 2:
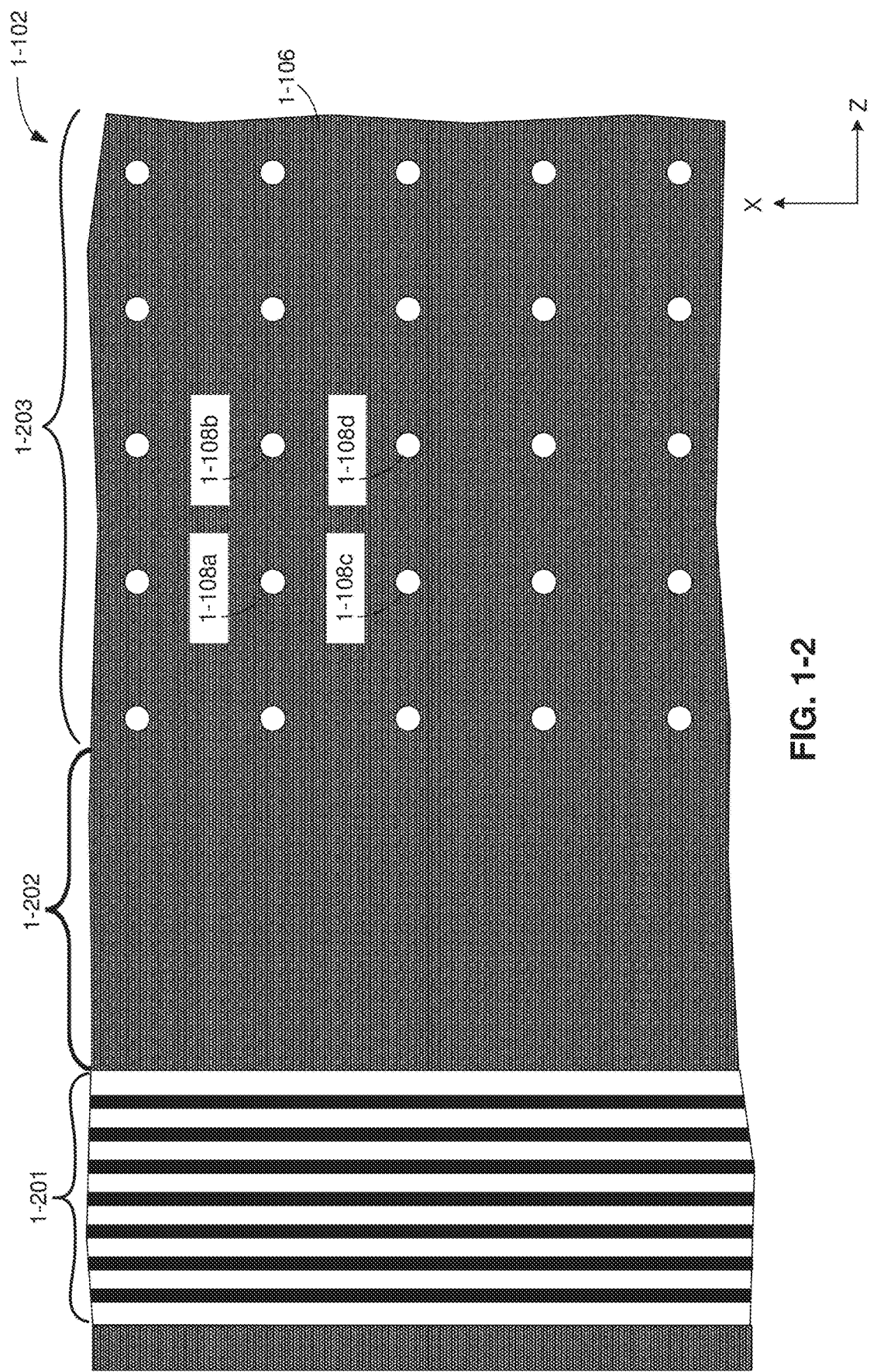

A planar view of integrated device 1-102 illustrating five rows of pixels is shown in FIG. 1-2. As shown in FIG. 1-2, sample well 1-108a and sample well 1-108b are in the same row and sample well 1-108c and sample well 1-108d are in the same row. Aspects of the present application relate to techniques for receiving excitation light incident to coupling region 1-201 and propagating excitation light to the array of sample wells 1-108. These techniques may include having one or more optical grating couplers positioned in coupling region 1-201 and waveguide architecture, positioned in routing region 1-202 and/or pixel region 1-203, for delivering excitation light from the coupling region 1-201 to the individual sample wells 1-108.

B. Waveguide Architecture

Some embodiments relate to an integrated device having one or more tapered waveguides. A tapered waveguide has one or more dimensions that vary along the length of the waveguide and in the direction of light propagation through the waveguide. For example, a waveguide having a varying width along the length of the waveguide may be considered as a tapered waveguide. Characteristics of the light propagating along a tapered waveguide may vary depending on the changing one or more dimensions of the tapered waveguide. In the context of distributing light in a substantially uniform manner among an array of sample wells, a tapered waveguide may be implemented as a technique in providing a similar amount of light intensity among a group of sample wells positioned proximate to the tapered waveguide. In some embodiments of the integrated device, a tapered waveguide may be positioned to couple with a row of sample wells in the sample well array where the tapering of the waveguide is suitably dimensioned to allow for a similar amount of light intensity at the individual sample wells in the row. The tapered waveguide may evanescently couple with sample wells in the row and the width of the waveguide may be tapered to provide a weaker evanescent field closer to the light input end of the waveguide and a stronger evanescent field distal for the light input end of the waveguide. Such a waveguide configuration may allow for a more uniform excitation intensity delivered among the row of sample wells by the waveguide than if a waveguide having a constant width were used.

Figures 1A, 5:
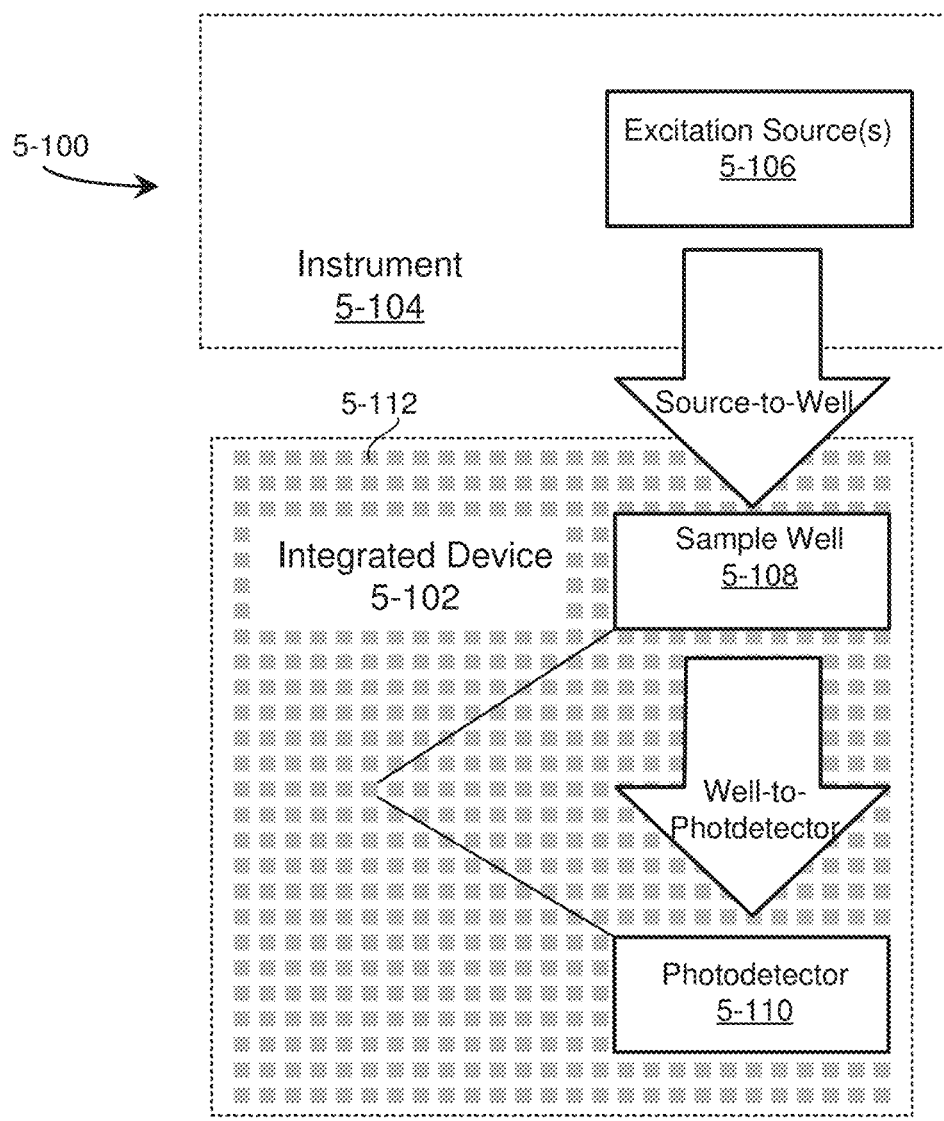
Figures 1B, 5:
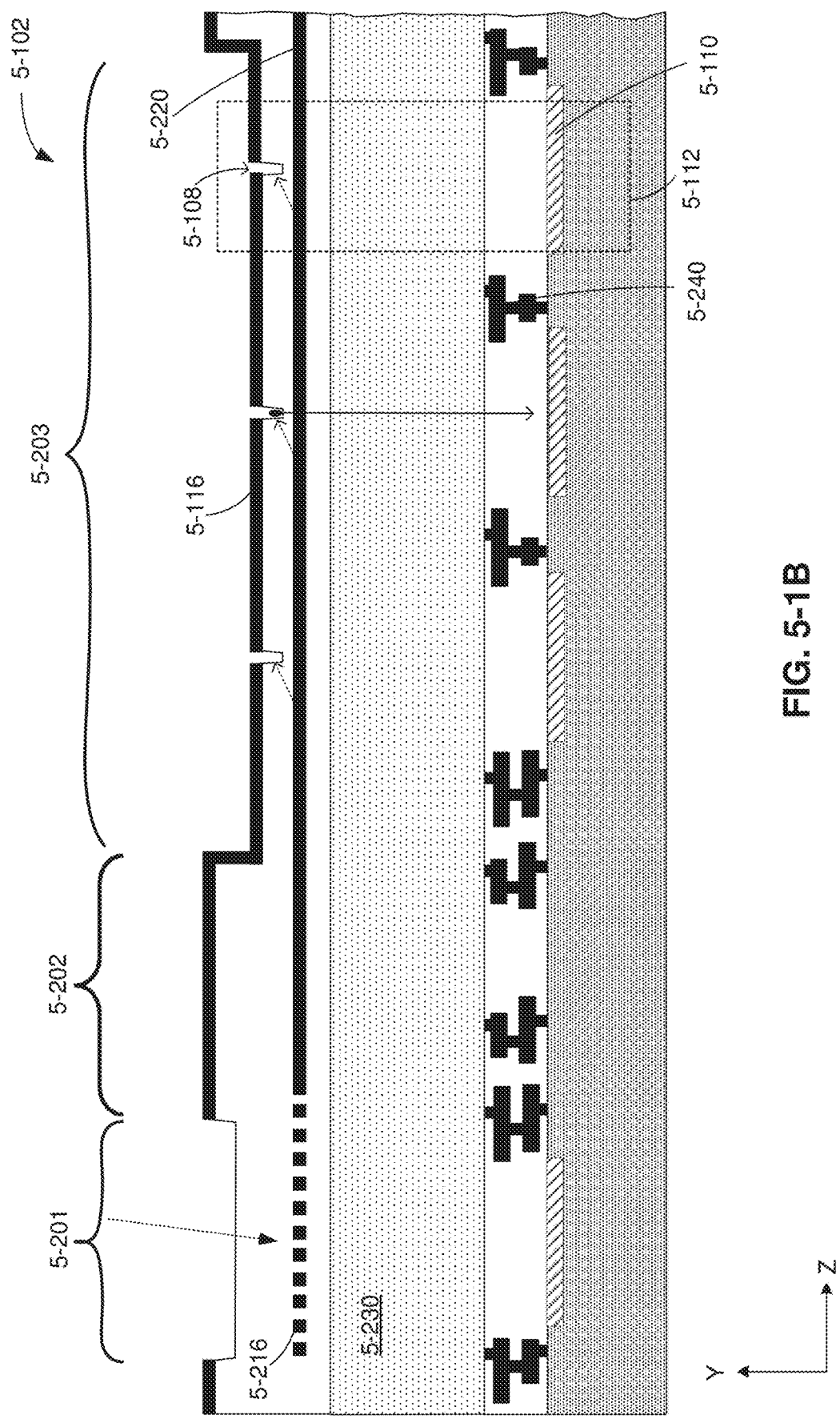
Figures 2, 5:
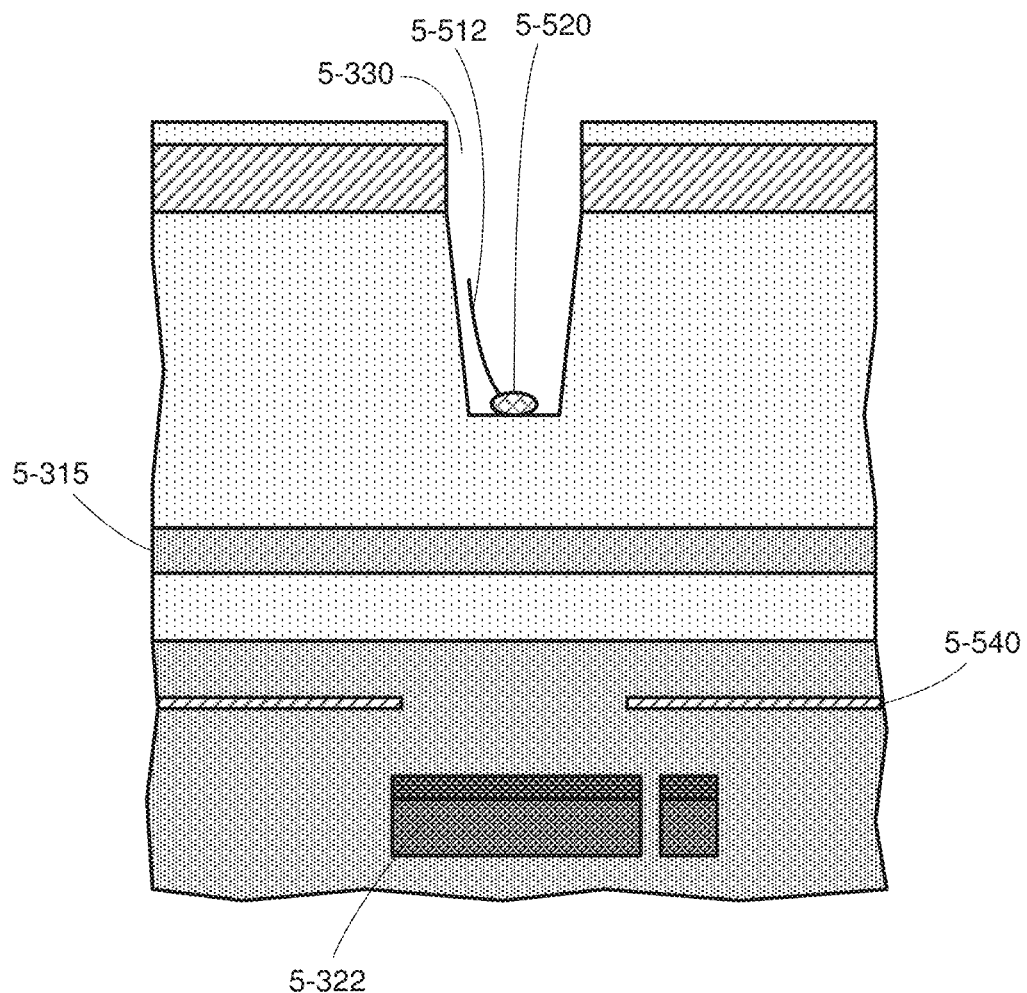
Figures 3, 5:
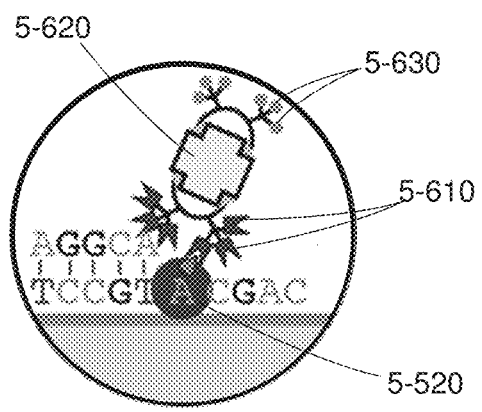
Figures 4, 5:
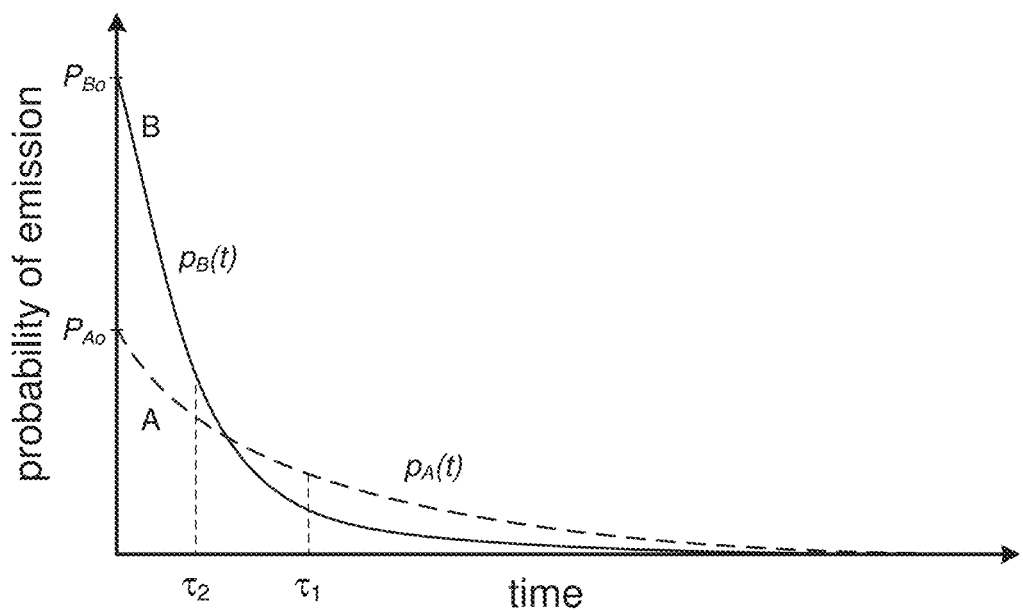
Figure 5:
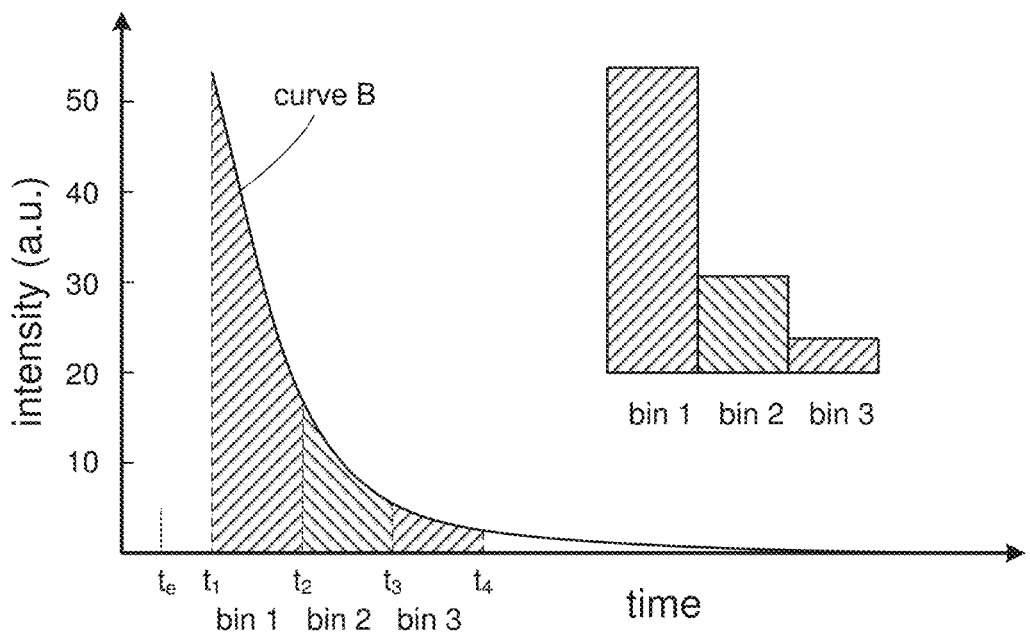
Figures 5, 6:
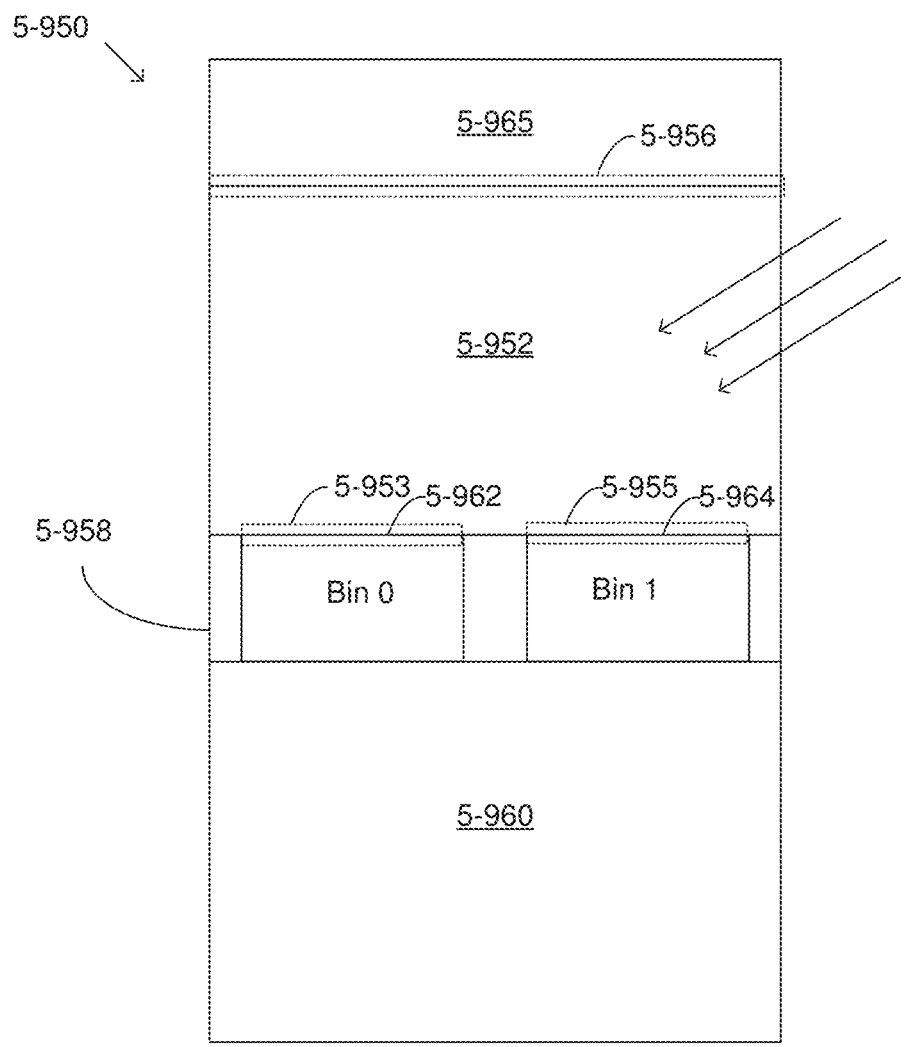
Figures 5, 6, 7, 7A:
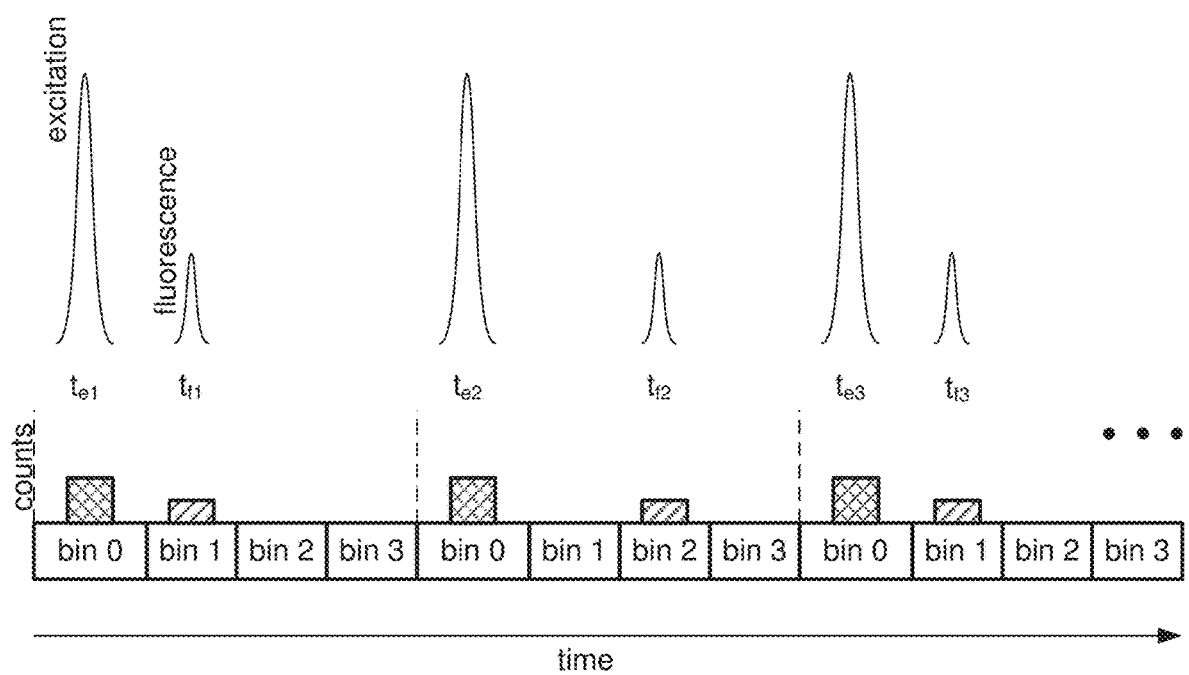
Figures 5, 6, 7, 8, 8A:
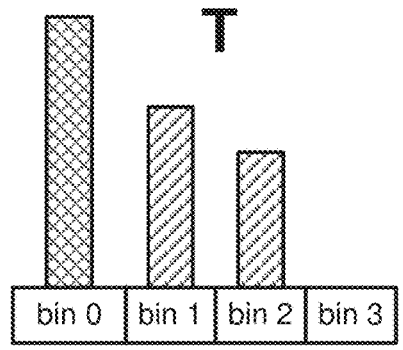
Figures 5, 6, 7, 7B:
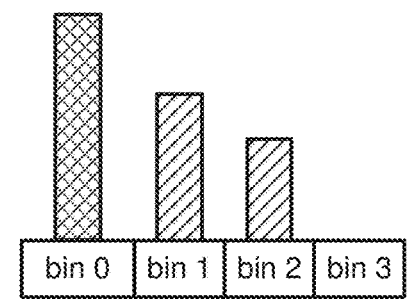
Figures 5, 6, 7, 8, 8B:
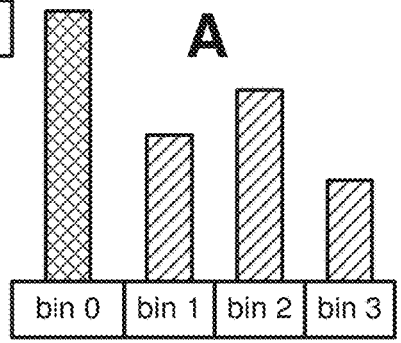
Figures 5, 6, 7, 8, 8C:
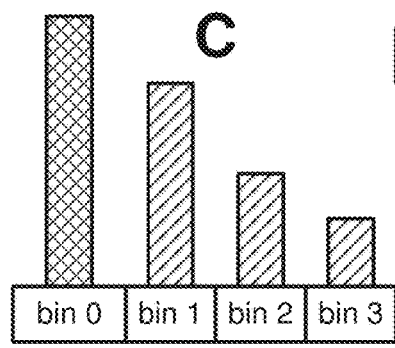
Figures 5, 6, 7, 8, 8D:
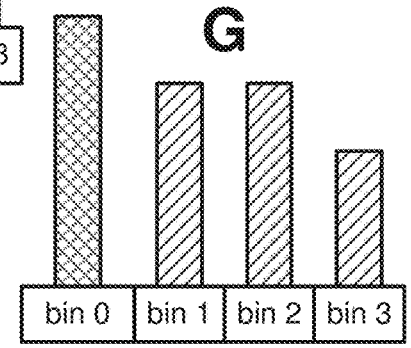

FIG. 2-1A illustrates a planar view of sample wells, including sample wells 1-108e and 1-108f, in a row along tapered waveguide 2-220 where light is input to waveguide 2-220 at the side corresponding to the arrow shown in FIG. 2-1A and propagates along the z-direction. As shown in FIG. 2-1A, the width of tapered waveguide 2-220 varies along the row of sample wells where waveguide 2-220 has a larger width proximate to the input side (closer to the arrow) than distal from the input side. Accordingly, sample well 1-108e is positioned over a region of waveguide 2-220 that has a larger width than the region of waveguide 2-220 that sample well 1-108f is positioned over. FIG. 2-1B is a cross-sectional view of the row of sample wells 1-108 shown in FIG. 2-1A and illustrates how the optical mode profile varies along the length of tapered waveguide 2-220 (along the z-direction). The varying optical mode profiles impact the amount of intensity that reaches an illumination region proximate to the bottom of a sample well as light propagates along tapered waveguide 2-220. In particular, the larger width of tapered waveguide 2-220 proximate to sample well 1-108e provides less intensity within an illumination region of sample well 1-108e while the smaller width of tapered waveguide 2-220 proximate to sample well 1-108f has more intensity within an illumination region of sample well 1-108f. In some embodiments, one or more characteristics of top cladding layer 2-222 (e.g., thickness, material) may impact the taper shape of waveguide 2-220.

Additionally, a tapered waveguide may have a configuration that accounts for optical loss along the length of the waveguide, including optical loss associated with absorption and scattering by the sample wells positioned proximate to the waveguide. In some embodiments, the configuration of the tapering of the waveguide may provide a desired power efficiency across the sample well array such that variation in the intensity of the light received by the sample wells arising from optical power loss as light propagates along the waveguide is reduced or prevented. Such configurations may allow for the optical power loss to be effectively removed as a factor contributing to non-uniform delivery of excitation light across the sample well array.

In particular, the power in a waveguide decreases as according to the function $$\frac{dP}{dz} = -\alpha P$$

where the propagation loss a is a function of the waveguide width, top cladding configuration (e.g., top cladding thickness, material), and the sample well configuration (e.g., depth of sample well). Additionally, the intensity within an illumination region of the sample well depends on the waveguide width, top cladding configuration (e.g., top cladding thickness, material) and sample well configuration (e.g., depth of sample well). In determining a taper shape for a tapered waveguide, the dimension of the waveguide at a particular position may depend on the power loss associated with prior sample wells and the waveguide width needed to achieve a desired intensity at the position. In some embodiments, tapered waveguide 2-220 may have a nonlinear taper shape. In such embodiments, the waveguide width may be bounded by a maximum value and a minimum value and the variation in width along the waveguide may vary nonlinearly to achieve substantially uniform intensity among all the sample wells that couple to the waveguide. In some embodiments, tapered waveguide 2-220 may have a linear shape where the width of the waveguide varies linearly between a maximum value and a minimum value to achieve substantially uniform intensity among all the sample wells that couple to the waveguide.

According to some embodiments described herein, "substantially uniform intensity" may be determined for a particular waveguide by relating the highest intensity received by a sample well positioned to couple with the waveguide and the lowest intensity received by a sample well positioned to couple with the waveguide. In some embodiments, "substantially uniform intensity" for a group of sample wells that couple to a waveguide may correspond to the ratio of the highest intensity to the lowest intensity received by sample wells in the group being approximately equal to 1 (e.g., equal to 1±5%, equal to 1±10%).

Figures 2, 3:
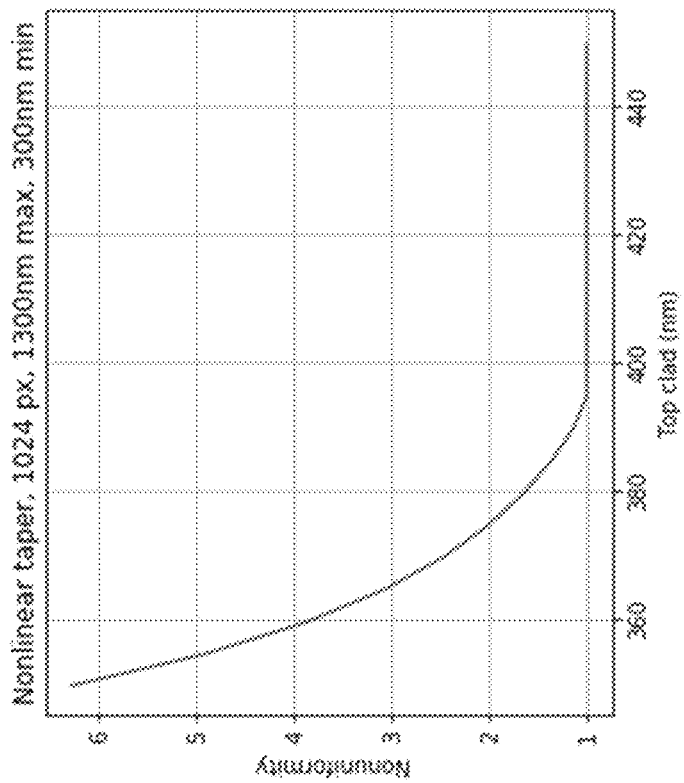
Figure 2:
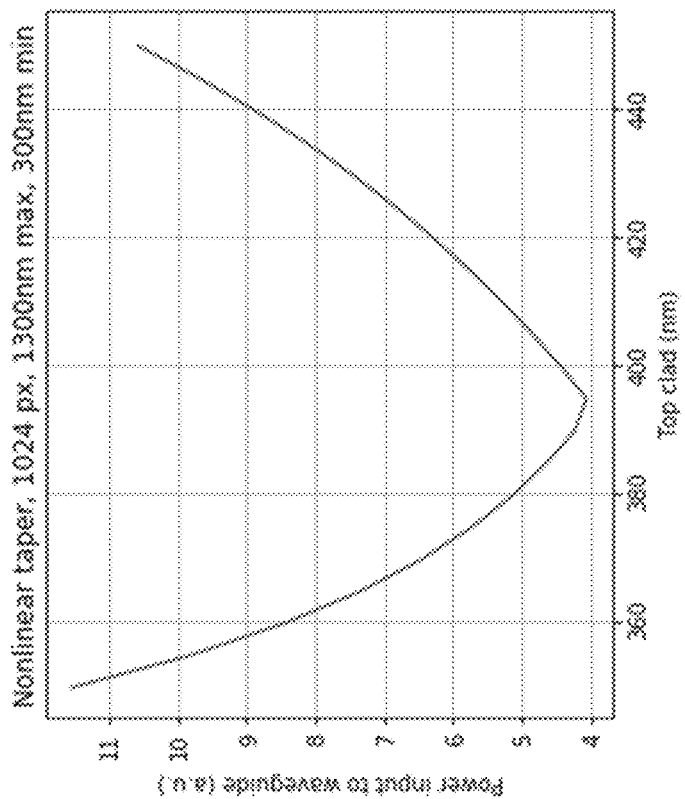

The thickness of top cladding layer 2-222 may impact the degree of uniformity in intensity received by sample wells in a row. FIGS. 2-2 and 2-3 show simulation results where the top cladding thickness is varied and a waveguide having a nonlinear taper is designed to achieve a minimum of relative intensity for a row of 1024 sample wells. The waveguide has a thickness of 120 nm, a minimum width value of 300 nm, and a maximum width value of 1300 nm. The sample wells have a depth of 300 nm. FIG. 2-2 shows a plot of power input to the waveguide needed to achieve the minimum relative intensity across all 1024 sample wells versus the top cladding thickness. The plot shown in FIG. 2-2 illustrates how there is an optimal value for the thickness of top cladding layer 2-222 between 380 nm and 400 nm where the input power to the waveguide is at a minimum. FIG. 2-3 shows a plot of the amount of nonuniformity in intensity along the row of sample wells versus the top cladding thickness where nonuniformity corresponds to the ratio of the highest intensity at a sample well to the lowest intensity at a sample well. A nonuniformity value equal to 1 corresponds to the highest intensity and lowest intensity values being equal, and thus a scenario where there is uniform intensity at all the sample wells in the row. Turning to both FIGS. 2-2 and 2-3, there is a balance between the input power, top cladding thickness, and nonuniformity. In particular, when the top cladding layer is thicker than its optimal value, a nonuniformity equal to 1 can be achieved but at a higher input power than if the top cladding thickness was at its optimal value.

Figures 2, 3, 4:
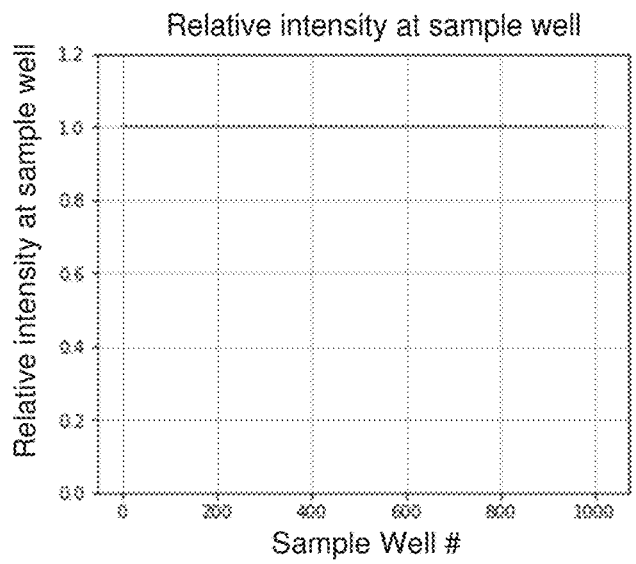

FIGS. 2-4, 2-5, and 2-6 show simulation results for a tapered waveguide configured for a row of 1024 sample wells with a top cladding thickness layer of 395 nm. FIG. 2-4 is a plot of relative intensity versus sample well number and shows how the relative intensity at individual sample wells is uniform across all the sample wells. FIG. 2-5 is a plot of power in the waveguide versus sample well number in a row and shows how the optical power decreases along the row of sample wells. FIG. 2-6 is a plot of waveguide width versus sample well number in a row and shows the tapering profile of the waveguide used to obtain the uniform intensity shown in FIG. 2-4.

The length of the waveguide and the number of sample wells in the row are additional parameters that may impact the uniformity of intensity distributed among a row of sample wells. FIGS. 2-7 and 2-8 show simulation results for tapered waveguides designed to have uniform intensity for different numbers of sample wells in a row. Specifically, FIG. 2-7 is a plot of power input to the waveguide versus the number of sample wells per row and FIG. 2-8 is a plot of row efficiency, corresponding to the number of sensors per unit power, versus the number of sample wells per row. As shown in FIG. 2-7, the input power increases with increasing number of sample wells in the row. FIG. 2-8 illustrates how the efficiency decreases with increasing number of sample wells in the row.

While the use of tapered waveguides in the integrated device may provide some benefits in delivering excitation light among the sample wells in a substantially uniform manner, there can be limitations in using tapered waveguides as the integrated device is scaled by increasing the number of sample wells. As discussed in connection with FIGS. 2-7 and 2-8, as the number of sample wells in a row increases more power input to the waveguide is needed and the row efficiency decreases. The inventors have recognized and appreciated that using multiple waveguides to couple with a row of sample wells may overcome such limitations associated with only using a tapered waveguide. Using multiple waveguides may allow for a longer row of sample wells to have a substantially uniform intensity than would otherwise be achieved using a single tapered waveguide. Accordingly, some embodiments relate to an integrated device having multiple waveguides configured to optically couple with a row of sample wells. These configurations may be used in combination with tapered waveguides, according to some embodiments. In such embodiments, the multiple waveguides that optically couple with a single row of sample wells may be tapered at least within a region where the waveguide couples with a subset of the sample wells in the row. Such a configuration may allow for rows having a higher number of sample wells to receive a similar intensity than if a single waveguide was used.

In some embodiments of the integrated device, a first waveguide is positioned to optically couple with a first group of sample wells in a row and a second waveguide is positioned to optically couple with a second group of sample wells in the row. Between the first and second groups of sample wells, the first and second waveguides may shift in positioning with respect to the row of sample wells. Such a configuration may be considered as having a waveguide "row shift" between the first and second groups of sample wells. The location of the row shift may correspond to when the coupling efficiency of the first waveguide with the row of sample wells or power propagating within the first waveguide lowers to a certain amount such that performance of the device is impacted. Using a second waveguide to continue with delivering light to subsequent sample wells in the row removes these limitations of only using the first waveguide. Additional waveguides may be included and positioned to optically couple with additional groups of sample wells in the same row. This configuration of waveguides may be implemented in the other rows in the sample well array and be used to increase the number of sample wells in the array, such as by increasing the number of sample wells in individual rows.

FIG. 3-1 is a planar view of an integrated device illustrating a row shift waveguide configuration where multiple waveguides are used to deliver light to individual rows of sample wells. The direction of light input to the waveguides is shown by the arrow and is in the z-direction. FIG. 3-1 shows three rows of sample wells, including a row having sample wells 3-108a, 3-108b, and 3-108c and a row having sample wells 3-108d, 3-108e, and 3-108f, where three waveguides are positioned to optically couple (e.g., evanescently couple) with three different groups of sample wells in the rows. For example, waveguide 3-220a is positioned to optically couple with sample well 3-108a while waveguide 3-220b is positioned to optically couple with sample well 3-108c. As another example, waveguide 3-220d is positioned to optically couple with sample well 3-108d while waveguide 3-220e is positioned to optically couple with sample well 3-108f. Optical coupling of the waveguides may occur through evanescently coupling where a waveguide is positioned below the sample well, such as shown by waveguide 1-220 in FIG. 1-1, at a suitable distance for the sample well to receive a portion of the optical mode propagating along the waveguide. According to some embodiments, waveguide 3-220a may be positioned to evanescently couple with sample well 3-108a and the other sample wells in the same row within region 3-110 and waveguide 3-220b may be positioned to evanescently couple with sample well 3-108c and the other sample wells in the same row within region 3-114. Additional waveguides may be used in delivering light to subsequent sample wells in the same row. For example, FIG. 3-1 shows waveguides 3-220c and 3-220f which may couple with additional sample wells that are not present in the view shown in FIG. 3-1. In particular, waveguide 3-220c may couple with sample wells in the same row as sample well 3-108c and waveguide 3-220e may couple with sample wells in the same row as sample well 3-108f after an additional row shift region follows region 3-114.

Sample wells in the same row may correspond to sample wells substantially aligned along a common axis. For a particular row, the group of sample wells in region 3-110 may be substantially aligned along an axis. As shown in FIG. 3-1, sample wells 3-108a, 3-108b and 3-108c are aligned along an axis (in the z-direction) and considered to be in the same row. The waveguides may be positioned relative to the axis. In some embodiments, a portion of a waveguide configured to couple with a group of sample wells may be substantially parallel to the axis, and multiple waveguides may optically couple with different groups of sample wells and be substantially parallel to the axis at different portions along a row of sample wells. As shown in FIG. 3-1, waveguide 3-220a is substantially parallel to an axis along sample wells 3-108a, 3-108b, and 3-108c within region 3-110 and waveguide 3-220b is substantially parallel to the axis within region 3-114.

The spacing between waveguides may be such that the waveguides are effectively optically uncoupled from one another. In some embodiments, one waveguide may be separated from another waveguide such that there is no or little evanescent coupling between the two waveguides. In some embodiments, the lateral distance between the two waveguides may depend on the optical mode size the waveguides are configured to have.

The waveguide configuration shown in FIG. 3-1 has regions 3-110, 3-112, and 3-114. Region 3-110 is where a first waveguide, such as waveguide 3-220a, optically couples with a first group of sample wells in a row, such as sample well 3-108a, delivering light to the first group of sample wells. Region 3-114 is where a second waveguide, such as waveguide 3-220b, optically couples with a second group of sample wells in the row, such as sample well 3-108c, delivering light to the second group of sample wells. Region 3-112 corresponds to where the row shift between the first and second waveguides occurs. As shown in FIG. 3-1, the row shift configuration includes curving the waveguides such that the first waveguide is not positioned to optically couple with sample wells in the row while the second waveguide is positioned to optically couple with sample wells in the row. The row shift configuration results in a distance between the first waveguide and a sample well in region 3-110 being less than a distance between the first waveguide and a sample well in region 3-112. The row shift configuration further results in a distance between the second waveguide and a sample well in region 3-114 being less than a distance between the second waveguide and a sample well in region 3-112. For example, waveguides 3-220a and 3-220d are curved in region 3-112 to be offset (along the x-direction) from their respective rows of sample wells, where the offset increases along the direction of light propagation through the waveguides. Additionally, waveguides 3-220b and 3-220e are curved in region 3-112 and offset (along the x-direction) from their respective rows of sample wells, but the offset decreases along the direction of light propagation through the waveguides to position waveguides 3-220b and 3-220e in closer proximity to the sample well rows. The row shifting profile in region 3-112 may have any suitable profile and/or length. Although the waveguides shown in FIG. 3-1 have a similar row shift profile in region 3-112, it should be appreciated that some embodiments may involve waveguides that couple to the same row having different profiles within region 3-112.

In some embodiments, a region of a waveguide configured to optically couple with sample wells in a row may be tapered, such as by using the techniques described herein, to achieve substantially uniform intensity for the group of sample wells the waveguide couples to in that region. As shown in FIG. 3-1, waveguide 3-220a is tapered within region 3-110 and waveguide 3-220b is tapered with region 3-114.

The integrated device may include one or more optical components (e.g., optical splitters located within routing region 1-202 shown in FIG. 1-1) to provide input power into the individual waveguides. In some embodiments, the input power may be substantially the same across all the waveguides. The inventors have recognized and appreciated that waveguides not optically coupled with a group of sample wells in a row may experience some optical loss as light propagates through this region. Accordingly, some embodiments may have a configuration that reduces such optical loss by varying one or more characteristics of the waveguides in regions where the waveguides optically couple to respective sample wells. For example, the portion of waveguide 3-220b in region 3-110 may have a configuration to reduce optical loss, but still may deliver a lower amount of power when waveguide 3-220b optically couples to sample wells in region 3-114 than when waveguide 3-220a optically couples to sample wells in region 3-110. Accordingly, the tapering of the waveguides delivering light to a row of sample wells may differ to account for this variation in optical power when the waveguides are used to couple to the sample wells. In some embodiments, the length of the tapered portion of a first waveguide in region 3-110 may differ from the length of the tapered portion of a second waveguide in region 3-114. The length of a tapered portion may correspond to the number of sample wells that a particular waveguide is used to deliver light to within that tapered region of the waveguide. In some embodiments, the length of the tapered portion of a second waveguide in region 3-114 may be shorter than the length of the tapered portion of the first waveguide in region 3-110. Such a configuration may account for the second waveguide having a lower optical power in region 3-114 than the first waveguide in region 3-110. For example, FIG. 3-1 shows tapered portion of waveguide 3-220a in region 3-110 coupling with six sample wells, which may correspond to the length of the tapered portion of waveguide 3-220a, while the tapered portion of waveguide 3-220b in region 3-114 is shown to couple with five sample wells. It should be appreciated that the tapered portions of first and second waveguides may couple with more or less sample wells than what is shown in FIG. 3-1.

In some embodiments, sample wells within a row located where row shifting of waveguides occurs may not optically couple with a waveguide or have a lower amount of optical coupling with a waveguide, in comparison to other sample wells in the row. Thus, the sample wells located within the row shifting region of the sample well array may receive a lower amount of optical power. During operation of the integrated device in performing an analysis of a sample, these sample wells may be excluded from the results of the analysis because the quality of the results obtained by these sample wells may be impacted by an insufficient ability to illuminate a sample with a desired amount of light (e.g., a particular intensity). As shown in FIG. 3-1, the group of sample wells in region 3-112 may receive less optical power than a sample well in region 3-110 or a sample well in 3-114 of the same row. This is because a sample well positioned in region 3-112 may not optically couple with, or not optically couple at a desired efficiency with, the corresponding first or second waveguide for the row. For example, region 3-112 includes sample well 3-108b, which may receive a lower amount of optical power in comparison to sample wells in regions 3-110 and 3-114, such as sample wells 3-108a and 3-108c, because sample well 3-108b is offset from both waveguides 3-220a and 3-220b. Similarly, region 3-112 includes sample well 3-108e, which may receive a lower amount of optical power in comparison to sample wells 3-108d and 3-108f. Accordingly, data obtained from using sample wells 3-108b and 3-108e during operation of the integrated device may be excluded from the overall results.

A waveguide array having a row shift configuration, such as shown in FIG. 3-1, may be implemented in an integrated device in combination with one or more other components described herein. In some embodiments, an integrated device having a row shift waveguide configuration may include a grating coupler configured to receive light from a surface of the integrated device and optically couple with the waveguides. In the context of FIG. 3-1, the grating coupler may be positioned on the left (in the negative z-direction) to provide light in the direction of the arrow shown in FIG. 3-1. In some embodiments, an integrated device having a row shift waveguide configuration may include one or more photodetectors configured to receive light emitted from a sample well in the same pixel as the one or more photodetectors. For example, the pixel having sample well 3-108a may include one or more photodetectors positioned and configured to receive light emitted from sample well 3-108a. The pixel may have a cross-section configurational as shown by pixel 1-112 in FIG. 1-1.

The inventors have recognized and appreciated that array waveguide configurations having a waveguide per row of sample wells that acts as a source of optical power and optically couples to one or more other waveguides that are positioned to optically couple with sample wells in the row may provide certain benefits. The waveguide acting as source of optical power may be considered as a "power waveguide." One benefit of such configurations is that the overall footprint of the array waveguides may be reduced, which may provide advantages in configuring integrated devices where the distance between rows of sample wells are small and may not accommodate multiple waveguides positioned between rows of sample wells. Accordingly, some embodiments of the integrated device may include power waveguides associated with individual rows of the sample well array and one or more waveguides that optically couple with one or more power waveguides and sample wells in the corresponding row. In some embodiments, the one or more other waveguides may optically couple with the power waveguide through an optical splitter (e.g., a directional coupler). In some embodiments, a row of sample wells has a waveguide that acts as a continuous coupler that optically couples with the power waveguide associated with the row and optically couples with sample wells in the row.

FIG. 3-2 is a planar view of an integrated device having an array waveguide configuration that includes, for a row of sample wells, a power waveguide and multiple waveguides positioned to optically couple with different groups of sample wells in the row. Sample wells 3-208a and 3-208b are in the same row, and waveguide 3-230a acts as a power waveguide for the row. Similarly, sample wells 3-208c and 3-208d are in a different row, and waveguide 3-230b acts as a power waveguide for the row. The direction of light propagation along the power waveguides is shown by the arrow in FIG. 3-2. Along a power waveguide, individual waveguides couple with the power waveguide and are positioned to optically couple with a group of sample wells in a row. In FIG. 3-2, waveguides 3-240a and 3-240b are configured to optically couple with power waveguide 3-230a and deliver light to sample wells in the row having sample wells 3-208a and 3-208b. In some embodiments, waveguides 3-240a and 3-240b are tapered to provide a substantially uniform intensity for the sample wells that optically couple with these waveguides, such as by using the tapered waveguides described herein. As shown in FIG. 3-2, sample well 3-208a is configured to optically couple with a region of waveguide 3-240a having a larger width than the region of waveguide 3-240a that sample well 3-208b optically couples with. Similarly, sample well 3-208f is configured to optically couple with a region of waveguide 3-240b having a larger width than the region of waveguide 3-240*b* that sample well 3-208*g* optically couples with. In addition, sample wells 3-208*c* and 3-208*d*, which are in a different row as sample wells 3-208*a* and 3-208*b*, are configured top optically couple with different regions of waveguide 3-240*c* having different widths. In particular, sample well 3-208*c* is configured to optically couple with a region of waveguide 3-240*c* having a larger width than the region of waveguide 3-240*c* that sample well 3-208*d* optically couples with.

Power waveguides 3-230*a* and 3-230*b* may have a configuration that reduces optical loss as light propagates along the waveguide, such as by having a substantially uniform width along the length of the waveguide. As shown in FIG. 3-2, waveguides 3-240*a* and 3-240*b* may optically couple with power waveguide 3-230*a* via power splitters 3-250*a* and 3-250*b*, respectively. In addition, waveguides 3-240*c* and 3-240*d* may optically couple with power waveguide 3-230*b* via one or more power splitters. Examples of suitable power splitters include directional couplers, multimode interference splitters, or any other suitable power splitting optical component. In embodiments where directional couplers are used as power splitters, the configuration of a directional coupler can be configured for a particular power splitting ratio to achieve a desired relative amount of optical power that is input into a waveguide that optically couples with a group of sample wells.

In some embodiments, individual power splitters that optically couple with a power waveguide may have a similar splitting ratio. With reference to FIG. 3-2, power splitter 3-250*a* and power splitter 3-250*b* may have the same splitting ratio with power waveguide 3-230*a*. In such cases, waveguide 3-240*b* is configured to receive less optical power than waveguide 3-240*a* as light propagates along 3-230*a* because power waveguide 3-230*a* couples with power splitter 3-250*a* before power splitter 3-250*b*. In such embodiments, waveguides 3-240*a* and 3-240*b* may have different tapered shapes to accommodate the differences in input power such that sample wells configured to optically couple with waveguides 3-240*a* and 3-240*b* receive substantially similar intensities, and thus the different tapered shapes of waveguides 3-240*a* and 3-240*b* may account for the differences in optical power received by waveguides 3-240*a* and 3-240*b* from power splitter 3-230*a* via power splitters 3-250*a* and 3-250*b*. For example, waveguide 3-240*b* may have a shorter taper length than waveguide 3-240*a* to account for receiving a lower input power from power waveguide 3-230*a*.

In some embodiments, individual power splitters that optically couple with a power waveguide may have different splitting ratios such that the waveguides that optically couple with sample wells receive a substantially similar input power. With reference to FIG. 3-2, power splitter 3-250*a* and power splitter 3-250*b* may have different splitting ratios with power waveguide 3-230*a* such that a similar amount of optical power couples to waveguides 3-240*a* and 3-240*b*. In such embodiments, waveguides 3-230*a* and 3-230*b* may have a similar tapered shape to allow the sample wells that optically couple with waveguides 3-230*a* and 3-230*b* receive substantially similar intensities.

Some embodiments may include a transition region between individual waveguides that optically couple to sample wells within a row. Sample wells located within the transition region may not be positioned to optically couple with one of the waveguides or receive a similar amount of optical power as other sample wells in the row outside the transition region. As shown in FIG. 3-2, sample well 3-208*e* is an example of a sample well located within a transition region between waveguides 3-240*a* and 3-240*b*. Sample well 3-208*e* may receive a lower amount of optical power than sample wells 3-208*a* and 3-208*b*. In such cases, any data obtained using sample well 3-208*e* may be excluded from analysis because it receives a lower amount of excitation light in comparison to other sample wells, such as sample wells 3-208*a* and 3-208*b*.

In some embodiments, the integrated device may include a power waveguide configured to deliver optical power to more than one row of sample wells. FIG. 3-3 is planar view of an integrated device having power waveguide 3-330*a* configured to deliver light to the two rows of sample wells adjacent to power waveguide 3-330*a*. In particular, power waveguide 3-330*a* is configured to optically couple with the row of sample wells that includes sample wells 3-308*a* and 3-308*b* and the row of sample wells that includes sample wells 3-308*c* and 3-308*d*. As in the configuration shown in FIG. 3-3, sample wells in these two rows may optically couple to power waveguide 3-330*a* through a combination of waveguides and power splitters. Waveguide 3-340*a* is positioned to optically couple with sample wells 3-308*a* and 3-308*b* and may optically couple to power waveguide 3-330*a* via a power splitter. Waveguide 3-340*b* is positioned to optically couple with sample wells 3-308*c* and 3-308*d* and may optically couple to power waveguide 3-330*a* via a power splitter. The waveguides and power splitters described in connection with FIG. 3-3 may be used for waveguides 3-340*a* and 3-340*b* and the power splitters used to couple these waveguides to power waveguide 3-330*a*. Similarly, power waveguide 3-330*b* is configured to deliver light to the row of sample wells that includes sample wells 3-308*e* and 3-308*f*, and to the row of sample wells that includes 3-308*g* and 3-308*h*. In particular, waveguide 3-340*c* is positioned to optically couple with power waveguide 3-330*b* and sample wells 3-308*e* and 3-308*f*, and waveguide 3-340*d* is positioned to optically couple with power waveguide 3-330*b* and sample wells 3-308*g* and 3-308*h*.

In some embodiments, a waveguide positioned to optically couple with sample wells in a row may be connected to a power waveguide, such as through an end of the power waveguide. For example, in waveguide configurations where there is a series of waveguides configured to optically couple with a row of sample wells and light is optically coupled to the series of waveguides through a power waveguide, the waveguide in the series distal from the light input end of the power waveguide may be directly connected to the power waveguide, such as through an optical connection. In such a configuration, light propagating along the power waveguide may be delivered to the waveguide by propagating through the optical connection. FIG. 3-4 is a planar view of a waveguide configuration having power waveguide 3-430 where the arrow shows the direction of light input to power waveguide 3-430. Waveguides 3-440*a*, 3-440*b*, 3-440*c*, and 3-440*d* are configured to optically couple with a row of sample wells having sample wells 3-408*a*, 3-408*b*, 3-408*c*, and 3-408*d*. Waveguides 3-440*a*, 3-440*b*, and 3-440*c* optically couple with power waveguide 3-430 through power splitters 3-450*a*, 3-450*b*, and 3-450*c*, respectively. Waveguide 3-440*d* is connected with power waveguide through optical connection 3-460. Optical connection 3-460 may have any suitable size and shape to direct light output from power waveguide 3-430 to waveguide 3-440*d*.

Some embodiments may include a power waveguide having a varying width along its length. As shown in FIG. 3-4, power waveguide 3-430 has a width that narrows within a region where power waveguide 3-430 optically couples with power splitters 3-450a, 3-450b, and 3-450c. The width of power waveguide 3-430 is larger in regions between power splitters 3-450a, 3-450b, and 3-450c than in a region that overlaps with power splitters 3-450a, 3-450b, and 3-450c.

It should be appreciated that power waveguides, power splitters, and waveguides optically coupling to sample wells within a particular row may be suitably configured to accommodate optical losses experienced by light propagating through the waveguide configuration. By way of example, in the waveguide configuration shown in FIG. 3-4, power splitters 3-450a, 3-450b, and 3-450c may be configured to have power splitting ratios of 22%, 30%, and 48%, respectively. If power waveguide 3-430 has approximately a 10% power loss between individual waveguides 3-440a, 3-440b, 3-440c, and 3-440d, then the relative input power to power waveguide 3-430 needed to illuminate all the sample wells in the row is 4.70. If waveguides 3-440a, 3-440b, 3-440c, and 3-440d are each used to deliver light to 512 sample wells, then the input power is approximately 7.5 a.u. (arbitrary units). In such an example, the row efficiency corresponding to the number of sample wells per unit power is approximately 273. This configuration for illuminating a total to 2048 sample wells (512 sample wells for each of the four waveguide) is in contrast to using a single tapered waveguide used to illuminate all 2048 samples. In the single tapered waveguide configuration, the input power into the tapered waveguide is approximately 16.8 a.u. and the row efficiency is approximately 122. This example illustrates how the configuration shown in FIG. 3-4 may provide increased coupling efficiency within a sample well array while decreasing the necessary input power.

Some embodiments relate to a waveguide configuration having a power waveguide configured to optically couple with another waveguide along the length of the power waveguide where the other waveguide is configured to optically couple with sample wells within a row. In some embodiments, the other waveguide and the power waveguide are configured to evanescently couple with each other. The other waveguide may be positioned relative to the power waveguide to achieve a desired coupling strength such that the waveguide delivering light to the row of sample wells has a substantially uniform power along the length of the waveguide. In this manner, the power waveguide is configured to compensate for optical losses experienced by the other waveguide, which is configured to provide a similar intensity to the sample wells it optically couples with. Since the other waveguide optically couples with the power waveguide along the length of the power waveguide, the waveguide may be considered to be a "continuous coupler" waveguide. According to some embodiments, the continuous coupler waveguide may be configured to weakly couple with the power waveguide over a length in the range of 1 mm to 10 mm, or any value or range of values in that range.

Figures 2, 3, 4, 5:
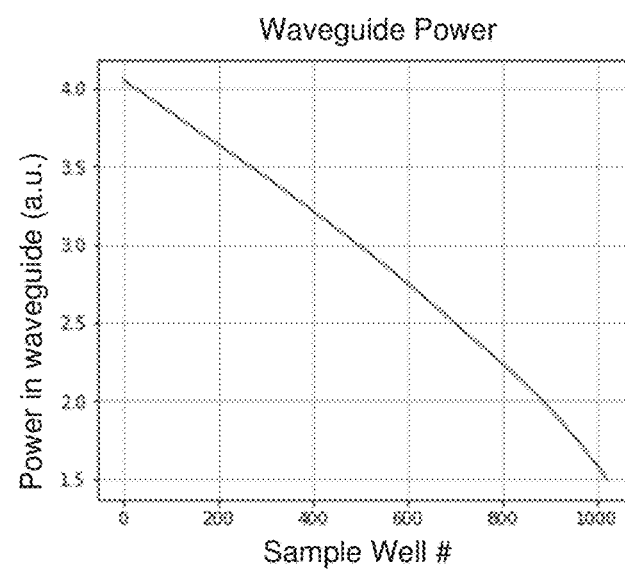

FIG. 3-5 is a planar view of an integrated device having a waveguide configuration that includes a power waveguide and a continuous coupler waveguide for individual sample well rows. Power waveguide 3-530 is configured to optically couple with waveguide 3-540, which optically couples with sample wells in a row having sample well 3-508. The arrow shows the direction of light input to power waveguide 3-530. Waveguide 3-540 is configured to optically couple with power waveguide 3-530 along the length of waveguide 3-540. In some embodiments, power waveguide 3-530 and waveguide 3-540 evanescently couple with each other along the length of waveguide 3-540. In particular, the coupling strength between power waveguide 3-530 and waveguide 3-540 is configured to compensate for optical loss experienced by waveguide 3-540 as light propagates along waveguide 3-540 and couples to the sample wells in the row. For example, waveguide 3-540 has a higher propagation loss than power waveguide 3-530 due to losses arising from the sample wells acting as light scatters along the waveguide. In some embodiments, power waveguide 3-530 may be configured to have a higher amount of power proximate to the input end of power waveguide 3-530 than waveguide 3-540 has proximate to its input end.

In some embodiments, a power waveguide may couple with a "continuous coupler" waveguide through a power splitter (e.g., directional coupler, multimode interference splitters). As shown in FIG. 3-5, power splitter 3-550 is configured to direct a portion of light propagating through power waveguide 3-530 into waveguide 3-540. The amount of power that power splitter 3-550 provides to waveguide 3-540 may be considered as an initial amount of power and the coupling strength between power waveguide 3-530 and waveguide 3-540 is configured to compensate for power loss in waveguide 3-540. In some embodiments, power splitter 3-550 may be configured to have a splitting ratio in the range between 5% to 50%, or any value or range of values in that range. Power splitter 3-550 may provide a high degree of coupling between power waveguide 3-530 and waveguide 3-540 over a distance in the range of 5 μm to 50 μm, or any value or range of values in that range. The distance over which power splitter 3-550 provides coupling between power waveguide 3-530 and waveguide 3-540 may be considered as the "coupling length" of power splitter 3-550. In some embodiments, the coupling length of a power splitter (e.g., directional coupler) may be less than approximately 100 μm.

The strength of the optical coupling between power waveguide 3-530 and waveguide 3-540 may depend on characteristics of the two waveguides, including the dimension, D, of the gap between power waveguide 3-530 and waveguide 3-540, the width of power waveguide 3-530, the width of waveguide 3-540, and the refractive indices of power waveguide 3-530 and waveguide 3-540. For example, decreasing the dimension of the gap, D, between power waveguide 3-530 and waveguide 3-540 increases the strength of the optical coupling between the power waveguide 3-530 and waveguide 3-540. In some embodiments, the coupling strength between power waveguide 3-530 and waveguide 3-540 may be substantially constant along the length of waveguide 3-540. In such embodiments, the dimension of the gap, D, may be substantially constant along the length of waveguide 3-540, as shown in FIG. 3-5.

In some embodiments, the coupling strength between a power waveguide and a continuous coupler waveguide may vary along the length of the continuous coupler waveguide, which may allow for the power waveguide to compensate for propagation loss along the continuous coupler waveguide. In such embodiments, the dimension of the gap, D, between the two waveguides may vary along the length of the continuous coupler waveguide. FIG. 3-6 is a planar view of a waveguide configuration having power waveguide 3-530 optically coupling with waveguide 3-540 where the dimension of the gap between them varies along the length of waveguide 3-540. In particular, power waveguide 3-530 is angled towards waveguide 3-540 such that at a location proximate to the power input (shown by the arrow) the distance between power waveguide 3-530 and waveguide 3-540, $D_1$, is greater than at a location distal from the power input, $D_2$. In such a configuration, the coupling strength between power waveguide 3-530 and waveguide 3-540 increases along the length of waveguide 3-540.

One parameter that may impact the length of a continuous coupler waveguide or the number of sample wells that the waveguide may optically couple with is the coherence length, or the distance over which light propagating along the power waveguide and the continuous coupler waveguide are in phase. If the coherence length is short, then the number of sample wells the continuous coupler waveguide may deliver light to is shortened. The inventors have recognized and appreciated that having different widths for the power waveguide and the continuous coupler waveguide may offset the phase difference between the two waveguide, and thus increase the coherence length. Accordingly, some embodiments involve the power waveguide 3-530 and waveguide 3-540 having different widths. In some embodiments, power waveguide 3-530 has a width, $d_p$, smaller than width, $d_c$, of waveguide 3-540. In some embodiments, power waveguide 3-530 has a width, $d_p$, larger than width, $d_c$, of waveguide 3-540.

While FIGS. 3-5 and 3-6 show power waveguide 3-530 and waveguide 3-540 within the same layer of the integrated device and configured to laterally couple with each other, it should be appreciated that power waveguide 3-530 and waveguide 3-540 may be configured to vertically couple with each other, according to some embodiments. In some embodiments, power waveguide 3-530 and waveguide 3-540 are positioned within different layers of the integrated device. In some embodiments, power waveguide 3-530 and waveguide 3-540 are positioned to vertically overlap with each other. In some embodiments, waveguide 3-540 may be positioned between the row of sample wells it couples with and power waveguide 3-530. In such embodiments, waveguide 3-540 and the row sample wells it optically couples with, including sample well 3-508, are non-overlapping.

In some embodiments, the end of the continuous coupler waveguide distal from the optical input may be tapered. Such embodiments may allow for increasing the number of sample wells in the row and/or the coupling efficiency with the sample wells that optical couple with this region of the waveguide.

Parameters that may impact the degree to which sample wells in a row receive substantially uniform intensity from a continuous coupler waveguide, such as shown in FIGS. 3-5 and 3-6, may include the thickness of top cladding layer 2-222, the initial coupling fraction with the power waveguide, the thickness of the continuous coupler waveguide, and depth of the sample wells. FIGS. 3-7 and 3-8 show simulation results where the initial coupling fraction with the power waveguide is varied and a continuous coupler waveguide is designed to achieve a minimum of relative intensity for a row of 1024 sample wells. The waveguide has a thickness of 120 nm and a top cladding layer thickness of 325 nm. The sample wells have a depth of 300 nm. FIG. 3-7 is a plot of power input to the continuous coupler waveguide needed to achieve the minimum relative intensity across all 1024 sample wells versus the initial coupling fraction with the power waveguide. The plot shown in FIG. 3-7 illustrates how there is a minimum power input needed when the initial coupling fraction with the power waveguide is approximately 0.26. FIG. 3-8 is a plot of the amount of nonuniformity in intensity along the row of sample wells versus the initial coupling fraction with the power waveguide where nonuniformity corresponds to the ratio of the highest intensity at a sample well to the lowest intensity at a sample well. A nonuniformity value equal to 1 corresponds to the highest intensity and lowest intensity values being equal, and thus a scenario where there is uniform intensity at all the sample wells in the row. Turning to both FIGS. 3-7 and 3-8, uniform intensity among all 1024 sample wells (when nonuniformity=1) can be achieved when the initial coupling fraction with the power waveguide is less than 0.26.

FIGS. 3-9, 3-10, and 3-11 show simulation results for a power waveguide and continuous coupler waveguide configuration for a row of 1024 sample wells with a top cladding thickness layer of 325 nm and an initial coupling fraction equal to 0.26. FIG. 3-9 is a plot of relative intensity versus sample well number and shows how the relative intensity at individual sample wells is uniform across all the sample wells. FIG. 3-10 is a plot of power in the waveguide versus sample well number in a row and shows how the optical power in the power waveguide decreases along the row of sample wells while the continuous coupler waveguide remains constant. FIG. 3-11 is a plot of the dimension of the gap between the power waveguide and the continuous coupler waveguide versus sample well number and shows how the power waveguide is closer to the continuous coupler waveguide at a location distal from the input end, corresponding to sample well number 1024.

Waveguide configurations that include a power waveguide and a continuous coupler waveguide may provide improved optical efficiency along the row of sample wells for less input power in comparison to a single tapered waveguide. As an example, if waveguide 3-540 is configured to optically couple with 2048 sample wells, then row efficiency corresponding to the number of sample wells per unit power is approximately 258 with an input power of 7.9 a.u. In the single tapered waveguide configuration, the input power into the tapered waveguide is approximately 16.8 a.u. and the row efficiency is approximately 122. This example illustrates how the configurations shown in FIGS. 3-5 and 3-6 may provide increased coupling efficiency within a sample well array while decreasing the necessary input power.

FIGS. 3-12 and 3-13 further illustrate how such a configuration provides improved optical efficiency for less input power than a single tapered waveguide as the number of sample wells in the row increases. In particular, FIGS. 3-12 and 3-13 show results obtained by simulating tapered waveguide designs and continuous coupler waveguide designs for different numbers of sample wells in a row. The tapered waveguide has a width that decreases from 1300 nm to 300 nm. The continuous coupler waveguide has a width of 800 nm. Each of the data points represents a waveguide design having uniform intensity among all the sample wells at a minimum power. FIG. 3-12 is a plot of power input to the waveguide versus number of sample wells per row. FIG. 3-13 is a plot of row efficiency measured by the number of sample wells per unit power versus number of sample wells per row. As the number of sample wells increases, the power input is lower for the continuous coupler waveguide than the tapered waveguide and the row efficiency is greater for the continuous coupler waveguide than the tapered waveguide.

It should be appreciated that the above described waveguide configurations may be combined in the same integrated device. For example, some embodiments of the integrated device may have a first set of sample well rows configured to receive light from waveguides having a row shift configuration and a second set of sample well rows configured to receive light from continuous coupler waveguides.

Some aspects of the present application relate to forming an integrated photonic device with an optical system having one or more characteristics of the configurations described herein. Some embodiments involve a method of forming an integrated photonic device that includes forming a plurality of sample wells arranged in a row, forming a first waveguide positioned to optically couple with at least two sample wells in the row, and forming a power waveguide configured to receive light from a region of the integrated photonic device separate from the row of sample wells and to optically couple with the first waveguide.

In some embodiments, the first waveguide is configured to optically couple with the power waveguide along a length of the first waveguide. In some embodiments, the first waveguide is configured to evanescently couple with the power waveguide. In some embodiments, the power waveguide has a larger width than the first waveguide. In some embodiments, the power waveguide is configured to optically couple a first portion of optical power to the first waveguide and to optically couple a second portion of optical power to a second waveguide. In some embodiments, the second waveguide is positioned to optically couple with at least two sample wells in the row. In some embodiments, the method further includes forming a second plurality of sample wells arranged in a second row. The second waveguide is positioned to optically couple with at least two sample wells in the second row.

In some embodiments, the power waveguide is configured to optically couple with the first waveguide through a first directional coupler having a first coupling coefficient and to optically couple with a second waveguide through a second directional coupler having a second coupling coefficient, the second coupling coefficient being larger than the first coupling coefficient. In some embodiments, the second waveguide is positioned to optically couple with at least two sample wells in the row. In some embodiments, the first directional coupler is positioned more proximate to an optical input of the power waveguide than the second directional coupler. In some embodiments, the method further includes forming a second plurality of sample wells arranged in a second row, wherein the second waveguide is positioned to optically couple with at least two sample wells in the second row.

In some embodiments, the power waveguide is configured to optically couple with the first waveguide through a directional coupler having a coupling length that is less than approximately 100 µm. In some embodiments, a coupling strength between the power waveguide and the first waveguide increases along a direction of optical propagation through the power waveguide. In some embodiments, the first waveguide has a higher propagation loss than the power waveguide. In some embodiments, the method further includes forming a grating coupler configured to receive light from a surface of the integrated photonic device and optically couple with the power waveguide.

In some embodiments, the method further includes forming a second waveguide, wherein the first waveguide is configured to optically couple with a first sample well in the row and a second waveguide is configured to optically couple with a second sample well in the row. In some embodiments, the first waveguide has a tapered end. In some embodiments, the first waveguide is configured to evanescently couple with the power waveguide at a location distal from the tapered end. In some embodiments, the method further includes forming at least one photodetector positioned to receive light emitted from a respective one of the at least two sample wells.

Some embodiments involve a method of forming an integrated photonic device that involves forming an array of sample wells arranged in rows, and forming a plurality of waveguides including a first waveguide positioned to optically couple with a first group of sample wells in a row and a second waveguide positioned to optically couple with a second group of sample wells in the row. In some embodiments, a third group of sample wells in the row is positioned between the first group and the second group. In some embodiments, a sample well of the third group is configured to receive less optical power than a sample well of the first group and/or a sample well of the second group. In some embodiments, the first waveguide is at a first distance from a sample well of the first group and is at a second distance from the sample well of the third group, the first distance being less than the second distance. In some embodiments, the second waveguide is at a third distance from a sample well of the second group and is at a fourth distance from the sample well of the third group, the third distance being less than the fourth distance.

In some embodiments, the first waveguide is curved in a region between the first group of sample wells and the second group of sample wells. In some embodiments, the second waveguide is curved in the region. In some embodiments, the first waveguide is positioned to evanescently couple with each sample well of the first group and the second waveguide is positioned to evanescently couple with each sample well of the second group. In some embodiments, the first waveguide is tapered along a portion configured to evanescently couple with the first group of sample wells and the second waveguide is tapered along a portion configured to evanescently couple with the second group of sample wells. In some embodiments, the method further includes forming a grating coupler configured to receive light from a surface of the integrated photonic device and optically couple with the plurality of waveguides. In some embodiments, the first waveguide is optically uncoupled from the second group of sample wells and the second waveguide is optically uncoupled from the first group of sample wells. In some embodiments, the sample wells of the first group are substantially aligned along an axis with the sample wells of the second group. In some embodiments, at least a portion of the first waveguide is substantially parallel to the axis. In some embodiments, at least a portion of the second waveguide is substantially parallel to the axis. In some embodiments, the method further comprises forming at least one photodetector configured to receive light emitted from a respective sample well of the first group.

C. Grating Coupler

As discussed in connection with FIG. 1-1, the integrated device may include a grating coupler, such as grating coupler 1-216, configured to receive light from an optical source and direct light to the waveguides configured to optically couple with the sample well array. The inventors have recognized and appreciated that some grating coupler configurations provide one or more benefits to the integrated device, including higher coupling efficiency of light to other optical components in the device and a broader tolerance for the angle of the incident light. A grating coupler includes multiple structures, or grating teeth, of a material separated by gaps filled with a different material. The material structures may have a higher refractive index than the gap material (e.g., the material structures formed of silicon nitride and the gaps formed of silicon oxide). Parameters that may impact the coupling efficiency of a grating coupler include the width of the material structures, the number of material structures, the width of the gaps, and the filling factor, which is the ratio of the width of the material structures to the width of the gaps.

Some embodiments relate to an integrated device having an apodized grating coupler configured to receive light incident to the integrated device. The apodized grating coupler may have material structures spaced from each other with a variable fill factor. In some embodiments, the material structures may be spaced apart from each other by gaps of variable widths. In some embodiments, the material structures may have variable widths.

FIG. 4-1 is a cross-sectional view of apodized grating coupler 4-100 configured to optically couple with waveguide 4-220, where light is configured to propagated in the direction shown by the arrow. Light incident to grating coupler 4-100 is shown by the dashed line. Apodized grating coupler 4-100 may provide improved phase matching with the incident light. Grating coupler 4-100 has material structures, including material structures 4-120a, 4-120b, and 4-120c, which are spaced apart from each other with a variable fill factor (e.g., percentage of grating pitch occupied by a material structure). The fill factor for the material structures of grating coupler 4-100 increases in a direction towards waveguide 4-220, which is in the direction of light propagation. Material structures may have variable width (along the positive z direction), corresponding to dimension T. As shown in FIG. 4-1, the material structures of grating coupler 4-100 have widths that increase in a direction towards waveguide 4-220. For example, material structure 4-120c has a larger width than material structure 4-120a. The material structures are separated by gaps, including gaps 4-122a, 4-122b, and 4-122c. The gaps are etched fully through the grating coupler structure, which may ease fabrication of grating coupler 4-100. Gaps may have variable width (along the positive z direction), corresponding to dimension G. As shown in FIG. 4-1, the gaps of grating coupler 4-100 have widths that decrease in a direction towards waveguide 4-220. For example, gap 4-122c has a smaller width than material structure 4-122a. In some embodiments, the grating coupler may have variable pitch, which is the width of a material structure and the gap adjacent to it and corresponding to dimension P.

An apodized grating coupler may provide certain benefits, including the ability to accommodate fabrication tolerances without substantially impacting the coupling efficiency. FIG. 4-2 shows a plot of coupling efficiency versus thickness of the bottom cladding layer for an apodized grating coupler. The results shown in FIG. 4-2 illustrate how the coupling efficiency remains substantially constant over a range of variation in thickness of the bottom cladding layer, which may provide fabrication tolerances since there is a broad range of thickness that can be achieved for the bottom cladding layer without substantially reducing coupling efficiency. FIG. 4-3 shows a plot of coupling efficiency versus lateral dimension error for an apodized grating coupler. Although coupling efficiency decreases with increased error at a fixed angle for the light incident to the grating coupler, the changes in efficiency can be compensated for by varying the angle of incidence of the light onto the grating coupler. As shown in FIG. 4-3, the efficiency can remain above 70% with ±20 nm dimensional error by tuning the incident angle within ±1 degree of the fixed angle.

Some embodiments relate to grating couplers having asymmetric material structures about a plane substantially parallel to a surface of the integrated device. In some embodiments, a grating coupler may have multiple layers, and the asymmetric material structures may be formed in the multiple layers. In some embodiments, the integrated device may include a blazed grating coupler. A blazed grating coupler may include a combination of grating couplers in different layers including a layer proximate to a surface integrated device having one grating coupler with material structures having a smaller width than the material structures in a grating coupler formed in another layer. A blazed grating coupler may have saw teeth material structures, according to some embodiments. A bi-layer grating coupler includes a combination to two grating couplers offset from each other.

FIG. 4-4 is a cross-sectional view of blazed grating coupler 4-400 configured to optically couple with waveguide 4-420, where light is configured to propagated in the direction shown by the arrow. Light incident to grating coupler 4-400 is shown by the dashed line. Blazed grating coupler 4-400 may provide improved directionality of radiated light towards waveguide 4-420. Grating coupler 4-400 has material structures 4-425, which are formed of two layers in contact with each other. The layer proximate to the incident light has a width, b, smaller than the width, $a_2+b$, of the other layer. In this manner, material structures 4-425 are asymmetric about a plane substantially parallel a surface of the integrated device (e.g., along the z-direction). Gaps between material structures 4-425 have a width, $a_1$. The pitch, P, is equal to $a_1+a_2+b$.

Figures 2, 3, 4, 5, 6:
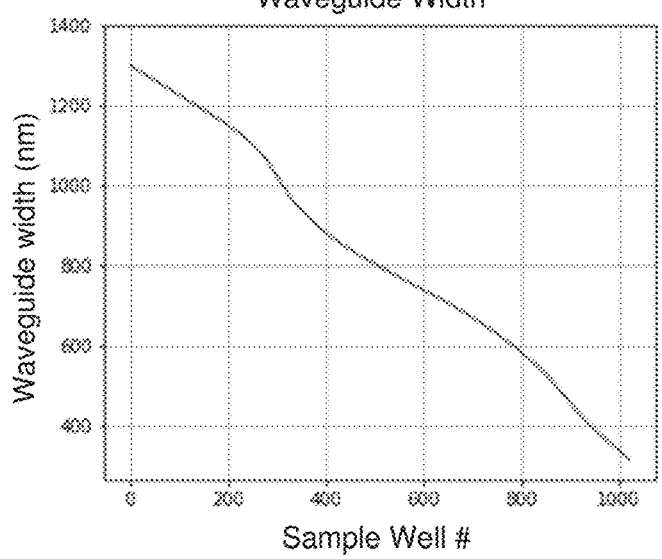
Figures 2, 3, 4, 5, 6, 7:
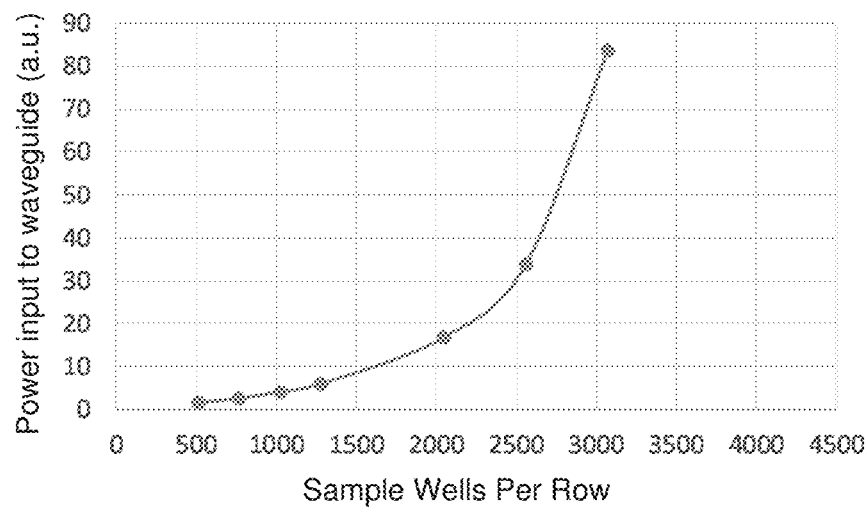
Figures 2, 3, 4, 5, 6, 7, 8:
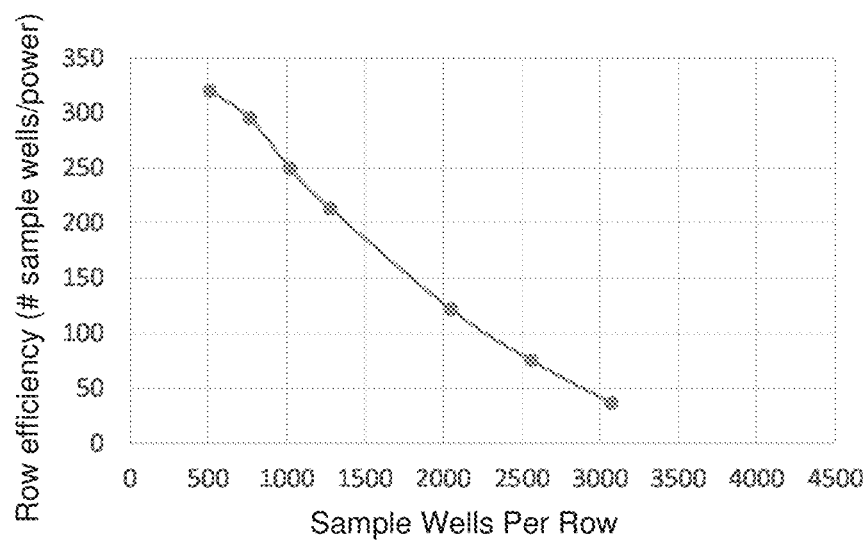
Figures 1, 3:
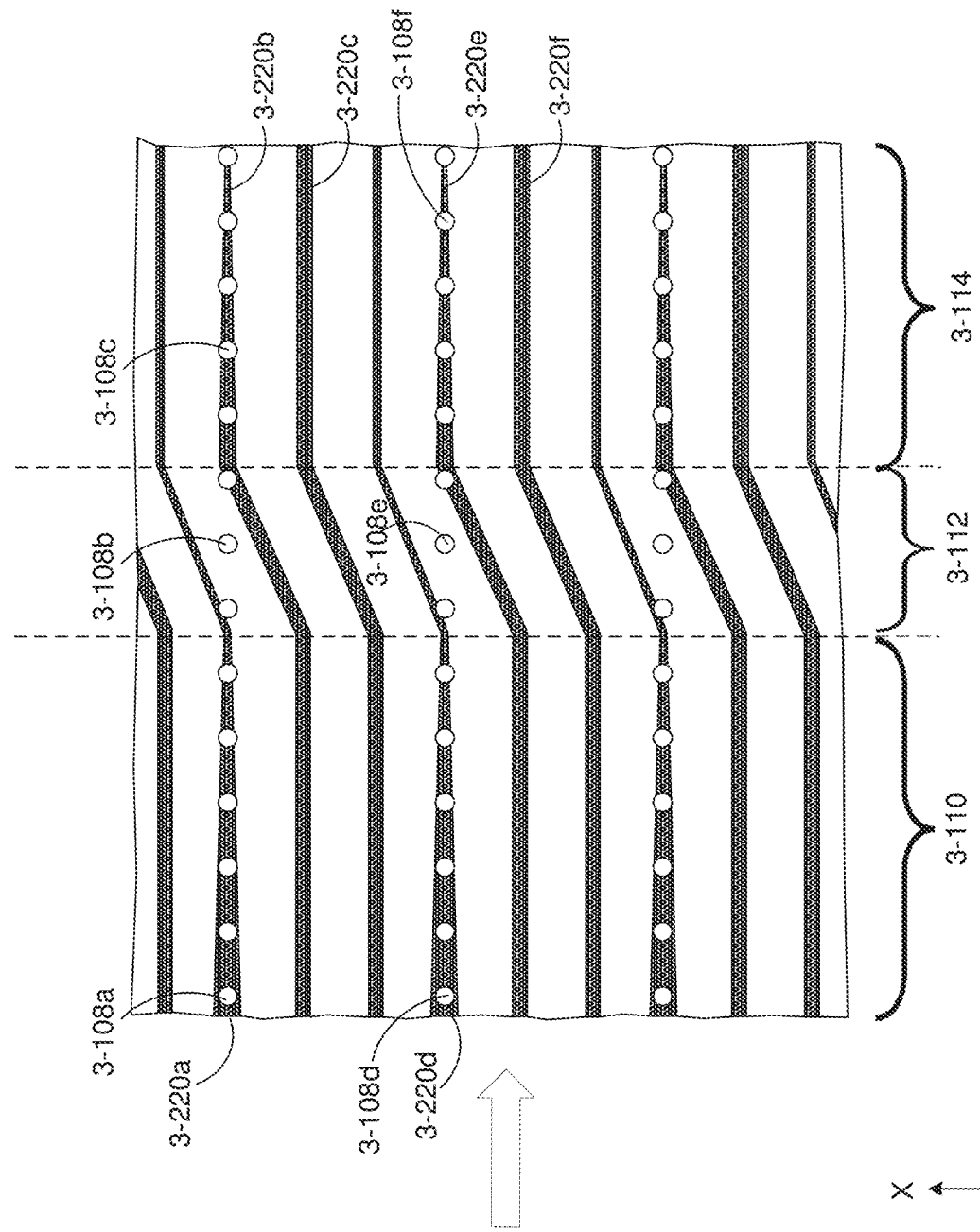
Figures 2, 3:
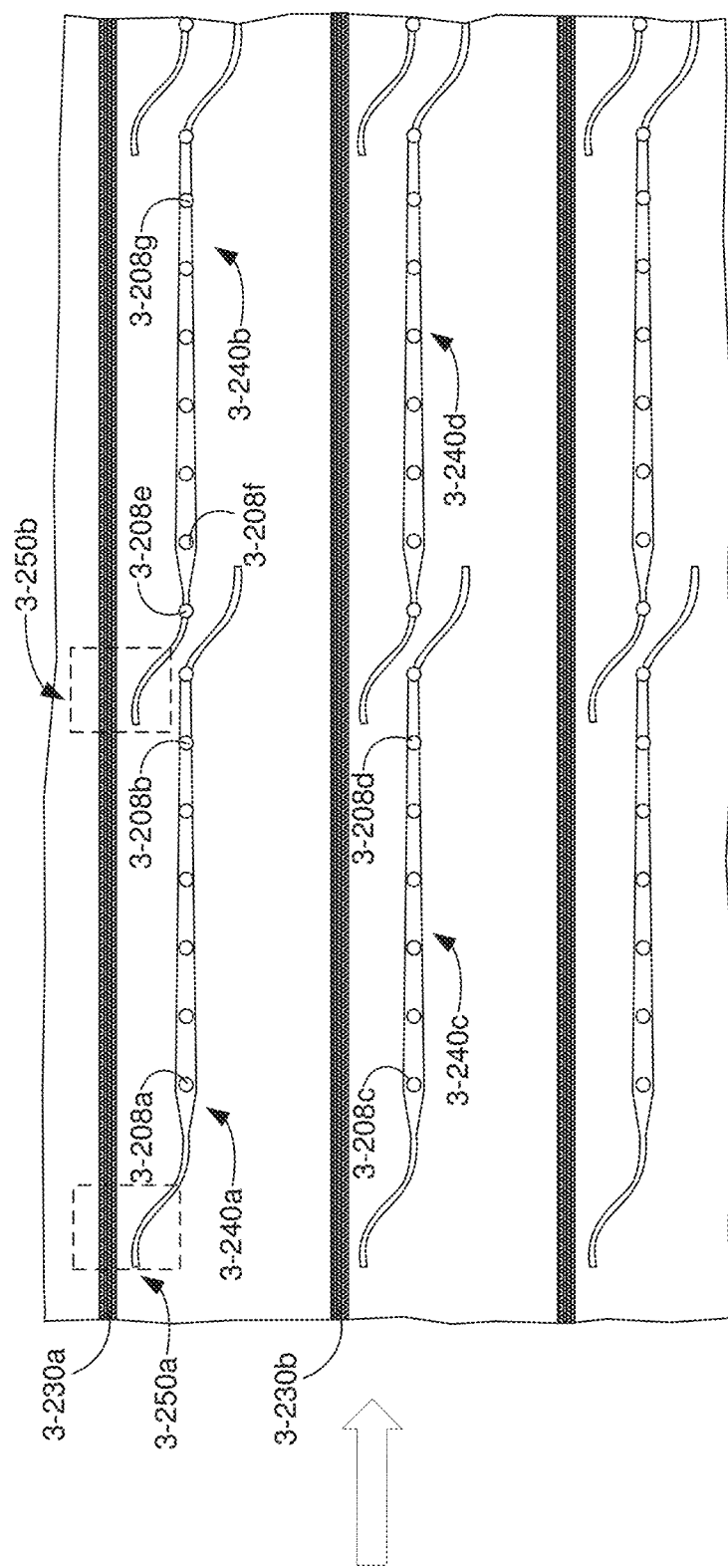
Figure 3:
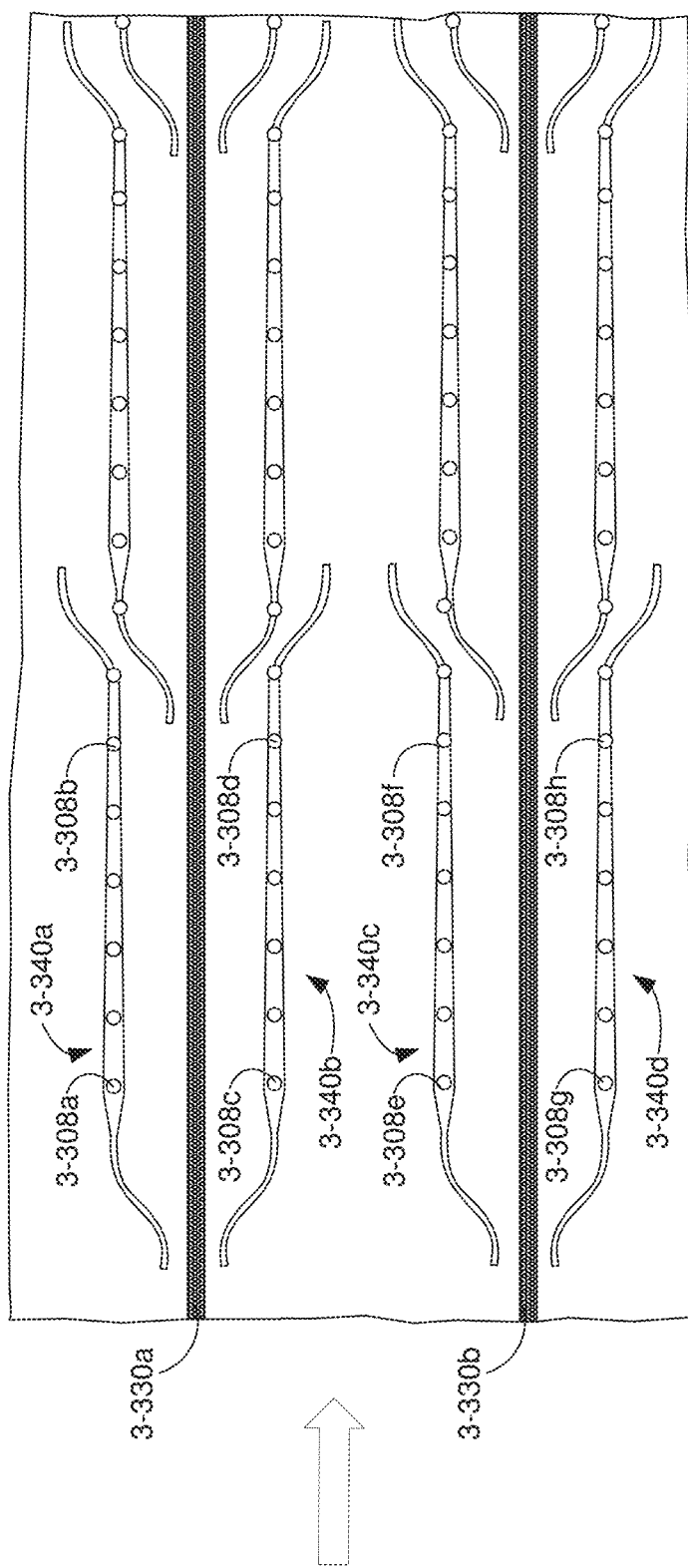
Figures 3, 4:
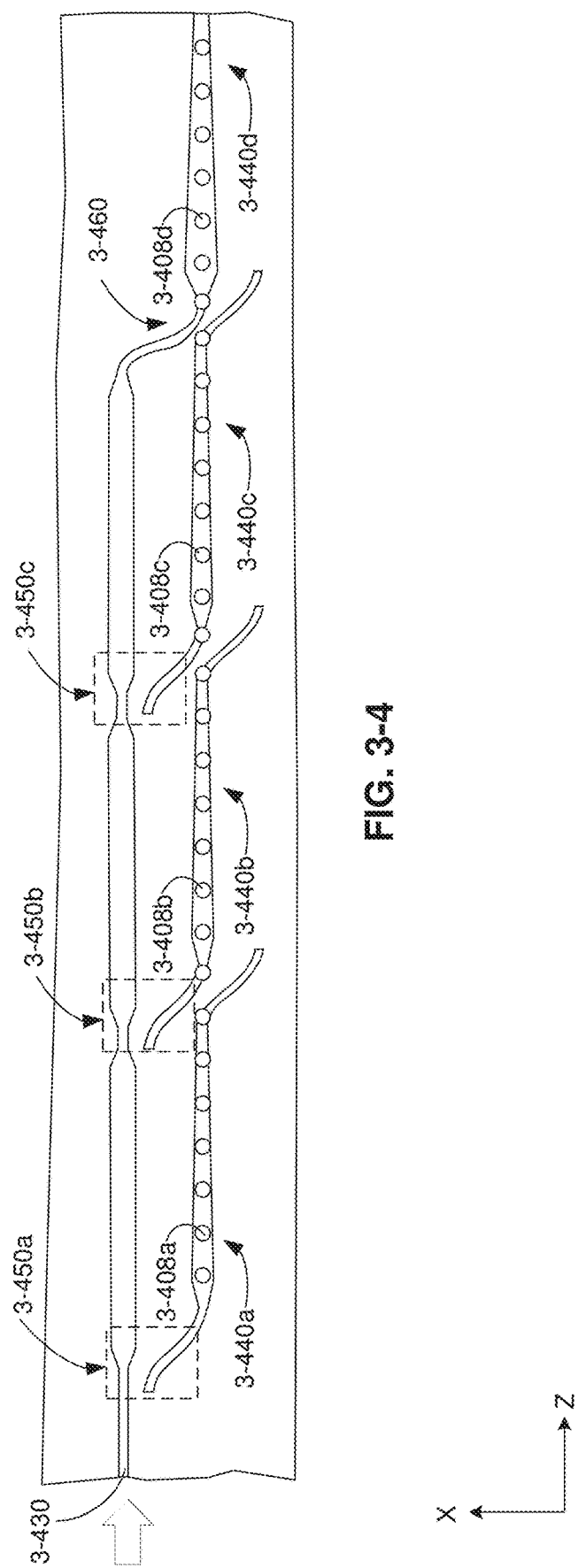
Figures 3, 4, 5:
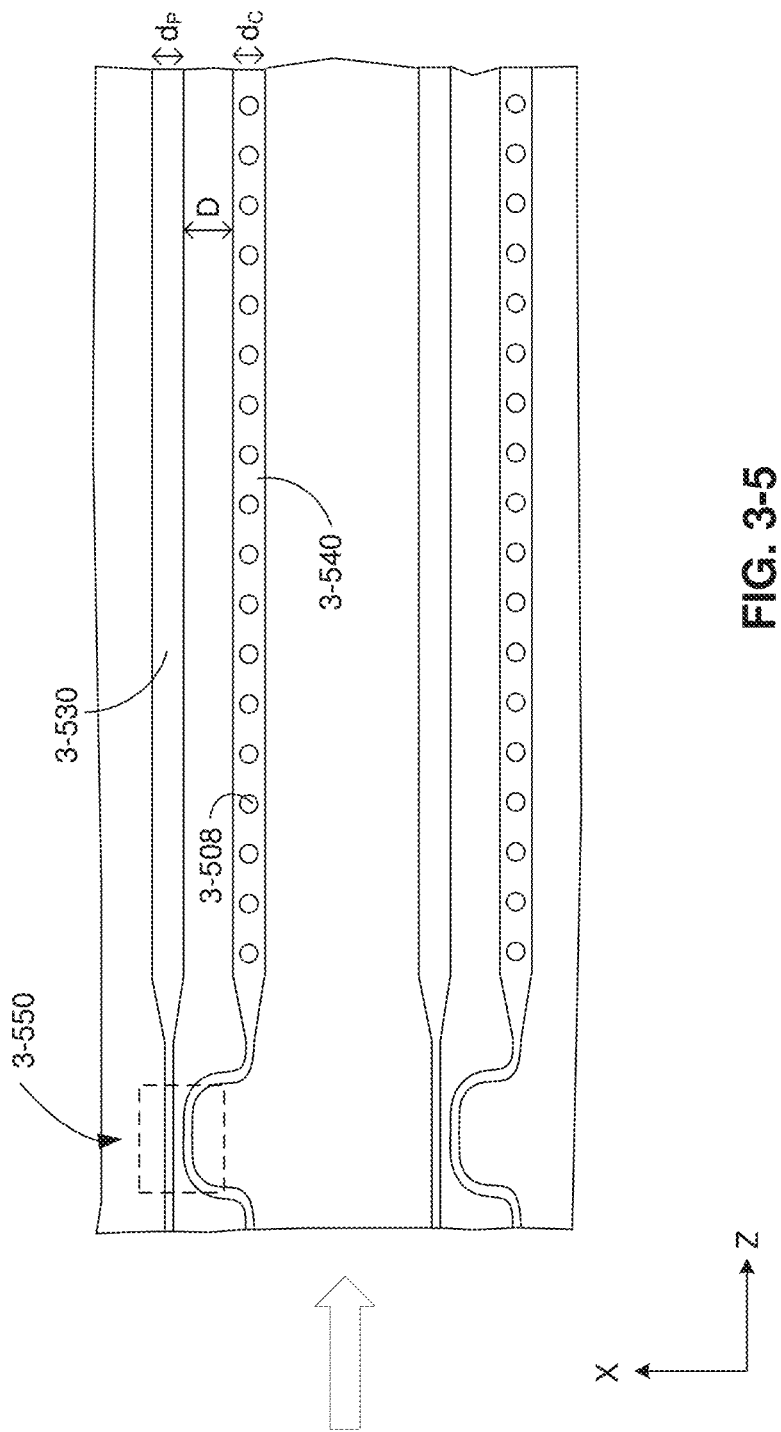
Figures 3, 4, 5, 6:
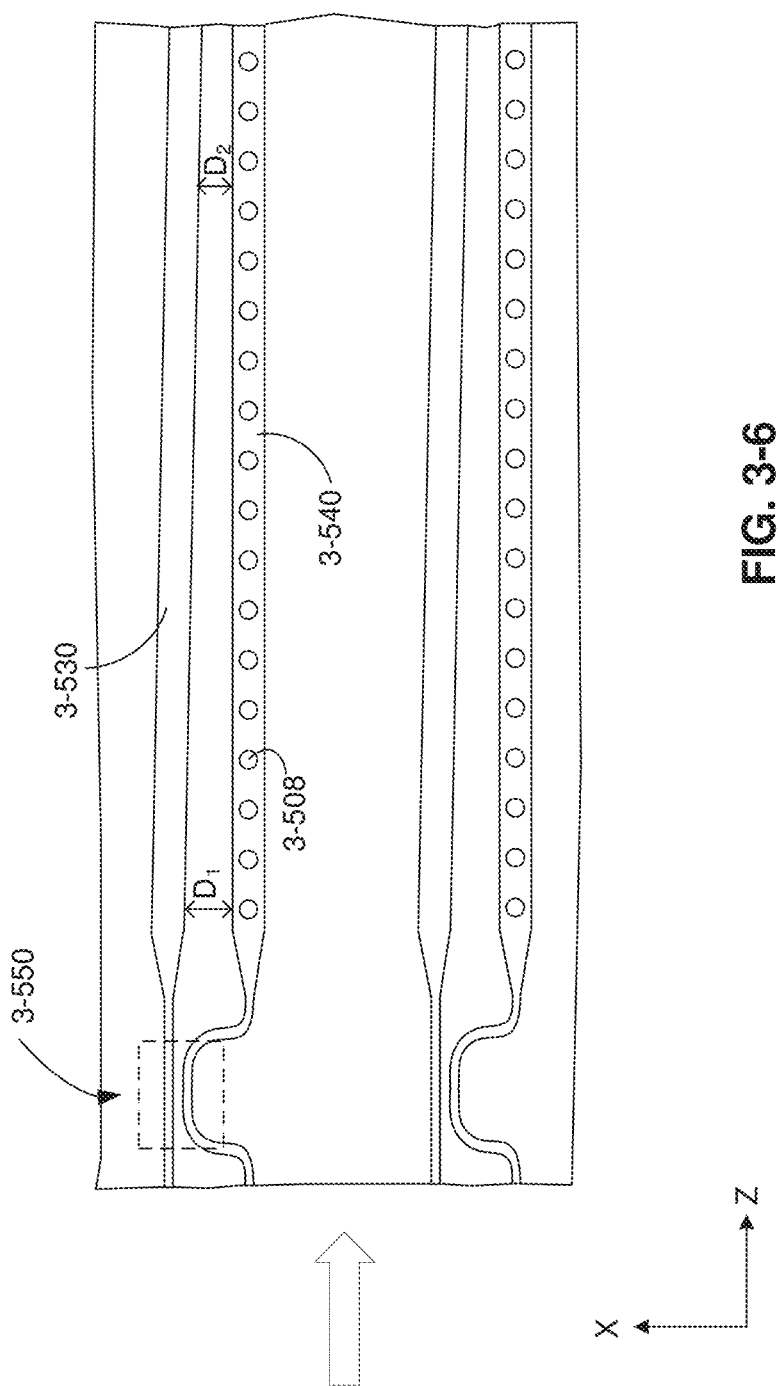
Figures 3, 4, 5, 6, 7:
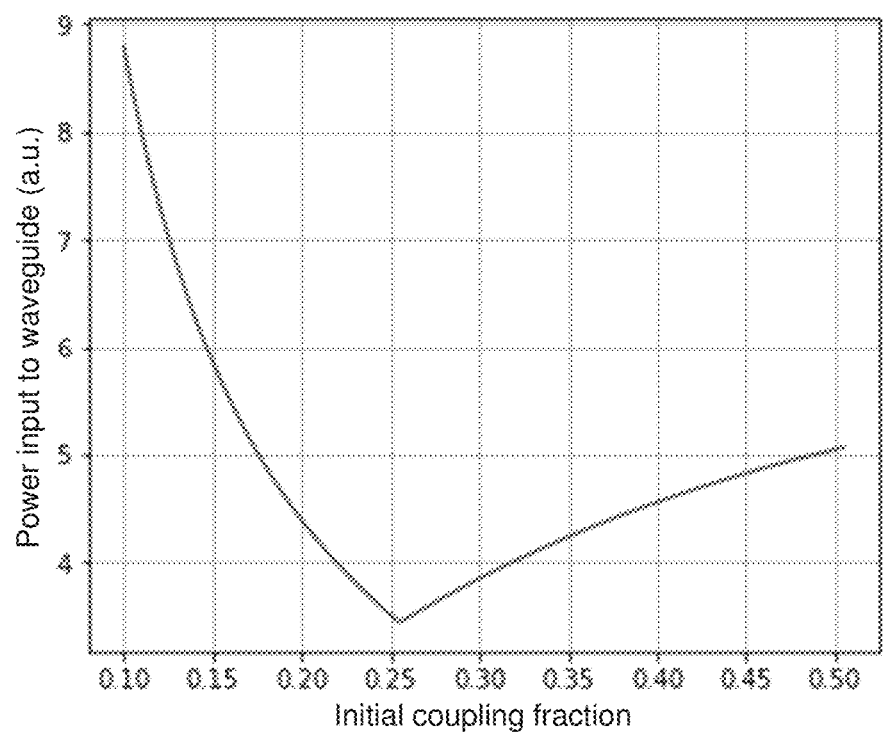
Figures 3, 4, 5, 6, 7, 8:
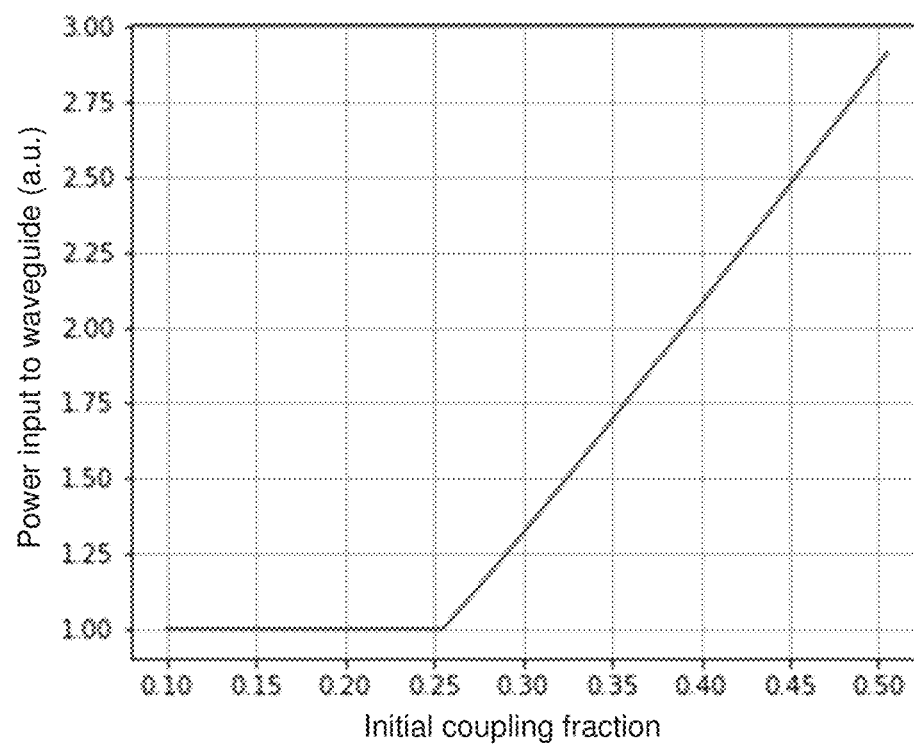
Figures 3, 4, 5, 6, 7, 8, 9:
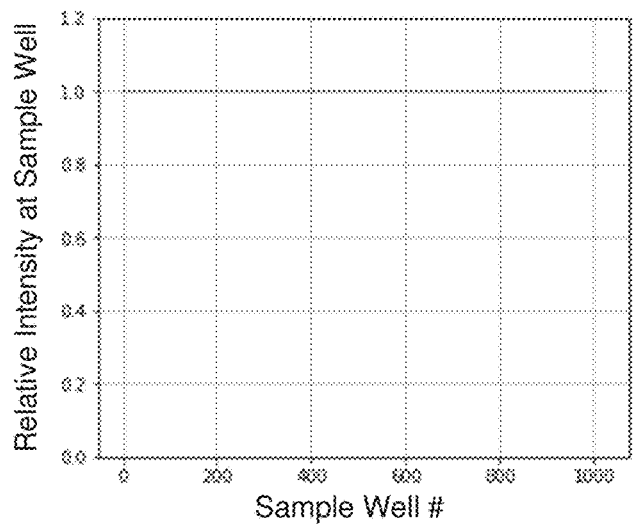
Figures 3, 4, 5, 6, 7, 8, 9, 10:
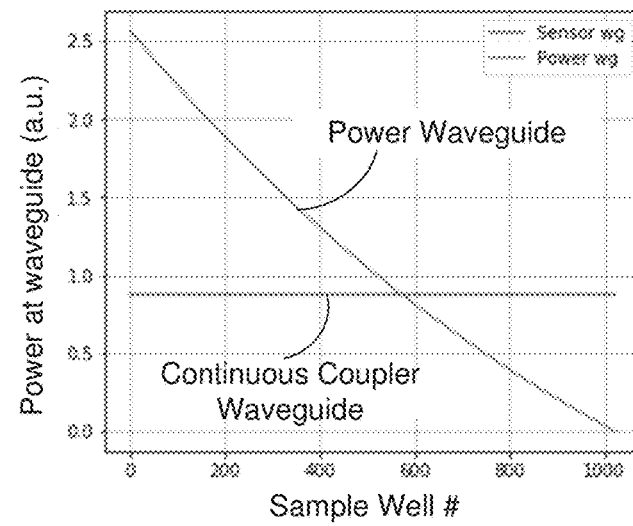
Figures 3, 4, 5, 6, 7, 8, 9, 10, 11:
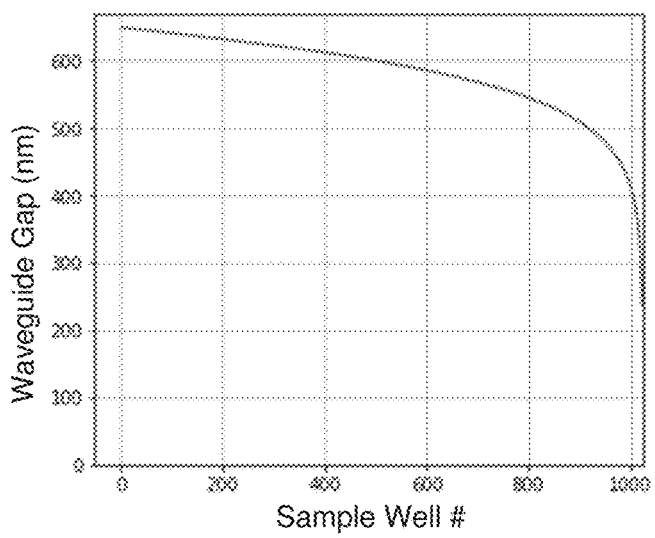
Figures 3, 4, 5, 6, 7, 8, 9, 10, 11, 12:
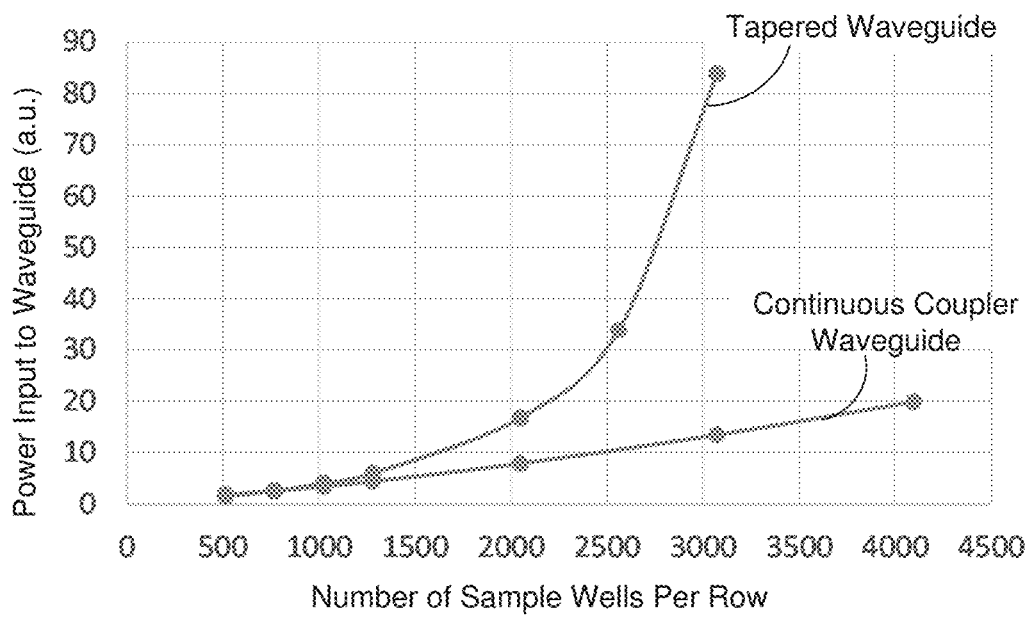
Figures 3, 4, 5, 6, 7, 8, 9, 10, 11, 12, 13:
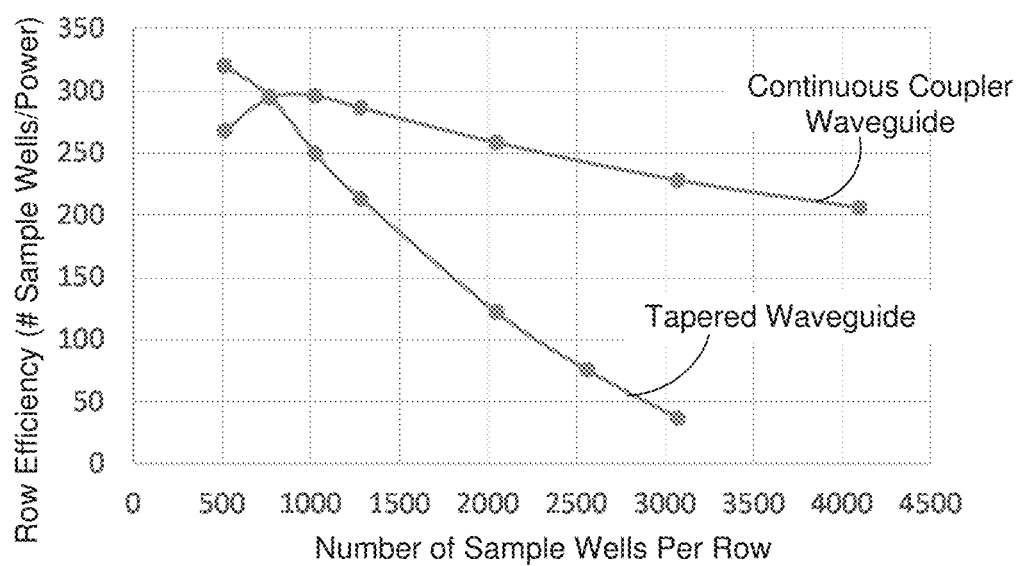
Figures 1, 4:
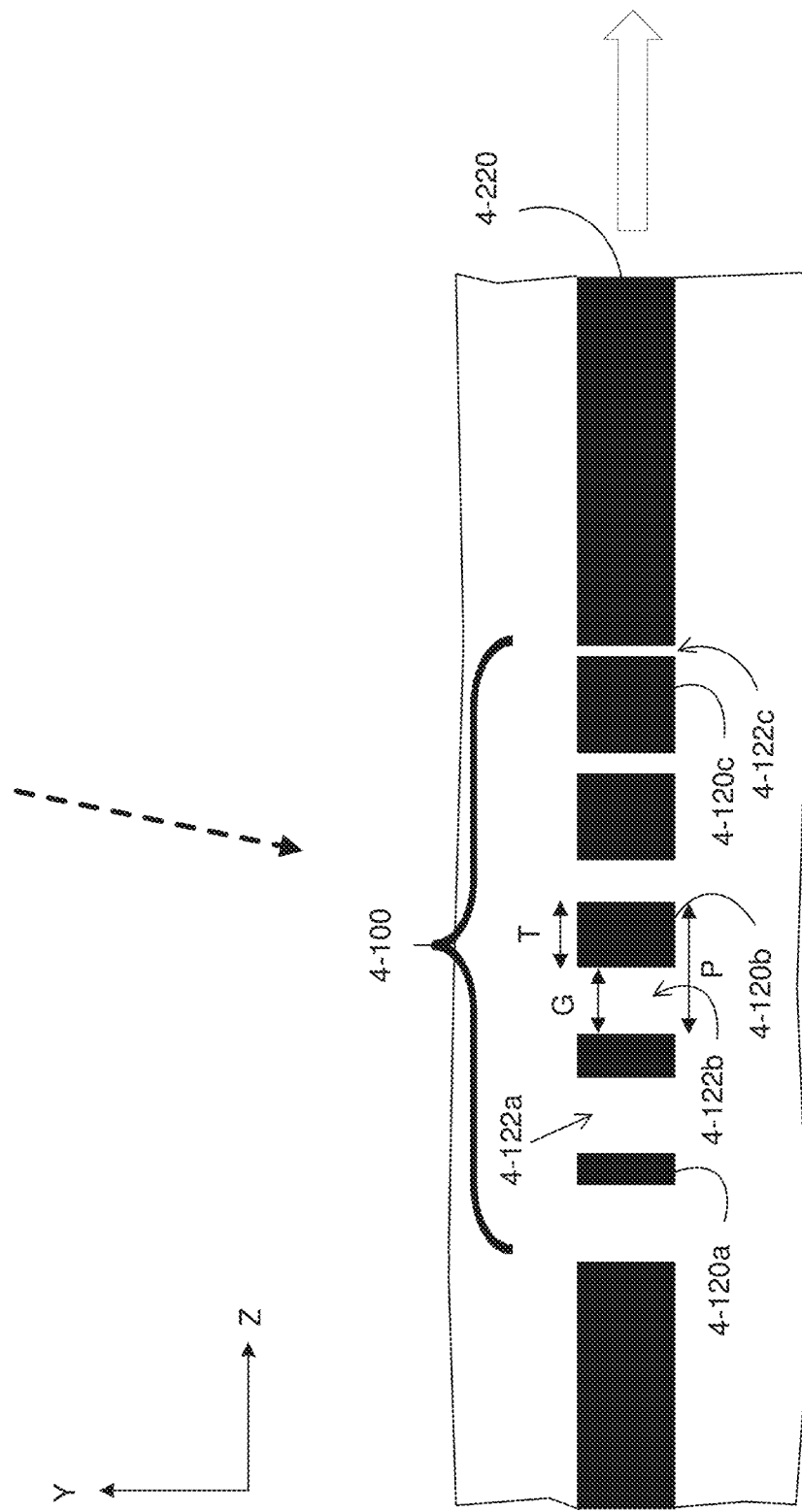
Figures 2, 4:
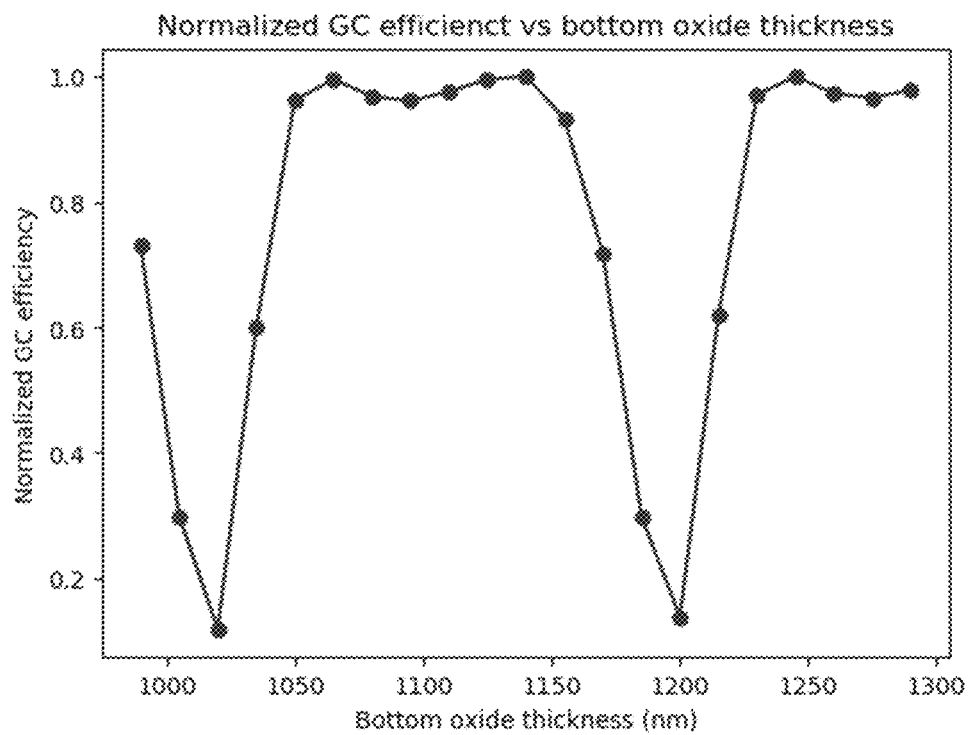
Figures 3, 4:
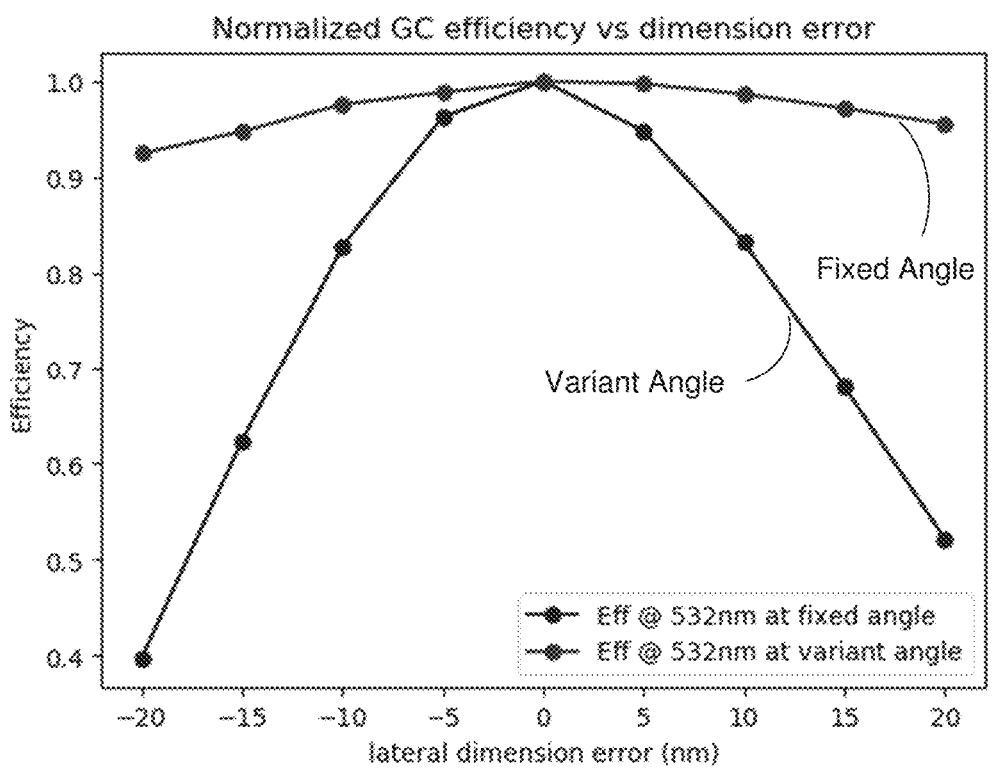
Figure 4:
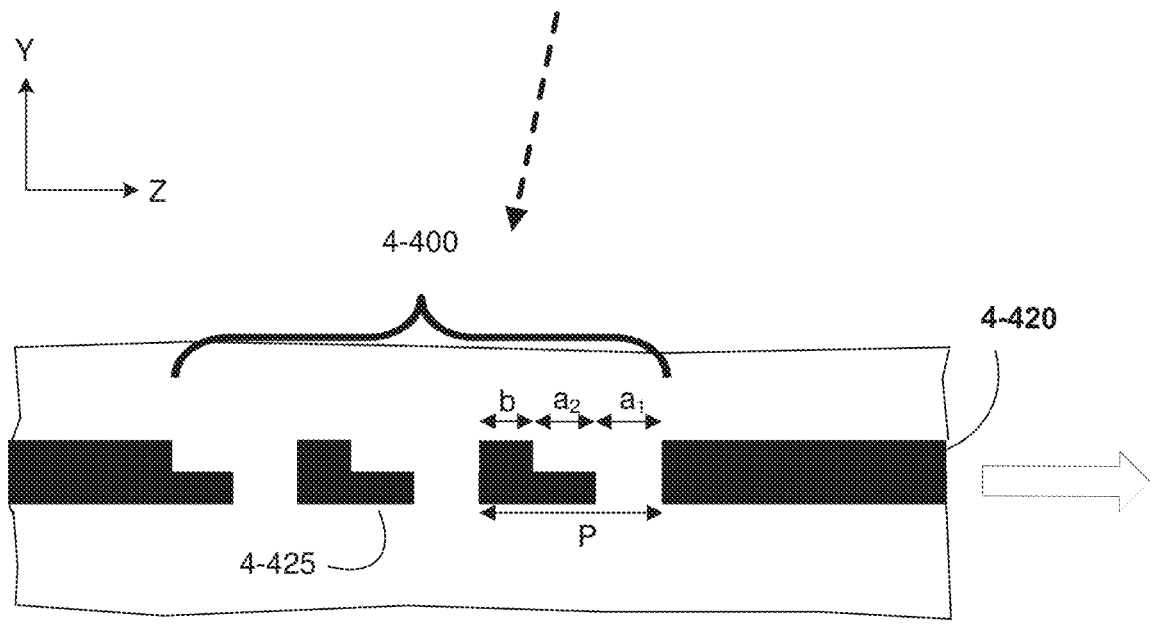
Figures 4, 5:
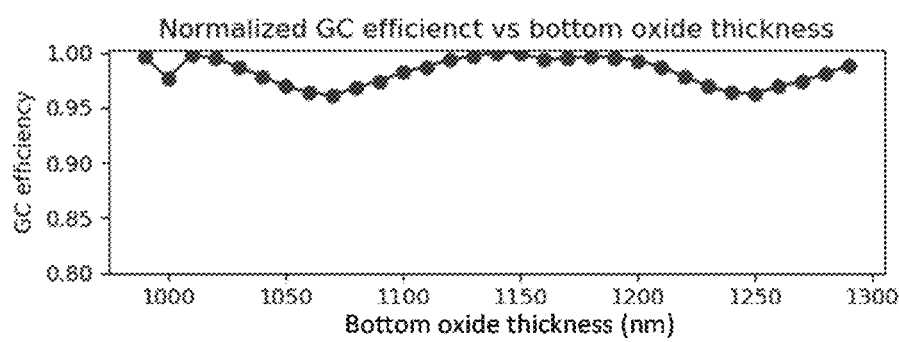
Figures 4, 5, 6:
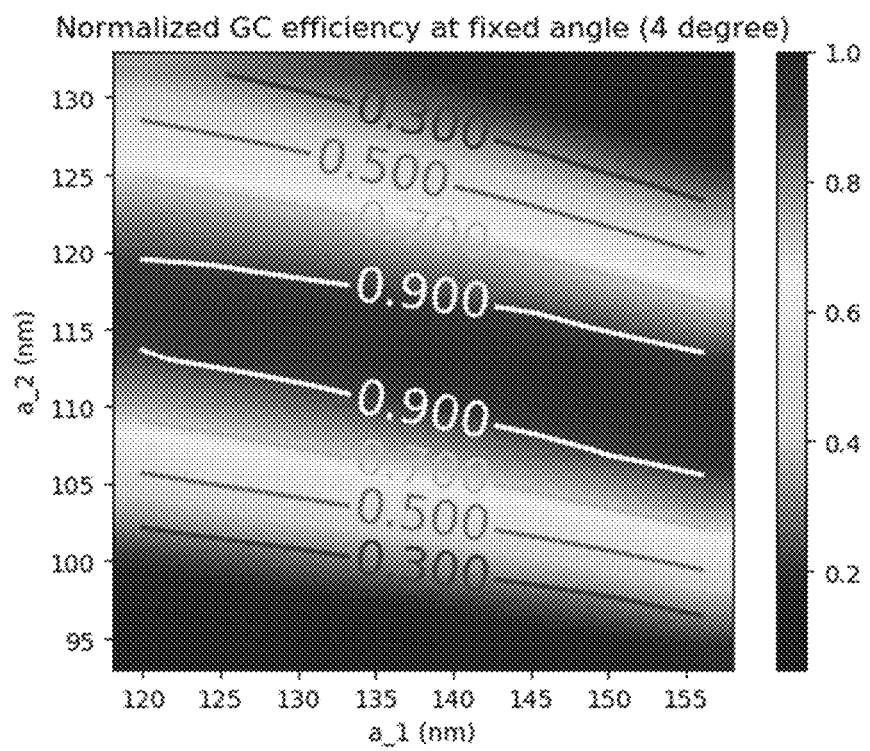
Figures 4, 5, 6, 7:
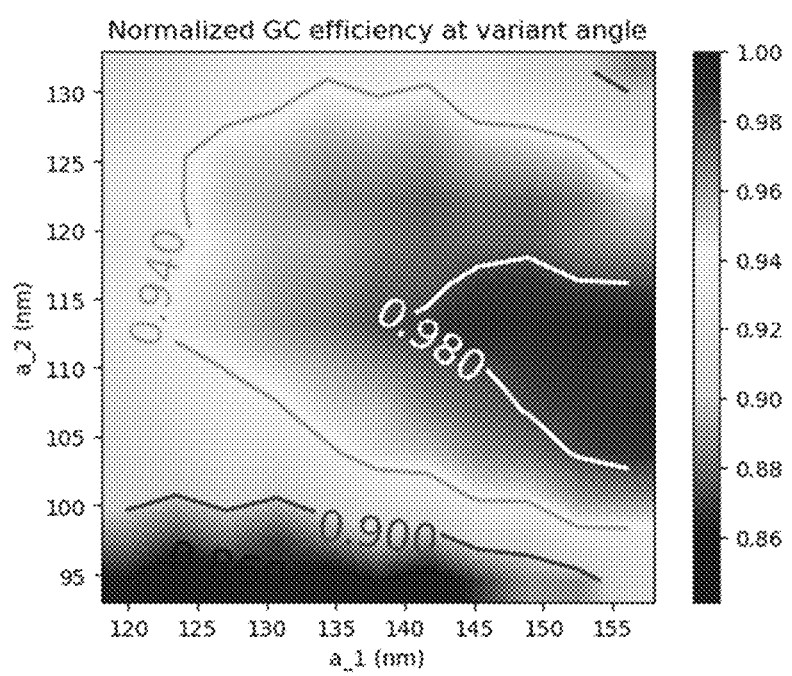
Figures 4, 5, 6, 7, 8:
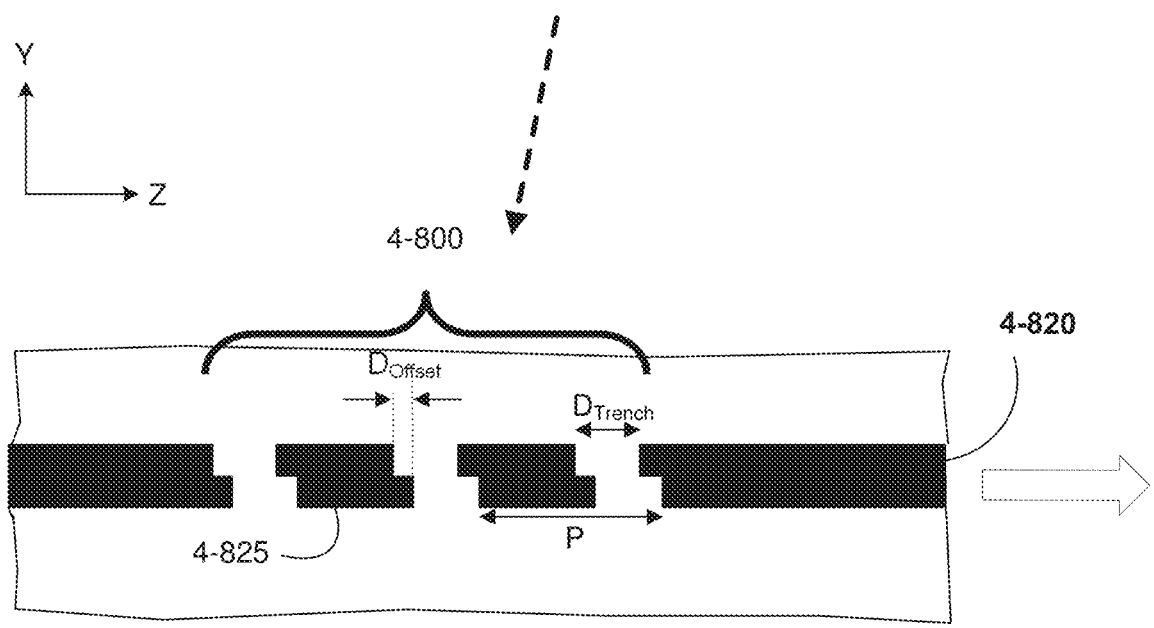
Figures 4, 5, 6, 7, 8, 9:
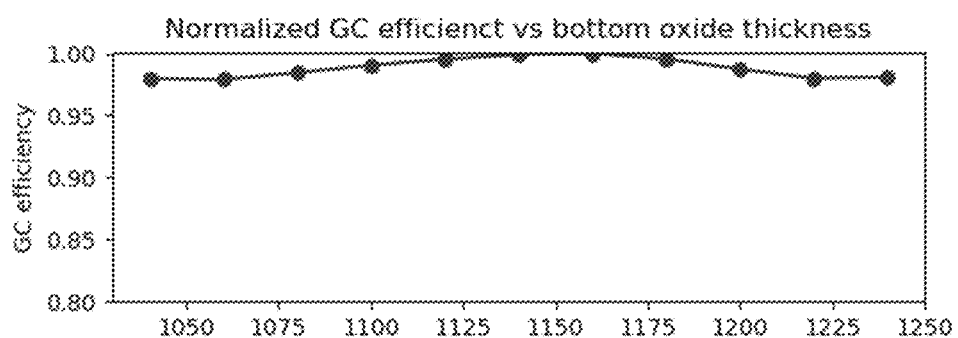
Figures 4, 5, 6, 7, 8, 9, 10:
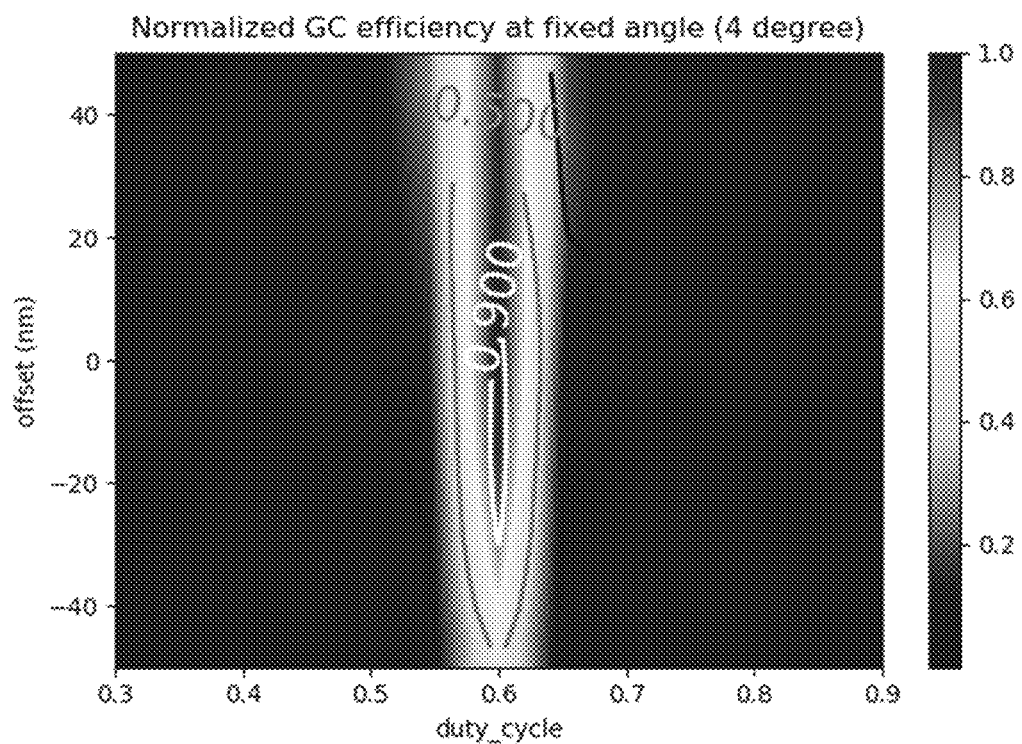
Figures 4, 5, 6, 7, 8, 9, 10, 11:
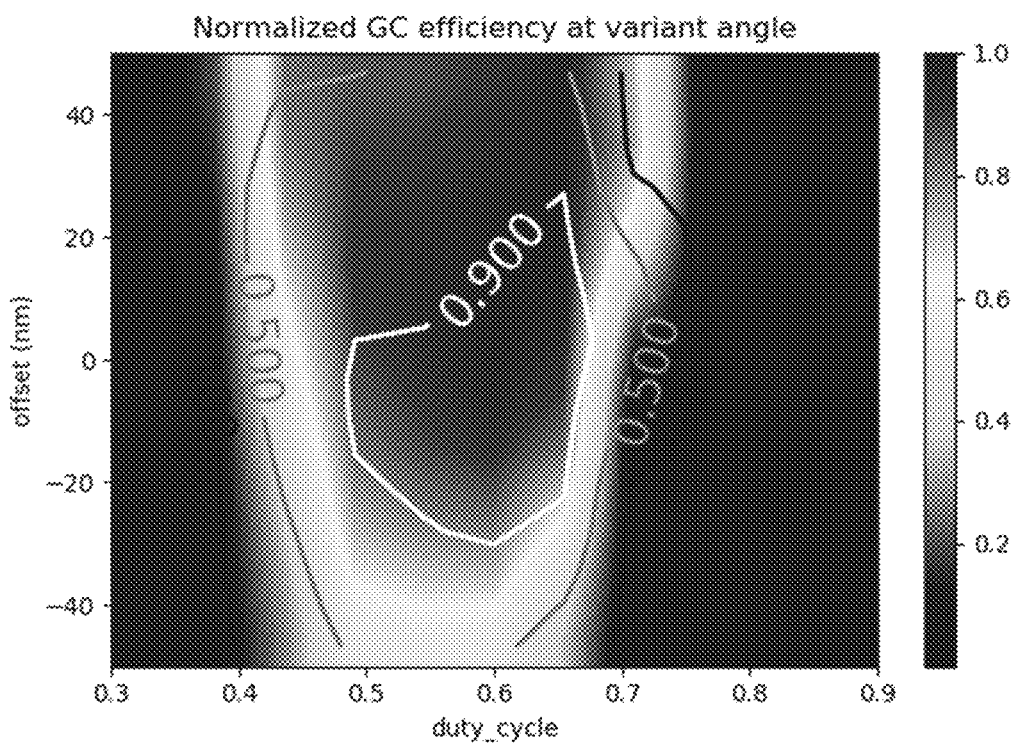
Figures 4, 5, 6, 7, 8, 9, 10, 11, 12:
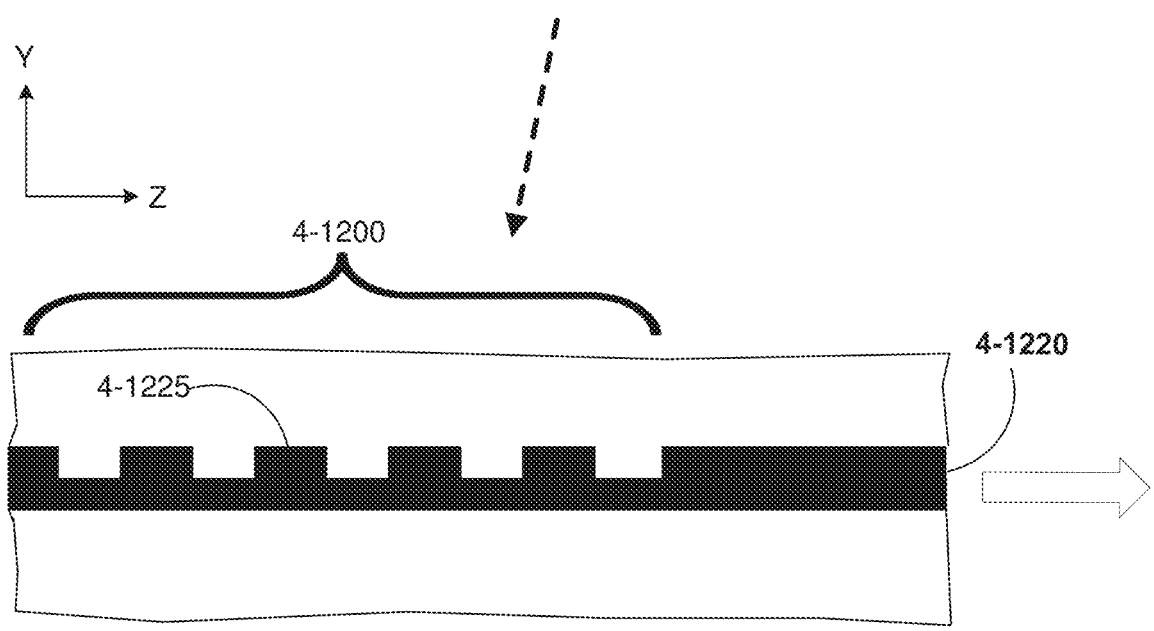
Figures 4, 5, 6, 7, 8, 9, 10, 11, 12, 13:
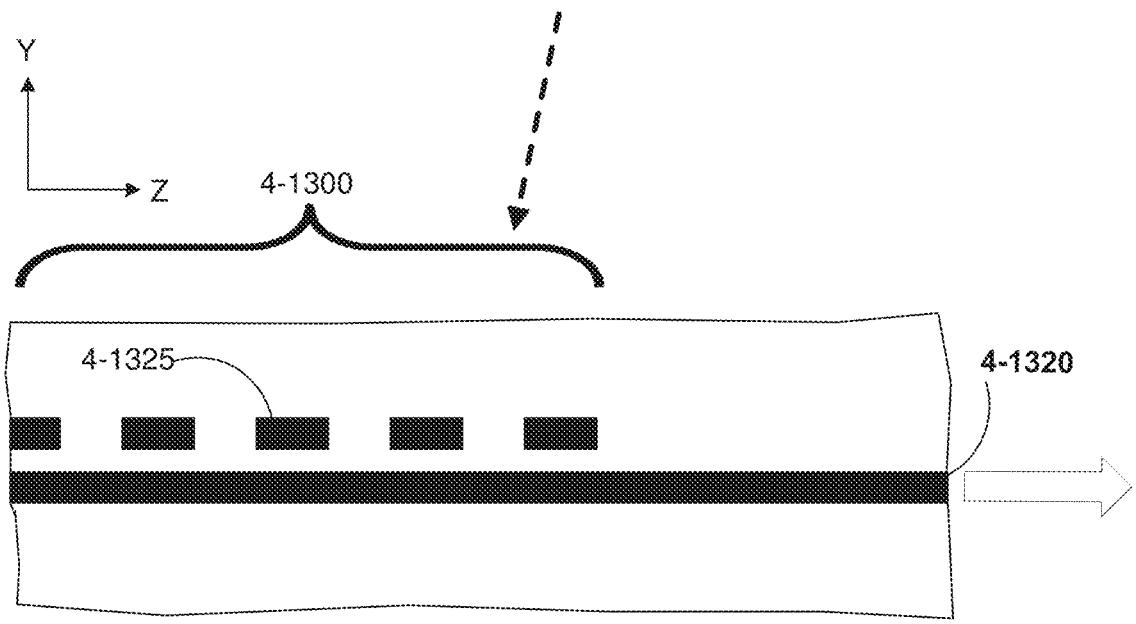
Figures 4, 5, 6, 7, 8, 9, 10, 11, 12, 13, 14:
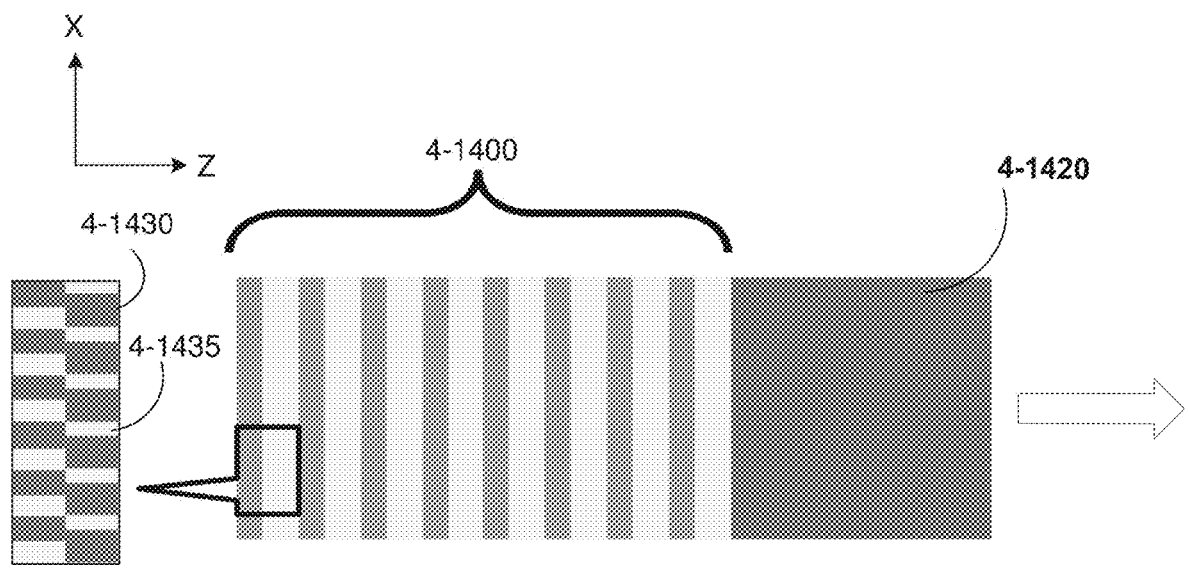
Figures 4, 5, 6, 7, 8, 9, 10, 11, 12, 13, 14, 15:
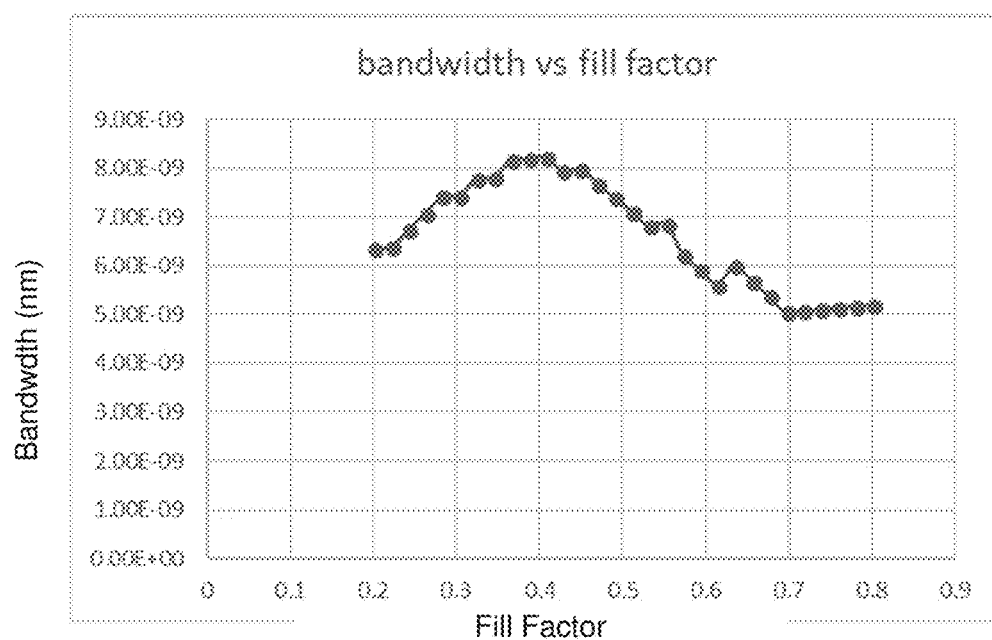
Figures 4, 5, 6, 7, 8, 9, 10, 11, 12, 13, 14, 15, 16:
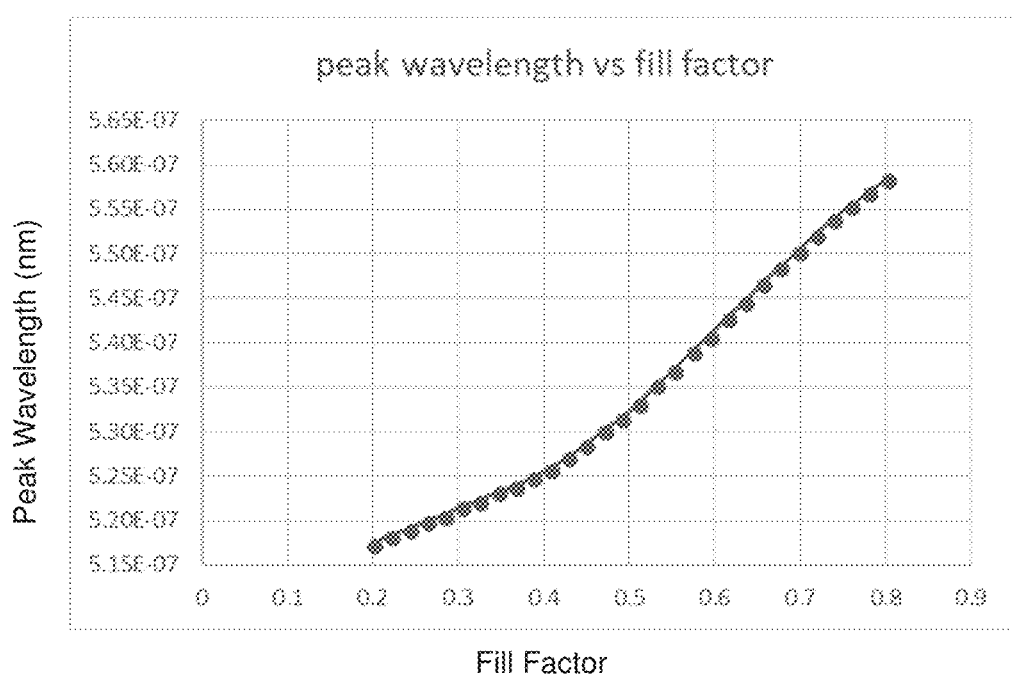
Figures 4, 5, 6, 7, 8, 9, 10, 11, 12, 13, 14, 15, 16, 17:
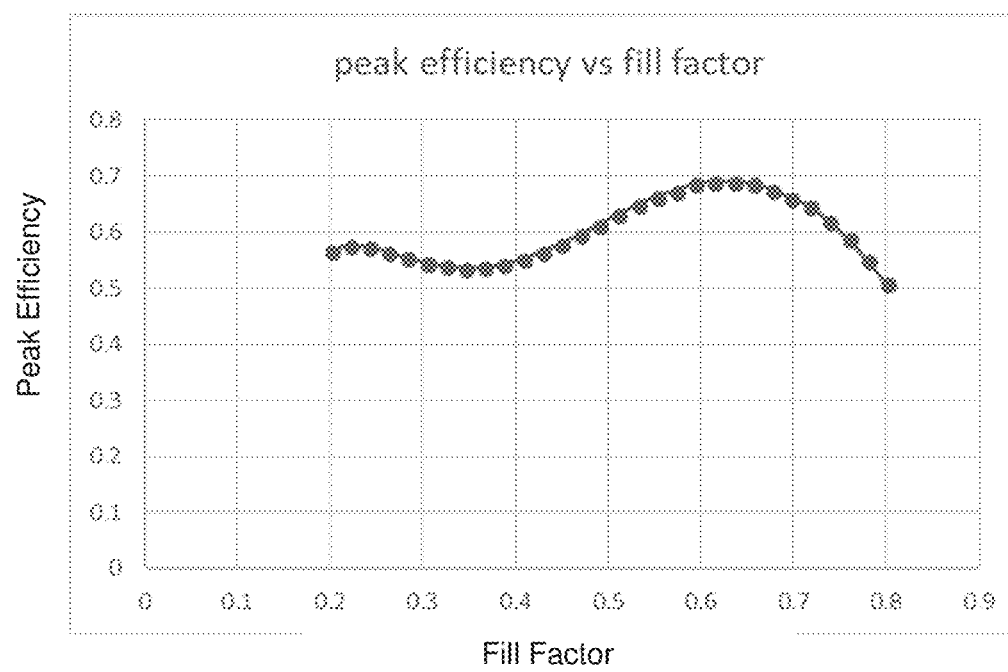
Figures 4, 5, 6, 7, 8, 9, 10, 11, 12, 13, 14, 15, 16, 17, 18:
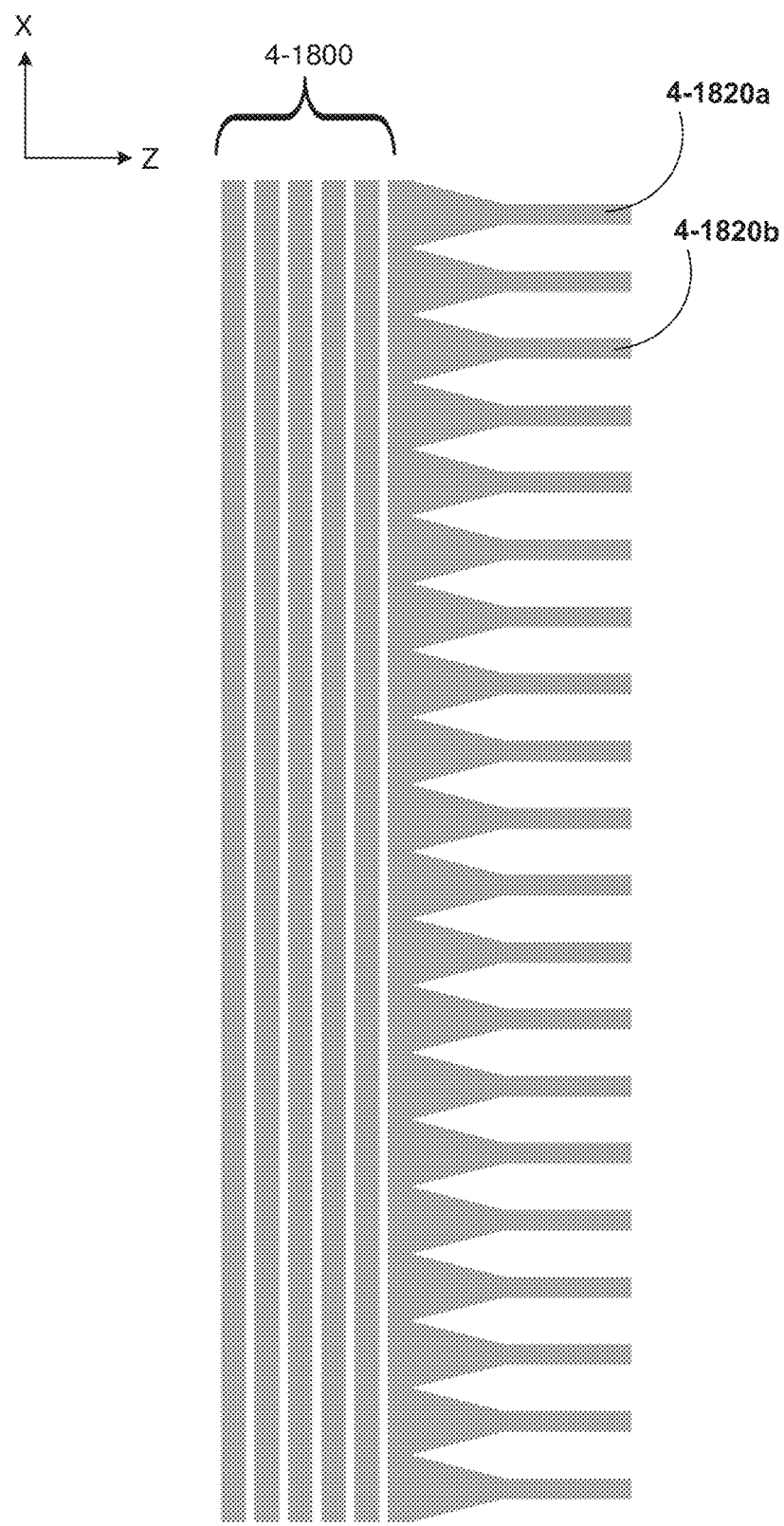
Figures 4, 5, 6, 7, 8, 9, 10, 11, 12, 13, 14, 15, 16, 17, 18, 19:
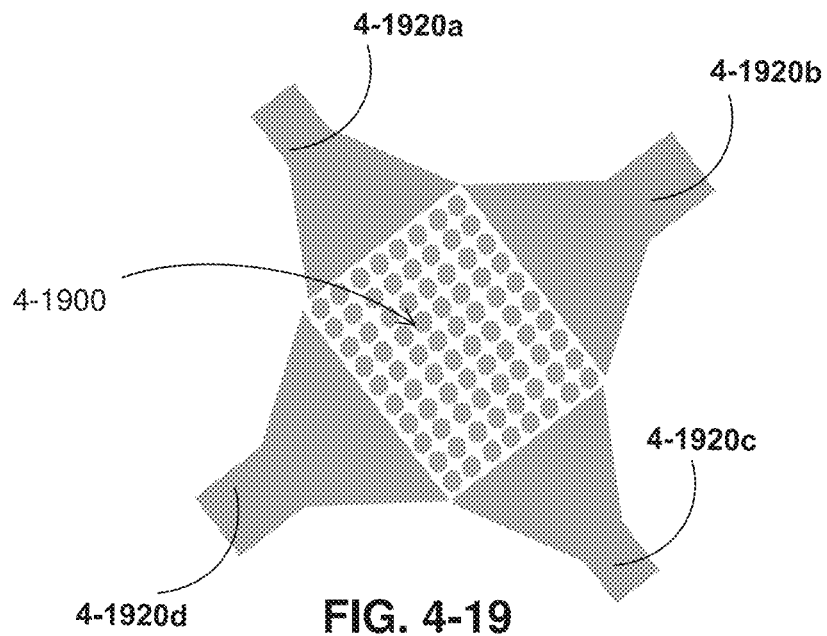
Figures 4, 5, 6, 7, 8, 9, 10, 11, 12, 13, 14, 15, 16, 17, 18, 19, 20:
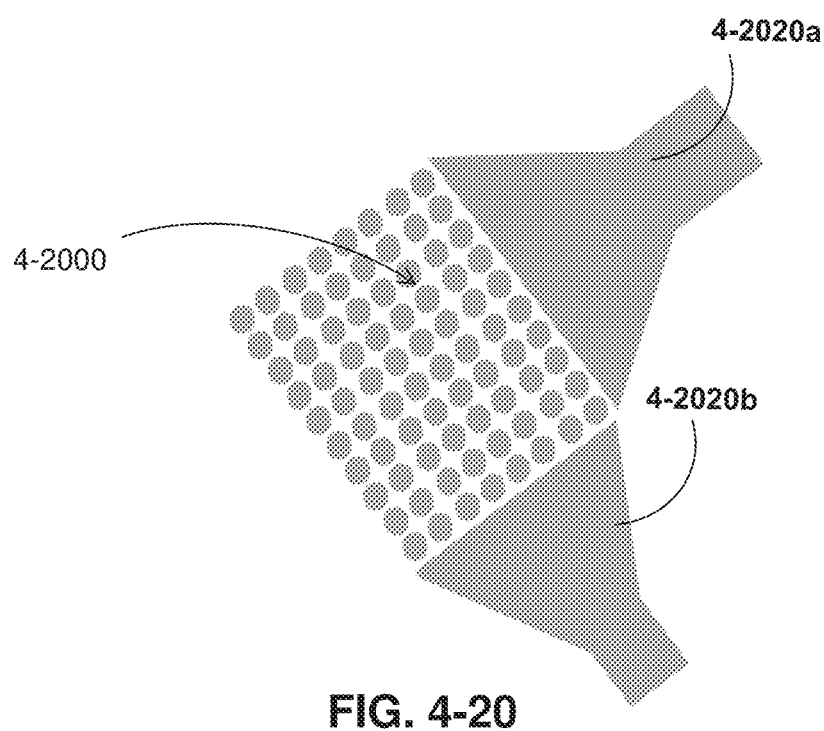

FIG. 4-5 shows a plot of coupling efficiency versus thickness of the bottom cladding layer for a blazed grating coupler having $a_1$; equal to 138 nm, $a_2$ equal to 113, b equal to 82, thickness of the top layer equal to 60 nm, total thickness equal to 140 nm, and incident angle equal to 4 degrees. The results shown in FIG. 4-5 illustrate how the coupling efficiency remains substantially constant over a range of variation in thickness of the bottom cladding layer, which may provide fabrication tolerances since there is a broad range of thickness that can be achieved for the bottom cladding layer without substantially reducing coupling efficiency. FIGS. 4-6 and 4-7 are grayscale versions of a color heat map plotting parameter $a_2$ versus $a_1$ where the variation in color corresponds to coupling efficiency. In FIG. 4-6, the angle of incident light to the grating coupler is fixed. In FIG. 4-7, the angle of incident light to the grating coupler is varied with a range of ±1 degree of the fixed angle. FIG. 4-7 shows that higher coupling efficiency can be achieved by tuning the incident angle to accommodate for changes in parameters of the grating coupler, which may provide further fabrication tolerances.

FIG. 4-8 is a cross-sectional view of bi-layer grating coupler 4-800 configured to optically couple with waveguide 4-820, where light is configured to propagate in the direction shown by the arrow. Light incident to grating coupler 4-800 is shown by the dashed line. Bilayer grating coupler 4-800 may provide improved directionality of radiated light towards waveguide 4-820. Grating coupler 4-800 has material structures 4-825, which are formed of two layers having similar dimensions in contact with each other, and offset by dimension, $D_{Offset}$. In this manner, material structures 4-825 are asymmetric about a plane substantially parallel to a surface of the integrated device (e.g., along the z-direction). Gaps between material structures 4-835 have a width, $D_{Trench}$. The pitch, P, is equal to the dimension of the material structures 4-825 along the z direction and $D_{Trench}$.

FIG. 4-9 shows a plot of normalized coupling efficiency versus thickness of the bottom cladding layer for a bi-layer grating coupler. The normalized coupling efficiency is calculated by normalizing the efficiency at each of the bottom cladding thicknesses to the peak efficiency determined within the range of bottom cladding thicknesses being evaluated. The results shown in FIG. 4-9 illustrate how the coupling efficiency remains substantially constant over a range of variation in thickness of the bottom cladding layer, which may provide fabrication tolerances since there is a broad range of thickness that can be achieved for the bottom cladding layer without substantially reducing coupling efficiency. FIGS. 4-10 and 4-11 are grayscale versions of a color heat map plotting parameter $D_{Offset}$ versus duty cycle where the variation in color corresponds to coupling efficiency. In FIG. 4-10, the angle of incident light to the grating coupler is fixed. In FIG. 4-11, the angle of incident light to the grating coupler is varied with a range of ±1 degree of the fixed angle. FIG. 4-11 shows that higher coupling efficiency can be achieved by tuning the incident angle to accommodate for changes in parameters of the grating coupler, which may provide further fabrication tolerances.

FIG. 4-12 is a cross-sectional view of a grating coupler 4-1200 configured to optically couple with waveguide 4-1220, where light is configured to propagated in the direction shown by the arrow. Light incident to grating coupler 4-1200 is shown by the dashed line. Grating coupler 4-1200 has material structures 4-1225, which are formed of a continuous layer and etched portions in contact with the continuous layer. In this manner, material structures 4-1225 are asymmetric about a plane substantially parallel a surface of the integrated device (e.g., along the z-direction).

FIG. 4-13 is a cross-sectional view of a grating coupler 4-1300 configured to optically couple with waveguide 4-1320, where light is configured to propagated in the direction shown by the arrow. Light incident to grating coupler 4-1300 is shown by the dashed line. Grating coupler 4-1300 has material structures 4-1325, which are spaced apart from a continuous layer. In this manner, material structures 4-1325 are asymmetric about a plane substantially parallel to a surface of the integrated device (e.g., along the z-direction).

For some grating couplers, the coupling efficiency and range of incident angles for which a desired coupling efficiency can be achieved may depend on the bandwidth of the incident light where performance of a grating coupler may decrease for broader bands of wavelengths. The inventors have recognized and appreciated that a grating coupler may accommodate broader bands by altering the refractive index of the material structures, resulting in a wideband grating coupler. In some embodiments, multiple materials may be used to control the refractive index of the gratings. For example, if the silicon oxide and silicon nitride are used to form grating structures of a grating coupler, the grating structures may be discretized into sub-wavelength elements (e.g., less than 200 nm). The effective refractive index, nom, may depend on the filling factors for both silicon oxide, $f_{ox}$ and $f_{SiN}$, respectively, as well as the refractive index for silicon oxide, $n_{ox}$, and the refractive index for silicon nitride, $n_{SiN}$. In particular, $n_{eff}=\sqrt{f_{ox}n_{ox}^2+f_{SiN}n_{SiN}^2}$. FIG. 4-14 is a schematic of a planar view of wideband grating coupler 4-1400 configured to optically couple with waveguide 4-1420. The individual gratings of grating coupler may include regions 4-1430 having a high refractive index (e.g., silicon nitride) and regions 14-1435 having a low refractive index (e.g., silicon oxide). As shown in FIG. 4-14, the filling factor, the thickness of regions 4-1430, and the thickness regions 14-1435 may vary in a direction towards waveguide 4-1420.

FIG. 4-15 is a plot of bandwidth versus fill factor for a grating coupler having the configuration shown in FIG. 4-14 where silicon oxide and silicon nitride are used as the high and low refractive index materials. As illustrated by FIG. 4-15, a filling factor of approximately 0.4 provides a maximum bandwidth of approximately 8 nm. FIG. 4-16 is a plot of peak wavelength versus fill factor for a grating coupler having the configuration shown in FIG. 4-14 where silicon oxide and silicon nitride are used as the high and low refractive index materials. FIG. 4-17 is a plot of peak efficiency versus fill factor for a grating coupler having the configuration shown in FIG. 4-14 where silicon oxide and silicon nitride are used as the high and low refractive index materials.

It should be appreciated that a grating coupler having a configuration as described herein may couple with any suitable number of waveguides and may have output light in one or more directions. In some embodiments, a grating coupler may have multiple output waveguides substantially parallel in one direction. FIG. 4-18 is a schematic of a planar view of granting coupler 4-1800 coupled with multiple output waveguides, including waveguides 14-1820a and 14-1820b, where the output waveguides are configured in one direction (along the z-direction) from grating coupler 4-1800. FIG. 4-19 is a schematic of a planar view of grating coupler 4-1900 coupled with multiple output waveguides 4-1920a, 14-1920b, 14-1920c, and 14-1920d. Each of output waveguides 4-1920a, 14-1920b, 14-1920c, and 14-1920d is configured to direct light in four different directions from grating coupler 4-1900. FIG. 4-20 is a schematic of a planar view of grating coupler 4-2000 coupled with multiple output waveguides 4-2020a and 14-2020b. Each of output waveguides 4-2020a and 14-2020b is configured to direct light in two different directions from grating coupler 4-2000.

Some aspects of the present application relate to forming an integrated photonic device with a grating coupler having one or more of the configurations described herein. Some embodiments involve a method of forming an integrated photonic device that includes forming at least one waveguide, and forming an optical coupling region. The optical coupling region comprises a grating coupler optically coupled to the at least one waveguide and configured to receive light incident to a surface of the integrated photonic device, the grating coupler having material structures asymmetric about a plane substantially parallel to the surface, and at least one monitoring sensor positioned proximate to a region overlapping with the grating coupler and configured to receive light incident to the grating coupler.

In some embodiments, the plane passes through an axis of the grating coupler. In some embodiments, at least one of the material structures comprises at least two material layers laterally offset from each other in a direction substantially parallel to the plane. In some embodiments, the grating coupler comprises at least two material layers in contact with each other. In some embodiments, the grating coupler comprises at least two material layers spaced apart from each other by a distance. In some embodiments, at least one of the material structures comprises a partially etched material portion. In some embodiments, at least one of the material structures comprises a fully etched material portion. In some embodiments, the grating coupler is a blazed grating coupler. In some embodiments, at least one of the material structures is asymmetric relative to a plane substantially perpendicular to the surface.

Some embodiments relate to a method of forming an integrated photonic device that includes forming at least one waveguide and forming an optical coupling region. The optical coupling region includes a grating coupler optically coupled to the at least one waveguide and configured to receive light incident to a surface of the integrated photonic device, the grating coupler having material structures spaced from each other with a variable fill factor, and at least one monitoring sensor positioned proximate to a region overlapping with the grating coupler and configured to receive light incident to the grating coupler.

In some embodiments, at least one of the material structures comprises a partially etched material portion. In some embodiments, the material structures are spaced apart from each other by gaps having variable widths. In some embodiments, the grating coupler comprises a dielectric material formed in the gaps. In some embodiments, the material structures have variable widths.

III. Additional Aspects of the System

The system may include an integrated device and an instrument configured to interface with the integrated device. The integrated device may include an array of pixels, where a pixel includes a sample well and at least one photodetector. A surface of the integrated device may have a plurality of sample wells, where a sample well is configured to receive a sample from a sample placed on the surface of the integrated device. A sample may contain multiple samples, and in some embodiments, different types of samples. The plurality of sample wells may have a suitable size and shape such that at least a portion of the sample wells receive one sample from a sample. In some embodiments, the number of samples within a sample well may be distributed among the sample wells such that some sample wells contain one sample with others contain zero, two or more samples.

In some embodiments, a sample may contain multiple single-stranded DNA templates, and individual sample wells on a surface of an integrated device may be sized and shaped to receive a sequencing template. Sequencing templates may be distributed among the sample wells of the integrated device such that at least a portion of the sample wells of the integrated device contain a sequencing template. The sample may also contain labeled nucleotides which then enter in the sample well and may allow for identification of a nucleotide as it is incorporated into a strand of DNA complementary to the single-stranded DNA template in the sample well. In such an example, the "sample" may refer to both the sequencing template and the labeled nucleotides currently being incorporated by a polymerase. In some embodiments, the sample may contain sequencing templates and labeled nucleotides may be subsequently introduced to a sample well as nucleotides are incorporated into a complementary strand within the sample well. In this manner, timing of incorporation of nucleotides may be controlled by when labeled nucleotides are introduced to the sample wells of an integrated device.

Excitation light is provided from an excitation source located separate from the pixel array of the integrated device. The excitation light is directed at least in part by elements of the integrated device towards one or more pixels to illuminate an illumination region within the sample well. A marker may then emit emission light when located within the illumination region and in response to being illuminated by excitation light. In some embodiments, one or more excitation sources are part of the instrument of the system where components of the instrument and the integrated device are configured to direct the excitation light towards one or more pixels.

Emission light emitted by a sample may then be detected by one or more photodetectors within a pixel of the integrated device. Characteristics of the detected emission light may provide an indication for identifying the marker associated with the emission light. Such characteristics may include any suitable type of characteristic, including an arrival time of photons detected by a photodetector, an amount of photons accumulated over time by a photodetector, and/or a distribution of photons across two or more photodetectors. In some embodiments, a photodetector may have a configuration that allows for the detection of one or more timing characteristics associated with a sample's emission light (e.g., fluorescence lifetime). The photodetector may detect a distribution of photon arrival times after a pulse of excitation light propagates through the integrated device, and the distribution of arrival times may provide an indication of a timing characteristic of the sample's emission light (e.g., a proxy for fluorescence lifetime). In some embodiments, the one or more photodetectors provide an indication of the probability of emission light emitted by the marker (e.g., fluorescence intensity). In some embodiments, a plurality of photodetectors may be sized and arranged to capture a spatial distribution of the emission light. Output signals from the one or more photodetectors may then be used to distinguish a marker from among a plurality of markers, where the plurality of markers may be used to identify a sample within the sample. In some embodiments, a sample may be excited by multiple excitation energies, and emission light and/or timing characteristics of the emission light emitted by the sample in response to the multiple excitation energies may distinguish a marker from a plurality of markers.

A schematic overview of the system 5-100 is illustrated in FIG. 5-1A. The system comprises both an integrated device 5-102 that interfaces with an instrument 5-104. In some embodiments, instrument 5-104 may include one or more excitation sources 5-106 integrated as part of instrument 5-104. In some embodiments, an excitation source may be external to both instrument 5-104 and integrated device 5-102, and instrument 5-104 may be configured to receive excitation light from the excitation source and direct excitation light to the integrated device. The integrated device may interface with the instrument using any suitable socket for receiving the integrated device and holding it in precise optical alignment with the excitation source. The excitation source 5-106 may be configured to provide excitation light to the integrated device 5-102. As illustrated schematically in FIG. 5-1A, the integrated device 5-102 has a plurality of pixels 5-112, where at least a portion of pixels may perform independent analysis of a sample. Such pixels 5-112 may be referred to as "passive source pixels" since a pixel receives excitation light from a source 5-106 separate from the pixel, where excitation light from the source excites some or all of the pixels 5-112. Excitation source 5-106 may be any suitable light source. Examples of suitable excitation sources are described in U.S. patent application Ser. No. 14/821,688, filed Aug. 7, 2015, titled "INTEGRATED DEVICE FOR PROBING, DETECTING AND ANALYZING MOLECULES," which is incorporated by reference herein in its entirety. In some embodiments, excitation source 5-106 includes multiple excitation sources that are combined to deliver excitation light to integrated device 5-102. The multiple excitation sources may be configured to produce multiple excitation energies or wavelengths.

A pixel 5-112 has a sample well 5-108 configured to receive a sample and a photodetector 5-110 for detecting emission light emitted by the sample in response to illuminating the sample with excitation light provided by the excitation source 5-106. In some embodiments, sample well 5-108 may retain the sample in proximity to a surface of integrated device 5-102, which may ease delivery of excitation light to the sample and detection of emission light from the sample.

Optical elements for coupling excitation light from excitation light source 5-106 to integrated device 5-102 and guiding excitation light to the sample well 5-108 are located both on integrated device 5-102 and the instrument 5-104. Source-to-well optical elements may comprise one or more grating couplers located on integrated device 5-102 to couple excitation light to the integrated device and waveguides to deliver excitation light from instrument 5-104 to sample wells in pixels 5-112. One or more optical splitter elements may be positioned between a grating coupler and the waveguides. The optical splitter may couple excitation light from the grating coupler and deliver excitation light to at least one of the waveguides. In some embodiments, the optical splitter may have a configuration that allows for delivery of excitation light to be substantially uniform across all the waveguides such that each of the waveguides receives a substantially similar amount of excitation light. Such embodiments may improve performance of the integrated device by improving the uniformity of excitation light received by sample wells of the integrated device.

Sample well 5-108, a portion of the excitation source-to-well optics, and the sample well-to-photodetector optics are located on integrated device 5-102. Excitation source 5-106 and a portion of the source-to-well components are located in instrument 5-104. In some embodiments, a single component may play a role in both coupling excitation light to sample well 5-108 and delivering emission light from sample well 5-108 to photodetector 5-110. Examples of suitable components, for coupling excitation light to a sample well and/or directing emission light to a photodetector, to include in an integrated device are described in U.S. patent application Ser. No. 14/821,688, filed Aug. 7, 2015, titled "INTEGRATED DEVICE FOR PROBING, DETECTING AND ANALYZING MOLECULES," and U.S. patent application Ser. No. 14/543,865, filed Nov. 17, 2014, titled "INTEGRATED DEVICE WITH EXTERNAL LIGHT SOURCE FOR PROBING, DETECTING, AND ANALYZING MOLECULES," each of which is incorporated herein by reference in its entirety.

Pixel 5-112 is associated with its own individual sample well 5-108 and at least one photodetector 5-110. The plurality of pixels of integrated device 5-102 may be arranged to have any suitable shape, size, and/or dimensions. Integrated device 5-102 may have any suitable number of pixels. The number of pixels in integrated device 5-102 may be in the range of approximately 10,000 pixels to 1,000,000 pixels or any value or range of values within that range. In some embodiments, the pixels may be arrange in an array of 512 pixels by 512 pixels. Integrated device 5-102 may interface with instrument 5-104 in any suitable manner. In some embodiments, instrument 5-104 may have an interface that detachably couples to integrated device 5-102 such that a user may attach integrated device 5-102 to instrument 5-104 for use of integrated device 5-102 to analyze a sample and remove integrated device 5-102 from instrument 5-104 to allow for another integrated device to be attached. The interface of instrument 5-104 may position integrated device 5-102 to couple with circuitry of instrument 5-104 to allow for readout signals from one or more photodetectors to be transmitted to instrument 5-104. Integrated device 5-102 and instrument 5-104 may include multi-channel, high-speed communication links for handling data associated with large pixel arrays (e.g., more than 10,000 pixels).

A cross-sectional schematic of integrated device 5-102 illustrating a row of pixels 5-112 is shown in FIG. 5-1B. Integrated device 5-102 may include coupling region 5-201, routing region 5-202, and pixel region 5-203. Pixel region 5-203 may include a plurality of pixels 5-112 having sample wells 5-108 positioned on a surface at a location separate from coupling region 5-201, which is where excitation light (shown as the dashed arrow) couples to integrated device 5-102. Sample wells 5-108 may be formed through metal layer(s) 5-116. One pixel 5-112, illustrated by the dotted rectangle, is a region of integrated device 5-102 that includes a sample well 5-108 and photodetector region having one or more photodetectors 5-110.

FIG. 5-1B illustrates the path of excitation (shown in dashed lines) by coupling a beam of excitation light to coupling region 5-201 and to sample wells 5-108. The row of sample wells 5-108 shown in FIG. 5-1B may be positioned to optically couple with waveguide 5-220. Excitation light may illuminate a sample located within a sample well. The sample may reach an excited state in response to being illuminated by the excitation light. When a sample is in an excited state, the sample may emit emission light, which may be detected by one or more photodetectors associated with the sample well. FIG. 5-1B schematically illustrates the path of emission light (shown as the solid line) from a sample well 5-108 to photodetector(s) 5-110 of pixel 5-112. The photodetector(s) 5-110 of pixel 5-112 may be configured and positioned to detect emission light from sample well 5-108. Examples of suitable photodetectors are described in U.S. patent application Ser. No. 14/821,656, filed Aug. 7, 2015, titled "INTEGRATED DEVICE FOR TEMPORAL BINNING OF RECEIVED PHOTONS," which is incorporated by reference herein in its entirety. Additional examples of suitable photodetectors are described in U.S. patent application Ser. No. 15/852,571, filed Dec. 22, 2017, titled "INTEGRATED PHOTODETECTOR WITH DIRECT BINNING PIXEL," which is incorporated herein by reference in its entirety. For an individual pixel 5-112, a sample well 5-108 and its respective photodetector(s) 5-110 may be aligned along a common axis (along the y-direction shown in FIG. 5-1B). In this manner, the photodetector(s) may overlap with the sample well within a pixel 5-112.

The directionality of the emission light from a sample well 5-108 may depend on the positioning of the sample in the sample well 5-108 relative to metal layer(s) 5-116 because metal layer(s) 5-116 may act to reflect emission light. In this manner, a distance between metal layer(s) 5-116 and a fluorescent marker positioned in a sample well 5-108 may impact the efficiency of photodetector(s) 5-110, that are in the same pixel as the sample well, to detect the light emitted by the fluorescent marker. The distance between metal layer(s) 5-116 and the bottom surface of a sample well 5-106, which is proximate to where a sample may be positioned during operation, may be in the range of 100 nm to 500 nm, or any value or range of values in that range. In some embodiments the distance between metal layer(s) 5-116 and the bottom surface of a sample well 5-108 is approximately 300 nm.

The distance between the sample and the photodetector(s) may also impact efficiency in detecting emission light. By decreasing the distance light has to travel between the sample and the photodetector(s), detection efficiency of emission light may be improved. In addition, smaller distances between the sample and the photodetector(s) may allow for pixels that occupy a smaller area footprint of the integrated device, which can allow for a higher number of pixels to be included in the integrated device. The distance between the bottom surface of a sample well 5-108 and photodetector(s) may be in the range of 1 μm to 15 μm, or any value or range of values in that range.

Photonic structure(s) 5-230 may be positioned between sample wells 5-108 and photodetectors 5-110 and configured to reduce or prevent excitation light from reaching photodetectors 5-110, which may otherwise contribute to signal noise in detecting emission light. As shown in FIG. 5-1B, the one or more photonic structures 5-230 may be positioned between waveguide 5-220 and photodetectors 5-110. Photonic structure(s) 5-230 may include one or more optical rejection photonic structures including a spectral filter, a polarization filter, and a spatial filter. Photonic structure(s) 5-230 may be positioned to align with individual sample wells 5-108 and their respective photodetector(s) 5-110 along a common axis. Metal layers 5-240, which may act as a circuitry for integrated device 5-102, may also act as a spatial filter, in accordance with some embodiments. In such embodiments, one or more metal layers 5-240 may be positioned to block some or all excitation light from reaching photodetector(s) 5-110.

Coupling region 5-201 may include one or more optical components configured to couple excitation light from an external excitation source. Coupling region 5-201 may include grating coupler 5-216 positioned to receive some or all of a beam of excitation light. Examples of suitable grating couplers are described in U.S. patent application Ser. No. 15/844,403, filed Dec. 15, 2017, titled "OPTICAL COUPLER AND WAVEGUIDE SYSTEM," which is incorporated by reference herein in its entirety. Grating coupler 5-216 may couple excitation light to waveguide 5-220, which may be configured to propagate excitation light to the proximity of one or more sample wells 5-108. Alternatively, coupling region 5-201 may comprise other well-known structures for coupling light into a waveguide.

Components located off of the integrated device may be used to position and align the excitation source 5-106 to the integrated device. Such components may include optical components including lenses, mirrors, prisms, windows, apertures, attenuators, and/or optical fibers. Additional mechanical components may be included in the instrument to allow for control of one or more alignment components. Such mechanical components may include actuators, stepper motors, and/or knobs. Examples of suitable excitation sources and alignment mechanisms are described in U.S. patent application Ser. No. 15/161,088, filed May 20, 2016, titled "PULSED LASER AND SYSTEM," which is incorporated by reference herein in its entirety. Another example of a beam-steering module is described in U.S. patent application Ser. No. 15/842,720, filed Dec. 14, 2017, titled "COMPACT BEAM SHAPING AND STEERING ASSEMBLY," which is incorporated herein by reference in its entirety.

A sample to be analyzed may be introduced into sample well 5-108 of pixel 5-112. The sample may be a biological sample or any other suitable sample, such as a chemical sample. The sample may include multiple molecules and the sample well may be configured to isolate a single molecule. In some instances, the dimensions of the sample well may act to confine a single molecule within the sample well, allowing measurements to be performed on the single molecule. Excitation light may be delivered into the sample well 5-108, so as to excite the sample or at least one fluorescent marker attached to the sample or otherwise associated with the sample while it is within an illumination area within the sample well 5-108.

In operation, parallel analyses of samples within the sample wells are carried out by exciting some or all of the samples within the wells using excitation light and detecting signals from sample emission with the photodetectors. Emission light from a sample may be detected by a corresponding photodetector and converted to at least one electrical signal. The electrical signals may be transmitted along conducting lines (e.g., metal layers 5-240) in the circuitry of the integrated device, which may be connected to an instrument interfaced with the integrated device. The electrical signals may be subsequently processed and/or analyzed. Processing or analyzing of electrical signals may occur on a suitable computing device either located on or off the instrument.

Instrument 5-104 may include a user interface for controlling operation of instrument 5-104 and/or integrated device 5-102. The user interface may be configured to allow a user to input information into the instrument, such as commands and/or settings used to control the functioning of the instrument. In some embodiments, the user interface may include buttons, switches, dials, and a microphone for voice commands. The user interface may allow a user to receive feedback on the performance of the instrument and/or integrated device, such as proper alignment and/or information obtained by readout signals from the photodetectors on the integrated device. In some embodiments, the user interface may provide feedback using a speaker to provide audible feedback. In some embodiments, the user interface may include indicator lights and/or a display screen for providing visual feedback to a user.

In some embodiments, instrument 5-104 may include a computer interface configured to connect with a computing device. Computer interface may be a USB interface, a FireWire interface, or any other suitable computer interface. Computing device may be any general purpose computer, such as a laptop or desktop computer. In some embodiments, computing device may be a server (e.g., cloud-based server) accessible over a wireless network via a suitable computer interface. The computer interface may facilitate communication of information between instrument 5-104 and the computing device. Input information for controlling and/or configuring the instrument 5-104 may be provided to the computing device and transmitted to instrument 5-104 via the computer interface. Output information generated by instrument 5-104 may be received by the computing device via the computer interface. Output information may include feedback about performance of instrument 5-104, performance of integrated device 5-112, and/or data generated from the readout signals of photodetector 5-110.

In some embodiments, instrument 5-104 may include a processing device configured to analyze data received from one or more photodetectors of integrated device 5-102 and/or transmit control signals to excitation source(s) 5-106. In some embodiments, the processing device may comprise a general purpose processor, a specially-adapted processor (e.g., a central processing unit (CPU) such as one or more microprocessor or microcontroller cores, a field-programmable gate array (FPGA), an application-specific integrated circuit (ASIC), a custom integrated circuit, a digital signal processor (DSP), or a combination thereof.) In some embodiments, the processing of data from one or more photodetectors may be performed by both a processing device of instrument 5-104 and an external computing device. In other embodiments, an external computing device may be omitted and processing of data from one or more photodetectors may be performed solely by a processing device of integrated device 5-102.

A non-limiting example of a biological reaction taking place in a sample well 5-330 is depicted in FIG. 5-2. In this example, sequential incorporation of nucleotides and/or nucleotide analogs into a growing strand that is complementary to a target nucleic acid is taking place in the sample well. The sequential incorporation can be detected to sequence a series of nucleic acids (e.g., DNA, RNA). The sample well may have a depth in the range of approximately 100 to approximately 500 nm, or any value or range of values within that range, and a diameter in the range of approximately 80 nm to approximately 200 nm. A metallization layer 5-540 (e.g., a metallization for an electrical reference potential) may be patterned above the photodetector to provide an aperture that blocks stray light from adjacent sample wells and other unwanted light sources. According to some embodiments, polymerase 5-520 may be located within the sample well 5-330 (e.g., attached to a base of the sample well). The polymerase may take up a target nucleic acid (e.g., a portion of nucleic acid derived from DNA), and sequence a growing strand of complementary nucleic acid to produce a growing strand of DNA 5-512. Nucleotides and/or nucleotide analogs labeled with different fluorophores may be dispersed in a solution above and within the sample well.

When a labeled nucleotide and/or nucleotide analog 5-610 is incorporated into a growing strand of complementary nucleic acid, as depicted in FIG. 5-3, one or more attached fluorophores 5-630 may be repeatedly excited by pulses of optical energy coupled into the sample well 5-330 from the waveguide 5-315. In some embodiments, the fluorophore or fluorophores 5-630 may be attached to one or more nucleotides and/or nucleotide analogs 5-610 with any suitable linker 5-620. An incorporation event may last for a period of time up to about 100 ms. During this time, pulses of fluorescent emission resulting from excitation of the fluorophore(s) by pulses from the mode-locked laser may be detected with a time-binning photodetector 5-322. By attaching fluorophores with different emission characteristics (e.g., fluorescent decay rates, intensity, fluorescent wavelength) to the different nucleotides (A,C,G,T), detecting and distinguishing the different emission characteristics while the strand of DNA 5-512 incorporates a nucleic acid and enables determination of the nucleotide sequence of the growing strand of DNA.

According to some embodiments, an instrument 5-104 that is configured to analyze samples based on fluorescent emission characteristics may detect differences in fluorescent lifetimes and/or intensities between different fluorescent molecules, and/or differences between lifetimes and/or intensities of the same fluorescent molecules in different environments. By way of explanation, FIG. 5-4 plots two different fluorescent emission probability curves (A and B), which may be representative of fluorescent emission from two different fluorescent molecules, for example. With reference to curve A (dashed line), after being excited by a short or ultrashort optical pulse, a probability $p_A(t)$ of a fluorescent emission from a first molecule may decay with time, as depicted. In some cases, the decrease in the probability of a photon being emitted over time may be represented by an exponential decay function $p_A(t)=P_{Ao}e^{-t/\tau_A}$, where $P_{Ao}$ is an initial emission probability and $\tau_A$ is a temporal parameter associated with the first fluorescent molecule that characterizes the emission decay probability. $\tau_A$ may be referred to as the "fluorescence lifetime," "emission lifetime," or "lifetime" of the first fluorescent molecule. In some cases, the value of $\tau_A$ may be altered by a local environment of the fluorescent molecule. Other fluorescent molecules may have different emission characteristics than that shown in curve A. For example, another fluorescent molecule may have a decay profile that differs from a single exponential decay, and its lifetime may be characterized by a half-life value or some other metric.

A second fluorescent molecule may have a decay profile that is exponential, but has a measurably different lifetime $\tau_B$, as depicted for curve B in FIG. 5-4, having an exponential decay function $p_B(t)=P_{Bo}e^{-t/\tau_B}$, where $P_{Bo}$ is an initial emission probability. In the example shown, the lifetime for the second fluorescent molecule of curve B is shorter than the lifetime for curve A, and the probability of emission is higher sooner after excitation of the second molecule than for curve A. Different fluorescent molecules may have lifetimes or half-life values ranging from about 0.1 ns to about 20 ns, in some embodiments.

The inventors have recognized and appreciated that differences in fluorescent emission lifetimes can be used to discern between the presence or absence of different fluorescent molecules and/or to discern between different environments or conditions to which a fluorescent molecule is subjected. In some cases, discerning fluorescent molecules based on lifetime (rather than emission wavelength, for example) can simplify aspects of an instrument 5-104. As an example, wavelength-discriminating optics (such as wavelength filters, dedicated detectors for each wavelength, dedicated pulsed optical sources at different wavelengths, and/or diffractive optics) may be reduced in number or eliminated when discerning fluorescent molecules based on lifetime. In some cases, a single pulsed optical source operating at a single characteristic wavelength may be used to excite different fluorescent molecules that emit within a same wavelength region of the optical spectrum but have measurably different lifetimes. An analytic system that uses a single pulsed optical source, rather than multiple sources operating at different wavelengths, to excite and discern different fluorescent molecules emitting in a same wavelength region can be less complex to operate and maintain, more compact, and may be manufactured at lower cost.

Although analytic systems based on fluorescent lifetime analysis may have certain benefits, the amount of information obtained by an analytic system and/or detection accuracy may be increased by allowing for additional detection techniques. For example, some analytic systems 5-160 may additionally be configured to discern one or more properties of a sample based on fluorescent wavelength and/or fluorescent intensity.

Referring again to FIG. 5-4, according to some embodiments, different fluorescent lifetimes may be distinguished with a photodetector that is configured to time-bin fluorescent emission events following excitation of a fluorescent molecule. The time binning may occur during a single charge-accumulation cycle for the photodetector. A charge-accumulation cycle is an interval between read-out events during which photo-generated carriers are accumulated in bins of the time-binning photodetector. The concept of determining fluorescent lifetime by time-binning of emission events is introduced graphically in FIG. 5-5. At time $t_e$ just prior to $t_1$, a fluorescent molecule or ensemble of fluorescent molecules of a same type (e.g., the type corresponding to curve B of FIG. 5-4) is (are) excited by a short or ultrashort optical pulse. For a large ensemble of molecules, the intensity of emission may have a time profile similar to curve B, as depicted in FIG. 5-5.

For a single molecule or a small number of molecules, however, the emission of fluorescent photons occurs according to the statistics of curve B in FIG. 5-4, for this example. A time-binning photodetector 5-322 may accumulate carriers generated from emission events into discrete time bins (three indicated in FIG. 5-5) that are temporally resolved with respect to the excitation time of the fluorescent molecule(s). When a large number of emission events are summed, carriers accumulated in the time bins may approximate the decaying intensity curve shown in FIG. 5-5, and the binned signals can be used to distinguish between different fluorescent molecules or different environments in which a fluorescent molecule is located. Examples of time-binning photodetectors are described in U.S. patent application Ser. No. 14/821,656, filed Aug. 7, 2015, titled "INTEGRATED DEVICE FOR TEMPORAL BINNING OF RECEIVED PHOTONS," which is incorporated herein by reference in its entirety. Additional examples of time-binning photodetectors are described in U.S. patent application Ser. No. 15/852,571, filed Dec. 22, 2017, titled "INTEGRATED PHOTODETECTOR WITH DIRECT BINNING PIXEL," which is incorporated herein by reference in its entirety.

In some embodiments, a time-binning photodetector may generate charge carriers in a photon absorption/carrier generation region and directly transfer charge carriers to a charge carrier storage bin in a charge carrier storage region. Such a time-binning photodetector may be referred to as a "direct binning pixel." Examples of direct binning pixels are described in U.S. patent application Ser. No. 15/852,571, filed Dec. 22, 2017, titled "INTEGRATED PHOTODETECTOR WITH DIRECT BINNING PIXEL," which is incorporated herein by reference in its entirety. For explanation purposes, a non-limiting embodiment of a time-binning photodetector is depicted in FIG. 5-6. As shown in FIG. 5-6, time-binning photodetector 5-950 includes photon absorption/carrier generation region 5-952, bins of charge carrier storage region 5-958, and readout circuitry 5-960 that reads out signals from the bins of charge carrier storage region 5-958. The bin to which a charge carrier is transferred is based on the time of arrival of a photon in photon absorption/carrier generation region 5-952 that produces the charge carrier. FIG. 5-6 shows an example of time-binning photodetector having two bins in charge carrier storage region 5-958: bin 0 and bin 1. In some instances, bin 0 may aggregate charge carriers received in one period following a trigger event (e.g., a pulse of excitation light), and bin 1 may aggregate charge carriers received in a later time period with respect to a trigger event. However, charge storage region 5-958 may have any number of bins, such as one bin, three bins, four bins, or more. Time-binning photodetector 5-950 may include electrodes 5-953, 5-955, and 5-956, which may be configured to apply voltages to establish potential gradients to direct charge carriers. Time-binning photodetector 5-950 may include rejection region 5-965, which may act as a drain or otherwise be configured to discard charge carriers produced in photon absorption/carrier generation region 5-952. A period of time when charge carriers are rejected by rejection region 5-965 may be timed to occur during a trigger event, such as an excitation light pulse.

Since an excitation light pulse may produce a number of unwanted charge carriers in photon absorption/carrier generation region 5-952, a potential gradient may be established in pixel 5-950 to drain such charge carriers to rejection region 5-965 during a rejection period. As an example, rejection region 5-965 may include a high potential diffusion area where electrons are drained to a supply voltage. Rejection region 5-965 may include an electrode 5-956 that charge couples region 5-952 directly to rejection region 5-965. The voltage of the electrode 5-956 may be varied to establish a desired potential gradient in photon absorption/carrier generation region 5-952. During a rejection period, the voltage of the electrode 5-956 may be set to a level that draws carriers from the photon absorption/carrier generation region 5-952 into the electrode 5-956, and out to the supply voltage. For example, the voltage of the electrode 5-956 may be set to a positive voltage to attract electrons, such that they are drawn away from the photon absorption/carrier generation region 5-952 to rejection region 5-965. Rejection region 5-965 may be considered a "lateral rejection region" because it allows transferring carriers laterally from region 5-952 to a drain.

Following the rejection period, a photogenerated charge carrier produced in photon absorption/carrier generation region 5-952 may be time-binned. Individual charge carriers may be directed to a bin based on their time of arrival. To do so, the electrical potential between photon absorption/carrier generation region 5-952 and charge carrier storage region 5-958 may be changed in respective time periods to establish a potential gradient that causes the photogenerated charge carriers to be directed to respective time bins. For example, during a first time period a barrier 5-962 formed by electrode 5-953 may be lowered, and a potential gradient may be established from photon absorption/carrier generation region 5-952 to bin 0, such that a carrier generated during this period is transferred to bin 0. Then, during a second time period, a barrier 5-964 formed by electrode 5-955 may be lowered, and a potential gradient may be established from photon absorption/carrier generation region 5-952 to bin 1, such that a carrier generated during this later period is transferred to bin 1.

In some implementations, only a single photon on average may be emitted from a fluorophore following an excitation event, as depicted in FIG. 5-7A. After a first excitation event at time $t_{e1}$, the emitted photon at time $t_{f1}$ may occur within a first time interval, so that the resulting electron signal is accumulated in the first electron-storage bin (contributes to bin 1). In a subsequent excitation event at time $t_{e2}$, the emitted photon at time $t_{f2}$ may occur within a second time interval, so that the resulting electron signal contributes to bin 2. Similarly, a subsequent excitation event at time $t_{e3}$, the emitted photon at time $t_{f3}$ may occur within the first time interval, so that the resulting electron signal contributes to bin 1

After a large number of excitation events and signal accumulations, the electron-storage bins of the time-binning photodetector 5-322 may be read out to provide a multi-valued signal (e.g., a histogram of two or more values, an N-dimensional vector, etc.) for a sample well. The signal values for each bin may depend upon the decay rate of the fluorophore. For example and referring again to FIG. 5-4, a fluorophore having a decay curve B will have a higher ratio of signal in bin 1 to bin 2 than a fluorophore having a decay curve A. The values from the bins may be analyzed and compared against calibration values, and/or each other, to determine the particular fluorophore, which in turn identifies the nucleotide or nucleotide analog (or any other molecule or sample of interest) linked to the fluorophore when in the sample well.

To further aid in understanding the signal analysis, the accumulated, multi-bin values may be plotted as a histogram, as depicted in FIG. 5-7B for example, or may be recorded as a vector or location in N-dimensional space. Calibration runs may be performed separately to acquire calibration values for the multi-valued signals (e.g., calibration histograms) for four different fluorophores linked to the four nucleotides or nucleotide analogs. As an example, the calibration histograms may appear as depicted in FIG. 5-8A (fluorescent label associated with the T nucleotide), FIG. 5-8B (fluorescent label associated with the A nucleotide), FIG. 5-8C (fluorescent label associated with the C nucleotide), and FIG. 5-8D (fluorescent label associated with the G nucleotide). A comparison of the measured multi-valued signal (corresponding to the histogram of FIG. 5-7B) to the calibration multi-valued signals may determine the identity "T" (FIG. 5-8A) of the nucleotide or nucleotide analog being incorporated into the growing strand of DNA.

In some implementations, fluorescent intensity may be used additionally or alternatively to distinguish between different fluorophores. For example, some fluorophores may emit at significantly different intensities or have a significant difference in their probabilities of excitation (e.g., at least a difference of about 35%) even though their decay rates may be similar. By referencing binned signals (bins 1-3) to measured excitation light bin 0, it may be possible to distinguish different fluorophores based on intensity levels.

In some embodiments, different numbers of fluorophores of the same type may be linked to different nucleotides or nucleotide analogs, so that the nucleotides may be identified based on fluorophore intensity. For example, two fluorophores may be linked to a first nucleotide (e.g., "C") or nucleotide analog and four or more fluorophores may be linked to a second nucleotide (e.g., "T") or nucleotide analog. Because of the different numbers of fluorophores, there may be different excitation and fluorophore emission probabilities associated with the different nucleotides. For example, there may be more emission events for the "T" nucleotide or nucleotide analog during a signal accumulation interval, so that the apparent intensity of the bins is significantly higher than for the "C" nucleotide or nucleotide analog.

The inventors have recognized and appreciated that distinguishing nucleotides or any other biological or chemical samples based on fluorophore decay rates and/or fluorophore intensities enables a simplification of the optical excitation and detection systems in an instrument 5-104. For example, optical excitation may be performed with a single-wavelength source (e.g., a source producing one characteristic wavelength rather than multiple sources or a source operating at multiple different characteristic wavelengths). Additionally, wavelength discriminating optics and filters may not be needed in the detection system. Also, a single photodetector may be used for each sample well to detect emission from different fluorophores.

The phrase "characteristic wavelength" or "wavelength" is used to refer to a central or predominant wavelength within a limited bandwidth of radiation (e.g., a central or peak wavelength within a 20 nm bandwidth output by a pulsed optical source). In some cases, "characteristic wavelength" or "wavelength" may be used to refer to a peak wavelength within a total bandwidth of radiation output by a source.

The inventors have recognized and appreciated that fluorophores having emission wavelengths in a range between about 560 nm and about 900 nm can provide adequate amounts of fluorescence to be detected by a time-binning photodetector (which may be fabricated on a silicon wafer using CMOS processes). These fluorophores can be linked to biological molecules of interest such as nucleotides or nucleotide analogs. Fluorescent emission in this wavelength range may be detected with higher responsivity in a silicon-based photodetector than fluorescence at longer wavelengths. Additionally, fluorophores and associated linkers in this wavelength range may not interfere with incorporation of the nucleotides or nucleotide analogs into growing strands of DNA. The inventors have also recognized and appreciated that fluorophores having emission wavelengths in a range between about 560 nm and about 660 nm may be optically excited with a single-wavelength source. An example fluorophore in this range is Alexa Fluor 647, available from Thermo Fisher Scientific Inc. of Waltham, Mass. The inventors have also recognized and appreciated that excitation light at shorter wavelengths (e.g., between about 500 nm and about 650 nm) may be required to excite fluorophores that emit at wavelengths between about 560 nm and about 900 nm. In some embodiments, the time-binning photodetectors may efficiently detect longer-wavelength emission from the samples, e.g., by incorporating other materials, such as Ge, into the photodetectors active region.

In some embodiments, a sample may be labeled with one or more markers, and emission associated with the markers is discernable by the instrument. For example, the photodetector may be configured to convert photons from the emission light into electrons to form an electrical signal that may be used to discern a lifetime that is dependent on the emission light from a specific marker. By using markers with different lifetimes to label samples, specific samples may be identified based on the resulting electrical signal detected by the photodetector.

A sample may contain multiple types of molecules and different luminescent markers may uniquely associate with a molecule type. During or after excitation, the luminescent marker may emit emission light. One or more properties of the emission light may be used to identify one or more types of molecules in the sample. Properties of the emission light used to distinguish among types of molecules may include a fluorescence lifetime value, intensity, and/or emission wavelength. A photodetector may detect photons, including photons of emission light, and provide electrical signals indicative of one or more of these properties. In some embodiments, electrical signals from a photodetector may provide information about a distribution of photon arrival times across one or more time intervals. The distribution of photon arrival times may correspond to when a photon is detected after a pulse of excitation light is emitted by an excitation source. A value for a time interval may correspond to a number of photons detected during the time interval. Relative values across multiple time intervals may provide an indication of a temporal characteristic of the emission light (e.g., lifetime). Analyzing a sample may include distinguishing among markers by comparing values for two or more different time intervals within a distribution. In some embodiments, an indication of the intensity may be provided by determining a number of photons across all time bins in a distribution.

IV. Conclusion

The described embodiments can be implemented in various combinations. Example configurations include configurations (1)-(19), (20)-(34), (35)-(42), and (43)-(48), and methods (49)-(67), (68)-(82), (83)-(91), and (92)-(96) below.

(1) An integrated photonic device comprising: a plurality of sample wells arranged in a row; a first waveguide positioned to optically couple with at least two sample wells in the row; and a power waveguide configured to receive light from a region of the integrated photonic device separate from the row of sample wells and to optically couple with the first waveguide.

(2) The integrated photonic device of (1), wherein the first waveguide is configured to optically couple with the power waveguide along a length of the first waveguide.

(3) The integrated photonic device of (1) or (2), wherein the first waveguide is configured to evanescently couple with the power waveguide.

(4) The integrated photonic device of (1)-(3), wherein the power waveguide has a larger width than the first waveguide.

(5) The integrated photonic device of (1)-(4), wherein the power waveguide is configured to optically couple a first portion of optical power to the first waveguide and to optically couple a second portion of optical power to a second waveguide.

(6) The integrated photonic device of (5), wherein the second waveguide is positioned to optically couple with at least two sample wells in the row.

(7) The integrated photonic device of (5) or (6), further comprising a second plurality of sample wells arranged in a second row, wherein the second waveguide is positioned to optically couple with at least two sample wells in the second row.

(8) The integrated photonic device of (1)-(3), wherein the power waveguide is configured to optically couple with the first waveguide through a first directional coupler having a first coupling coefficient and to optically couple with a second waveguide through a second directional coupler having a second coupling coefficient, the second coupling coefficient being larger than the first coupling coefficient.

(9) The integrated photonic device of (8), wherein the second waveguide is positioned to optically couple with at least two sample wells in the row.

(10) The integrated photonic device of (8) or (9), wherein the first directional coupler is positioned more proximate to an optical input of the power waveguide than the second directional coupler.

(11) The integrated photonic device of (8)-(10), further comprising a second plurality of sample wells arranged in a second row, wherein the second waveguide is positioned to optically couple with at least two sample wells in the second row.

(12) The integrated photonic device of (1)-(11), wherein the power waveguide is configured to optically couple with the first waveguide through a directional coupler having a coupling length that is less than approximately 100 µm.

(13) The integrated photonic device of (1)-(12), wherein a coupling strength between the power waveguide and the first waveguide increases along a direction of optical propagation through the power waveguide.

(14) The integrated photonic device of (1)-(13), wherein the first waveguide has a higher propagation loss than the power waveguide.

(15) The integrated photonic device of (1)-(14), further comprising a grating coupler configured to receive light from a surface of the integrated photonic device and optically couple with the power waveguide.

(16) The integrated photonic device of (1)-(15), further comprising a second waveguide, wherein the first waveguide is configured to optically couple with a first sample well in the row and a second waveguide is configured to optically couple with a second sample well in the row.

(17) The integrated photonic device of (1)-(16), wherein the first waveguide has a tapered end.

(18) The integrated photonic device of (17), wherein the first waveguide is configured to evanescently couple with the power waveguide at a location distal from the tapered end.

(19) The integrated photonic device of (1)-(18), further comprising at least one photodetector positioned to receive light emitted from a respective one of the at least two sample wells.

(20) An integrated photonic device comprising: an array of sample wells arranged in rows; and a plurality of waveguides including a first waveguide positioned to optically couple with a first group of sample wells in a row and a second waveguide positioned to optically couple with a second group of sample wells in the row.

(21) The integrated photonic device of (20), wherein a third group of sample wells in the row is positioned between the first group and the second group.

(22) The integrated photonic device of (21), wherein a sample well of the third group is configured to receive less optical power than a sample well of the first group and/or a sample well of the second group.

(23) The integrated photonic device of (22), wherein the first waveguide is at a first distance from a sample well of the first group and is at a second distance from the sample well of the third group, the first distance being less than the second distance.

(24) The integrated photonic device of (23), wherein the second waveguide is at a third distance from a sample well of the second group and is at a fourth distance from the sample well of the third group, the third distance being less than the fourth distance.

(25) The integrated photonic device of (20)-(24), wherein the first waveguide is curved in a region between the first group of sample wells and the second group of sample wells.

(26) The integrated photonic device of (25), wherein the second waveguide is curved in the region.

(27) The integrated photonic device of (20)-(26), wherein the first waveguide is positioned to evanescently couple with each sample well of the first group and the second waveguide is positioned to evanescently couple with each sample well of the second group.

(28) The integrated photonic device of (20)-(27), wherein the first waveguide is tapered along a portion configured to evanescently couple with the first group of sample wells and the second waveguide is tapered along a portion configured to evanescently couple with the second group of sample wells.

(29) The integrated photonic device of (20)-(28), wherein the integrated photonic device further comprises a grating coupler configured to receive light from a surface of the integrated photonic device and optically couple with the plurality of waveguides.

(30) The integrated photonic device of (20)-(29), wherein the first waveguide is optically uncoupled from the second group of sample wells and the second waveguide is optically uncoupled from the first group of sample wells.

(31) The integrated photonic device of (20)-(30), wherein the sample wells of the first group are substantially aligned along an axis with the sample wells of the second group.

(32) The integrated photonic device of (31), wherein at least a portion of the first waveguide is substantially parallel to the axis.

(33) The integrated photonic device of (32), wherein at least a portion of the second waveguide is substantially parallel to the axis.

(34) The integrated photonic device of (20)-(33), further comprising at least one photodetector configured to receive light emitted from a respective sample well of the first group.

(35) An integrated photonic device comprising: at least one waveguide; and an optical coupling region comprising: a grating coupler optically coupled to the at least one waveguide and configured to receive light incident to a surface of the integrated photonic device, the grating coupler having material structures asymmetric about a plane substantially parallel to the surface; and at least one monitoring sensor positioned proximate to a region overlapping with the grating coupler and configured to receive light incident to the grating coupler.

(36) The integrated photonic device of (35), wherein the plane passes through an axis of the grating coupler.

(37) The integrated photonic device of (35) or (36), wherein at least one of the material structures comprises at least two material layers laterally offset from each other in a direction substantially parallel to the plane.

(38) The integrated photonic device of (35)-(37), wherein the grating coupler comprises at least two material layers in contact with each other.

(39) The integrated photonic device of (35)-(38), wherein the grating coupler comprises at least two material layers spaced apart from each other by a distance.

(40) The integrated photonic device of (35)-(39), wherein at least one of the material structures comprises a partially etched material portion.

(41) The integrated photonic device of (35)-(40), wherein at least one of the material structures comprises a fully etched material portion.

(42) The integrated photonic device of (35)-(41), wherein the grating coupler is a blazed grating coupler.

(43) The integrated photonic device of (35)-(42), wherein at least one of the material structures is asymmetric relative to a plane substantially perpendicular to the surface.

(44) An integrated photonic device comprising: at least one waveguide; and an optical coupling region comprising: a grating coupler optically coupled to the at least one waveguide and configured to receive light incident to a surface of the integrated photonic device, the grating coupler having material structures spaced from each other with a variable fill factor; and at least one monitoring sensor positioned proximate to a region overlapping with the grating coupler and configured to receive light incident to the grating coupler.

(45) The integrated photonic device of (44), wherein at least one of the material structures comprises a partially etched material portion.

(46) The integrated photonic device of (44) or (45), wherein the material structures are spaced apart from each other by gaps having variable widths.

(47) The integrated photonic device of (46), wherein the grating coupler comprises a dielectric material formed in the gaps.

(48) The integrated photonic device of (44)-(47), wherein the material structures have variable widths.

(49) A method of forming an integrated photonic device comprising: forming a plurality of sample wells arranged in a row; forming a first waveguide positioned to optically couple with at least two sample wells in the row; and forming a power waveguide configured to receive light from a region of the integrated photonic device separate from the row of sample wells and to optically couple with the first waveguide.

(50) The method of (49), wherein the first waveguide is configured to optically couple with the power waveguide along a length of the first waveguide.

(51) The method of (49) or (50), wherein the first waveguide is configured to evanescently couple with the power waveguide.

(52) The method of (49)-(51), wherein the power waveguide has a larger width than the first waveguide.

(53) The method of (49)-(52), wherein the power waveguide is configured to optically couple a first portion of optical power to the first waveguide and to optically couple a second portion of optical power to a second waveguide.

(54) The method of (53), wherein the second waveguide is positioned to optically couple with at least two sample wells in the row.

(55) The method of (53) or (54), further comprising forming a second plurality of sample wells arranged in a second row, wherein the second waveguide is positioned to optically couple with at least two sample wells in the second row.

(56) The method of (49)-(55), wherein the power waveguide is configured to optically couple with the first waveguide through a first directional coupler having a first coupling coefficient and to optically couple with a second waveguide through a second directional coupler having a second coupling coefficient, the second coupling coefficient being larger than the first coupling coefficient.

(57) The method of (56), wherein the second waveguide is positioned to optically couple with at least two sample wells in the row.

(58) The method of (56) or (57), wherein the first directional coupler is positioned more proximate to an optical input of the power waveguide than the second directional coupler.

(59) The method of (56)-(58), further comprising forming a second plurality of sample wells arranged in a second row, wherein the second waveguide is positioned to optically couple with at least two sample wells in the second row.

(60) The method of (49)-(59), wherein the power waveguide is configured to optically couple with the first waveguide through a directional coupler having a coupling length that is less than approximately 100 µm.

(61) The method of (49)-(60), wherein a coupling strength between the power waveguide and the first waveguide increases along a direction of optical propagation through the power waveguide.

(62) The method of (49)-(61), wherein the first waveguide has a higher propagation loss than the power waveguide.

(63) The method of (49)-(62), further comprising forming a grating coupler configured to receive light from a surface of the integrated photonic device and optically couple with the power waveguide.

(64) The method of (49)-(63), further comprising forming a second waveguide, wherein the first waveguide is configured to optically couple with a first sample well in the row and a second waveguide is configured to optically couple with a second sample well in the row.

(65) The method of (49)-(64), wherein the first waveguide has a tapered end.

(66) The method of (65), wherein the first waveguide is configured to evanescently couple with the power waveguide at a location distal from the tapered end.

(67) The method of (49)-(66), further comprising forming at least one photodetector positioned to receive light emitted from a respective one of the at least two sample wells.

(68) A method of forming an integrated photonic device comprising: forming an array of sample wells arranged in rows; and forming a plurality of waveguides including a first waveguide positioned to optically couple with a first group of sample wells in a row and a second waveguide positioned to optically couple with a second group of sample wells in the row.

(69) The method of (68), wherein a third group of sample wells in the row is positioned between the first group and the second group.

(70) The method of (69), wherein a sample well of the third group is configured to receive less optical power than a sample well of the first group and/or a sample well of the second group.

(71) The method of (70), wherein the first waveguide is at a first distance from a sample well of the first group and is at a second distance from the sample well of the third group, the first distance being less than the second distance.

(72) The method of (71), wherein the second waveguide is at a third distance from a sample well of the second group and is at a fourth distance from the sample well of the third group, the third distance being less than the fourth distance.

(73) The method (68)-(72), wherein the first waveguide is curved in a region between the first group of sample wells and the second group of sample wells.

(74) The method of (73), wherein the second waveguide is curved in the region.

(75) The method of (68)-(74), wherein the first waveguide is positioned to evanescently couple with each sample well of the first group and the second waveguide is positioned to evanescently couple with each sample well of the second group.

(76) The method of (68)-(75), wherein the first waveguide is tapered along a portion configured to evanescently couple with the first group of sample wells and the second waveguide is tapered along a portion configured to evanescently couple with the second group of sample wells.

(77) The method of (68)-(76), wherein the method further comprises forming a grating coupler configured to receive light from a surface of the integrated photonic device and optically couple with the plurality of waveguides.

(78) The method of (68)-(77), wherein the first waveguide is optically uncoupled from the second group of sample wells and the second waveguide is optically uncoupled from the first group of sample wells.

(79) The method of (68)-(78), wherein the sample wells of the first group are substantially aligned along an axis with the sample wells of the second group.

(80) The method of (79), wherein at least a portion of the first waveguide is substantially parallel to the axis.

(81) The method of (80), wherein at least a portion of the second waveguide is substantially parallel to the axis.

(82) The method of (68)-(81), further comprising forming at least one photodetector configured to receive light emitted from a respective sample well of the first group.

(83) A method of forming an integrated photonic device comprising: forming at least one waveguide; and forming an optical coupling region comprising: a grating coupler optically coupled to the at least one waveguide and configured to receive light incident to a surface of the integrated photonic device, the grating coupler having material structures asymmetric about a plane substantially parallel to the surface; and at least one monitoring sensor positioned proximate to a region overlapping with the grating coupler and configured to receive light incident to the grating coupler.

(84) The method of (83), wherein the plane passes through an axis of the grating coupler.

(85) The method of (83) or (84), wherein at least one of the material structures comprises at least two material layers laterally offset from each other in a direction substantially parallel to the plane.

(86) The method of (83)-(85), wherein the grating coupler comprises at least two material layers in contact with each other.

(87) The method of (83)-(86), wherein the grating coupler comprises at least two material layers spaced apart from each other by a distance.

(88) The method of (83)-(87), wherein at least one of the material structures comprises a partially etched material portion.

(89) The method of (83)-(88), wherein at least one of the material structures comprises a fully etched material portion.

(90) The method of (83)-(89), wherein the grating coupler is a blazed grating coupler.

(91) The method of (83)-(90), wherein at least one of the material structures is asymmetric relative to a plane substantially perpendicular to the surface.

(92) A method of forming an integrated photonic device comprising: forming at least one waveguide; and forming an optical coupling region comprising: a grating coupler optically coupled to the at least one waveguide and configured to receive light incident to a surface of the integrated photonic device, the grating coupler having material structures spaced from each other with a variable fill factor; and at least one monitoring sensor positioned proximate to a region overlapping with the grating coupler and configured to receive light incident to the grating coupler.

(93) The method of (92), wherein at least one of the material structures comprises a partially etched material portion.

(94) The method of (92) or (93), wherein the material structures are spaced apart from each other by gaps having variable widths.

(95) The method of (92)-(94), wherein the grating coupler comprises a dielectric material formed in the gaps.

(96) The method of (92)-(95), wherein the material structures have variable widths.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. An integrated photonic device comprising:
   a pixel region comprising:
      a plurality of sample wells arranged in a row;
      a first waveguide positioned to optically couple with at least two sample wells in the row, wherein the first waveguide has a varying width; and
      a power waveguide configured to receive light from a region of the integrated photonic device separate from the pixel region and to optically couple with the first waveguide along a length of the first waveguide, wherein the length of the first waveguide spans the at least two sample wells in the row, and wherein a coupling strength between the power waveguide and the first waveguide increases along the length of the first waveguide, in a direction of optical propagation through the power waveguide.

2. The integrated photonic device of claim 1, wherein the first waveguide is configured to evanescently couple with the power waveguide.

3. The integrated photonic device of claim 1, wherein the power waveguide has a larger width than the first waveguide.

4. The integrated photonic device of claim 1, wherein the power waveguide is configured to optically couple a first portion of optical power to the first waveguide and to optically couple a second portion of optical power to a second waveguide.

5. The integrated photonic device of claim 4, wherein the second waveguide is positioned to optically couple with at least two sample wells in the row.

6. The integrated photonic device of claim 4, further comprising a second plurality of sample wells arranged in a second row, wherein the second waveguide is positioned to optically couple with at least two sample wells in the second row.

7. The integrated photonic device of claim 1, wherein the power waveguide is configured to optically couple with the first waveguide through a first directional coupler having a first coupling coefficient and to optically couple with a second waveguide through a second directional coupler having a second coupling coefficient, the second coupling coefficient being larger than the first coupling coefficient.

8. The integrated photonic device of claim 7, wherein the second waveguide is positioned to optically couple with at least two sample wells in the row.

9. The integrated photonic device of claim 7, wherein the first directional coupler is positioned more proximate to an optical input of the power waveguide than the second directional coupler.

10. The integrated photonic device of claim 7, further comprising a second plurality of sample wells arranged in a second row, wherein the second waveguide is positioned to optically couple with at least two sample wells in the second row.

11. The integrated photonic device of claim 1, wherein the power waveguide is configured to optically couple with the first waveguide through a directional coupler having a coupling length that is less than approximately 100 μm.

12. The integrated photonic device of claim 1, wherein the first waveguide has a higher propagation loss than the power waveguide.

13. The integrated photonic device of claim 1, further comprising a grating coupler configured to receive light from a surface of the integrated photonic device and optically couple with the power waveguide.

14. The integrated photonic device of claim 1, further comprising a second waveguide, wherein the first waveguide is configured to optically couple with a first sample well in the row and the second waveguide is configured to optically couple with a second sample well in the row.

15. The integrated photonic device of claim 1, wherein the first waveguide has a tapered end.

16. The integrated photonic device of claim 15, wherein the first waveguide is configured to evanescently couple with the power waveguide at a location distal from the tapered end.

17. The integrated photonic device of claim 1, further comprising at least one photodetector positioned to receive light emitted from a respective one of the at least two sample wells.

* * * * *